(12) United States Patent
Moura Pires De Andrade Tenreiro et al.

(10) Patent No.: US 10,661,276 B2
(45) Date of Patent: May 26, 2020

(54) METHOD FOR HANDLING LIQUID USING CENTRIFUGAL FORCE

(71) Applicant: BIOSURFIT, S.A., Aveiro (PT)

(72) Inventors: Tania Moura Pires De Andrade Tenreiro, Lisbon (PT); Luis Miguel Dias Martins, Odivelas (PT); Fábio Miguel Rolo Pereira, Lisbon (PT); Nuno Alexandre Esteves Reis, Lisbon (PT)

(73) Assignee: Biosurfit, S.A., Aveiro (PT)

( * ) Notice: Subject to any disclaimer, the term of this patent is extended or adjusted under 35 U.S.C. 154(b) by 0 days.

(21) Appl. No.: 15/532,083

(22) PCT Filed: Dec. 15, 2016

(86) PCT No.: PCT/EP2016/081320
§ 371 (c)(1),
(2) Date: May 31, 2017

(87) PCT Pub. No.: WO2017/103029
PCT Pub. Date: Jun. 22, 2017

(65) Prior Publication Data
US 2018/0280969 A1    Oct. 4, 2018

(30) Foreign Application Priority Data

Oct. 7, 2016    (GB) .................................... 1617080.5

(51) Int. Cl.
*B01L 3/00*    (2006.01)
*F04B 13/02*    (2006.01)
(Continued)

(52) U.S. Cl.
CPC ...... *B01L 3/50273* (2013.01); *B01D 17/0217* (2013.01); *B01F 13/0059* (2013.01);
(Continued)

(58) Field of Classification Search
CPC .... B01D 17/0217; F04B 13/02; F04B 19/006; F04F 1/00; B01F 15/0233;
(Continued)

(56) References Cited

U.S. PATENT DOCUMENTS 4,892,708 A * 1/1990 Wogoman ........... B01L 3/50273
356/426
6,235,531 B1 5/2001 Kopf-Sill et al.
(Continued)

FOREIGN PATENT DOCUMENTS

CA     2 925 839 A1    4/2015
DE   10 2013 20329 A1  8/2014
(Continued)

OTHER PUBLICATIONS

Ducrée, J. et al 2007 "The centrifugal microfluidic Bio-Disk platform" J. Micromech. Microeng. 17 S103-S115 (Year: 2007).*
(Continued)

*Primary Examiner* — Liam Royce
(74) *Attorney, Agent, or Firm* — Patterson Thuente Pedersen, P.A.

(57) ABSTRACT

Devices and methods for handling liquids are provided. The devices and methods make use of centrifugal forces to drive liquid flow and facilitate one or more of the mixing, metering and sequencing of liquids, for example on a microfluidic device.

3 Claims, 24 Drawing Sheets

(51) Int. Cl.
| | |
|---|---|
| *F04F 1/00* | (2006.01) |
| *F04B 19/00* | (2006.01) |
| *B01D 17/02* | (2006.01) |
| *B01F 15/02* | (2006.01) |
| *B01F 13/00* | (2006.01) |

(52) U.S. Cl.
CPC .... *B01F 15/0233* (2013.01); *B01L 3/502723* (2013.01); *F04B 13/02* (2013.01); *F04B 19/006* (2013.01); *F04F 1/00* (2013.01); *B01F 2215/0034* (2013.01); *B01L 2200/0605* (2013.01); *B01L 2200/0621* (2013.01); *B01L 2200/0684* (2013.01); *B01L 2200/16* (2013.01); *B01L 2300/0803* (2013.01); *B01L 2300/0806* (2013.01); *B01L 2300/0883* (2013.01); *B01L 2300/14* (2013.01); *B01L 2400/0409* (2013.01)

(58) Field of Classification Search
CPC .......... B01F 13/0059; B01F 2215/0034; B01L 3/50273; B01L 2200/0621; B01L 2200/0605; B01L 2200/16; B01L 2200/14; B01L 2400/0409; B01L 2300/0883; B01L 2300/0806; B01L 2300/08
See application file for complete search history.

(56) References Cited

U.S. PATENT DOCUMENTS

| | | | |
|---|---|---|---|
| 6,527,432 B2* | 3/2003 | Kellogg | ................ B01F 5/0647 366/182.1 |
| 8,221,701 B2 | 7/2012 | Cho et al. | |
| 2005/0199500 A1 | 9/2005 | Gason et al. | |
| 2009/0053108 A1 | 2/2009 | Cho et al. | |
| 2009/0075801 A1* | 3/2009 | Hodko | ................ B01L 3/50273 494/22 |
| 2016/0144363 A1* | 5/2016 | Lin | ..................... B01L 3/50273 436/180 |

FOREIGN PATENT DOCUMENTS

| | | |
|---|---|---|
| EP | 2 817 519 A1 | 12/2014 |
| WO | WO 2013/124258 A1 | 8/2013 |
| WO | WO 2017/0103029 | 6/2017 |

OTHER PUBLICATIONS

PCT International Search Report and Written Opinion for PCT/EP2016/081320, dated May 12, 2017, 26 pgs.
Robert Gorkin et al: "Pneumatic pumping in centrifugal microfluidic platforms". Microfluibics and Nanofluidics, Springer, Berlin, DE, vol. 9, No. 2-3, Feb. 17, 2010 (Feb. 17, 2010), pp. 541-549, XP0/9811154, ISSN: 1613-4990.
Search Report dated Nov. 7, 2016 for Portuguese Application No. 109453, 6 pages.
Steffen Zehnle et al., "Microfluidic Centrifugo-Pneumatic Siphon Enables Fast Blood Plasma Extraction With High Yield and Purity", 16th International Conference on Miniaturized Systems for Chemistry and Life Sciences, Oct. 28-Nov. 1, 2012, Okinawa, Japan, 3 pages.
Application and File History for U.S. Appl. No. 14/007,812 filed Sep. 26, 2013, inventor(s) Tânia Tenreiro et al.
Portugal Search Report for PTA 2016109660, dated Oct. 3, 2017, 4 pages.

* cited by examiner

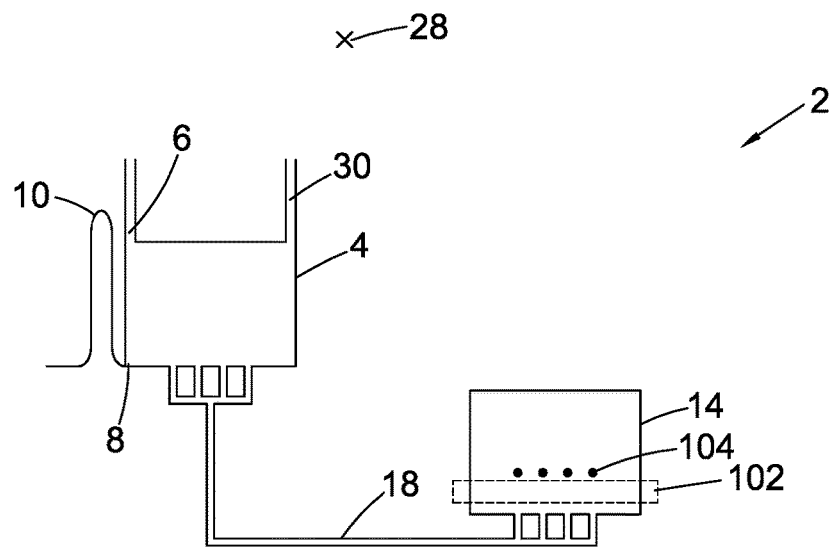
Fig. 6
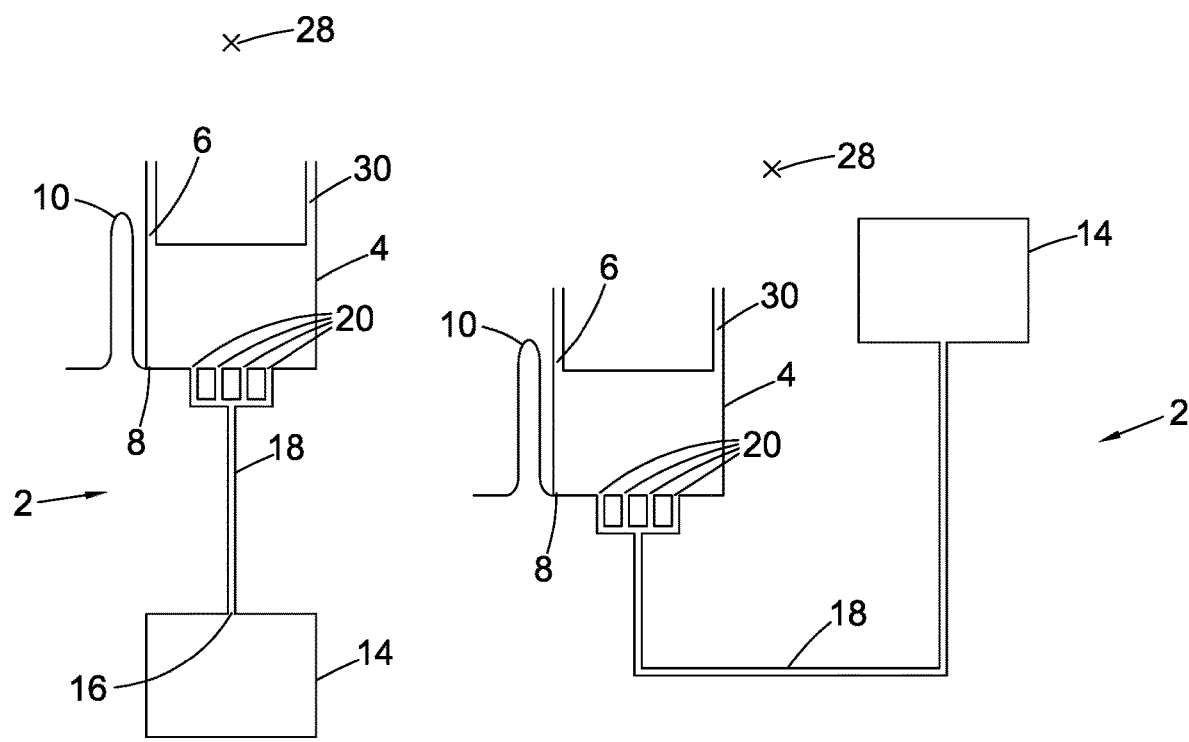
Fig. 7a
Fig. 7b

METHOD FOR HANDLING LIQUID USING CENTRIFUGAL FORCE

RELATED APPLICATIONS

This application is a National Phase entry of PCT Application No. PCT/EP2016/081320, filed Dec. 15, 2016, which claims priority from Great Britain Application No. 1522227.6, filed Dec. 16, 2015, Portugal Application No. 109036, filed Dec. 16, 2015, Portugal Application No. 109660, filed Oct. 7, 2016, and Great Britain Application No. 1617080.5, filed Oct. 7, 2016, the disclosures of which are hereby incorporated by referenced herein in their entirety.

FIELD OF THE INVENTION

The present invention relates to a device for handling liquid and, in particular, to a device for the mixing of one or more liquids, the resuspension of reagents and/or the filling of detection chambers. More particularly, though not exclusively, the present invention relates to a microfluidic device, for example a centrifugal microfluidic device.

BACKGROUND

Devices known as 'lab on a disc' devices allow the mixing, sequencing, and control of volumes of liquids. The liquid may be caused to flow through such a device under the action of centrifugal force, by rotating the device about an axis of rotation. Alternatively, liquid flow in the device may be induced by other means, for example pressure-driven flow and capillary driven flow.

Processing of liquid on a 'lab on a disc' device may require the mixing of a liquid, for example a liquid comprising two or more components, or the resuspending of one or more dry reagents in a liquid. In the case of microfluidic devices in particular, achieving effective mixing of two liquids, or a liquid and a dry reagent, can be a challenge, particularly when dealing with the small volumes of liquid that are typically used with microfluidic devices. It would therefore be useful to have structure which facilitates the effective mixing of a liquid on such a device.

SUMMARY

Aspects of the disclosure are set out in the independent claims. Further, optional features of embodiments are set out in the dependent claims.

In some embodiments, there is provided a device for handling liquid, the device being conSUBd for rotation about an axis of rotation. The device comprises a first cavity, which may be, for example, a chamber, a channel, or a network of channels. The first cavity comprises a proximal portion radially inwards of a distal portion. The first cavity comprises a first port, which is disposed in the distal portion. The device further comprises a second cavity, which may be, for example, a chamber, a channel or a network of channels, which comprises a proximal portion radially inwards of a distal portion. The second cavity comprises a second port, which is disposed in the distal portion. A first conduit structure connects the first and second ports to guide liquid flow therebetween. The second port is radially outwards of the first port. The second cavity is configured such that as liquid flows into the second cavity, a gas volume is trapped in the second cavity and a pressure of the gas increases. In other words, the only fluid flow path into and out of the second cavity is via the second port.

In use, as a preliminary step, liquid is transferred into the first cavity. This may be done under the action of centrifugal force, by capillary action or otherwise. When the device is rotated, liquid in the first cavity flows out of the first cavity via the first port, into the conduit structure and, optionally, into the second cavity. By configuring the second cavity such that the only fluidic flow path into and out of the second cavity is via the second port, as liquid flows down the first conduit structure, towards the second cavity, gas which is present in the first conduit structure and the second cavity is displaced and trapped in the second cavity. As liquid flows, the pressure of the trapped gas increases until the gas pressure balances the centrifugal pressure on the liquid. When the device is then slowed or stopped, reducing the centrifugal pressure, the trapped gas expands and forces liquid back along the first conduit structure and, in some embodiments, back into the first cavity. This process of acceleration and deceleration may be repeated in order to mix the liquid.

It should be understood that the first cavity may comprise other ports, inlets or outlets, which may not be pertinent to the flow or mixing configurations described above.

In some embodiments, the device comprises a downstream cavity and an outlet conduit connecting an outlet port of the first cavity to an inlet of the downstream cavity. The downstream cavity may be a chamber, for example. The outlet conduit extends radially inwards of the outlet port to a first bend and radially outwards of the first bend to the inlet of the downstream cavity. The first bend is disposed radially inwards of a radially-outermost aspect of the first cavity and radially outwards of a radially-innermost aspect of the first cavity.

Advantageously, this structure facilitates the control of the volume of liquid which is transferred into the downstream cavity from the first cavity. Due to the balance between the pressure in the second cavity and the centrifugal force, the liquid level in the first cavity can be controlled, enabling both the start of liquid flow into the downstream cavity (the time at which liquid in the first cavity rises above the first bend) and the volume (the liquid present in the first cavity after that) to be controlled, as discussed in detail below. This concept is explained in greater detail with reference to FIGS. 10a to 10g.

In some embodiments, the outlet conduit extends radially outwards of the outlet port to a second bend and radially inwards of the second bend to the first bend. In such embodiments, the first bend is downstream of the second bend. In other embodiments the first bend is upstream of the second bend.

Advantageously, the resulting U-bend reduces the risk of siphon re-priming after the first operation (i.e. to prevent liquid overcoming the crest of the outlet conduit after liquid has been transferred into the downstream cavity). Typically, the radially outward u-bend remains filled with liquid after liquid has been transferred into the downstream cavity and thus inhibits further liquid to re-prime both the inwards and outwards bends (i.e. the first and second bends) at a later stage in the protocol during further accelerations and decelerations.

In some embodiments, the first cavity has a first radial region extending radially inward and outward of the first bend of the outlet conduit and a second radial region which is radially outward of the first radial region in which the outlet port of the first cavity is disposed. A cross-sectional area of the first cavity in the first radial region is smaller than a cross-sectional area of the first cavity in the second radial region. This structure facilitates better control of the time at which liquid is transferred from the first cavity into the downstream cavity, as will be explained in greater detail below, with reference to FIG. 10f. In some embodiments, the cross-sectional area of the first cavity in the first radial region is reduced relative to the cross sectional area of the first cavity in the second radial region by one or more pillars disposed in the first cavity. Alternatively or additionally, the cross sectional area of the first cavity in the first radial region is, in some embodiments, reduced relative to the cross sectional area of the first cavity in the second radial region by a reduction in a circumferential extent of the first cavity in the first radial region and/or a reduction in depth of the first cavity (i.e. the dimension of the first cavity parallel to the axis of rotation) in the first radial region. For example, there may be a step change in the circumferential extent of the first cavity between the first and second regions and/or a step change in the depth of the first cavity between the first and second regions. In some embodiments, a radial extent of the first radial region radially inward of the first bend of the outlet conduit is less than a radial extent of the second radial region.

In some embodiments, the outlet port may be separate from the first port. In other embodiments, the first port and the outlet port are the same, for example the first cavity may comprise a single port which is in fluidic communication with both the second cavity (via the first conduit structure) and the downstream cavity (via the outlet conduit).

Put differently, in some embodiments there is provided a device for handling liquid and the device is configured for rotation about an axis of rotation and comprises a first vented chamber with a first port and a second unvented chamber with a second port. Each of the first vented chamber and the second unvented chamber comprise a proximal portion radially inwards of a distal portion. The first and second ports are disposed in the respective distal portions of the first and second chambers and the second port is radially outwards of the first port. The device further comprises a first conduit structure connecting the first and second ports to guide liquid flow there between.

In some embodiments, the device comprises a downstream vented chamber and an outlet conduit connecting an outlet port of the first vented chamber to an inlet of the downstream vented chamber. The outlet conduit extends radially inwards of the outlet port to a first bend and radially outwards of the first bend to the inlet of the downstream vented chamber. The first bend is disposed radially inwards of a radially-outermost aspect of the first vented chamber and radially outwards of a radially-innermost aspect of the first vented chamber.

It will be understood that the terms "vented" and "unvented" as used herein are used such that a vented chamber is connected to the atmosphere external to the device or a closed air circuit so that pressure can equilibrate as liquid flows in or out of respective inlet and outlet ports of the vented chamber. Conversely, an unvented chamber is neither connected to external air nor to a closed air circuit such that, once liquid fills any inlet and outlet ports of the unvented chamber any difference in respective flow rates in and out of the unvented chamber leads to a change in gas pressure in the unvented chamber. In other words, in an unvented chamber the only fluid flow paths in or out of the unvented chamber are through one or more liquid ports part of a liquid flow circuit of the device.

It will be understood that the cavities referred to herein may be described as vented or unvented, as the case may be. For example, the second cavity described above may be described as "unvented" and, in some embodiments, the first and downstream cavities may be described as "vented".

In some embodiments, an unvented chamber has only a single port for the inlet and outlet. Once liquid fills this port, as liquid enters the chamber, a gas pressure in the chamber increases.

In some embodiments, the second port, of the second cavity, is disposed on a radially-outermost aspect of the second cavity. As mentioned above, liquid flows from the first cavity along the first conduit structure under the action of centrifugal force. If it advances far enough in order to enter the second cavity, the location of the second port with respect to the second cavity becomes relevant. The second port being disposed on a radially-outermost aspect of the second cavity means that when the second cavity fills with liquid, it fills from it radially-outermost aspect radially inwards. As a result, gas in the second cavity is displaced further radially-inwards by the liquid entering the second cavity. In other words, as the second cavity fills, there is always liquid between the second port and the volume of trapped gas. Then, when the device is slowed or stopped, the gas expands and it is the liquid (rather than any gas) which exits the cavity first. In other words, the air ballast is maintained and no air is able to escape the second cavity before it has been emptied of liquid.

As mentioned above, the second port is radially outwards of the first port. There are a number of possible ways to position the second cavity relative to the first cavity such that the second port is radially outwards of the first port. In some embodiments, the second cavity may be radially outwards of the first cavity. In other words, a radially-innermost aspect of the second cavity may be radially outwards of a radially-outermost aspect of the first cavity. In some embodiments, the second cavity may be radially outwards of the first port. In other words, a radially-innermost aspect of the second cavity may be radially outwards of the first port.

Equally, there may be some overlap between the radial extents of the first and second cavities. As mentioned above, in some embodiments the first and second cavities each comprise a proximal portion radially inwards of a distal portion of the respective cavity. In some embodiments, the distal portion of the second cavity may be radially outwards of the first cavity. In some embodiments, a portion of the second cavity may be radially outwards of at least a portion of the first cavity. In some embodiments, the second port may be radially outwards of a portion of the first cavity. In particular, the second port may be radially outwards of the proximal portion and optionally the distal portion of the first cavity.

In some embodiments, the first cavity comprises a first plurality of ports, the first plurality of ports comprising the first port. The conduit structure connects the first plurality of ports to the second cavity. As mentioned above, liquid can be moved back and forth between the first and second cavities through the conduit structure by accelerating and decelerating the device. By configuring the first cavity so as to have multiple ports, when liquid flows back into the first cavity from the conduit structure, it does so via multiple ports. Forcing the liquid back into the cavity at multiple ports (as opposed to just one) facilitates the further mixing of the liquid as it promotes intermingling by multiple splitting and recombining events within the liquid. In some embodiments, the first port or the plurality of ports are disposed in the distal portion of the first cavity, for example in a radially-outermost aspect of the first cavity.

In some embodiments, two or more of the first plurality of ports may be disposed adjacent to one another, for example on the same wall of the first cavity. This may be a radially-distal wall of the cavity, for example.

In some embodiments, the second cavity comprises a second plurality of ports, the second plurality of ports comprising the second port. The conduit structure connects the second plurality of ports to the first cavity. In the same way as described above, configuring the second cavity to have multiple ports further facilitates mixing of the liquid. In some embodiments, the second plurality of ports may be disposed in the distal portion of the second cavity, for example in a radially-outermost aspect of the second cavity. It will be appreciated that one or both of the first and second cavities may have a plurality of ports. In some embodiments, as mentioned above, one or both of the first and second cavities may only have one port.

In some embodiments, the first conduit structure comprises a common conduit portion configured such that, in use, liquid flow from two or more of the first plurality of ports and/or two or more of the second plurality of ports is combined in the common conduit portion. For example, in some embodiments, any liquid which is transferred from the first cavity into the second cavity flows through the common portion. In particular, in some embodiments, any liquid which is transferred from the first cavity into the second cavity via the first and second pluralities of ports flows through the common conduit portion. The conduit structure may comprise a branched structure at one or both of its ends (depending on which, if either, of the first and second cavities have multiple ports). In other words, the common conduit structure may branch into a plurality of conduit portions at one or both of its ends. Each conduit portion may be in communication with a port of the first or second cavity. Taking the example of the first cavity having multiple ports, the conduit structure may comprise a plurality of conduit portions, each in communication with one of the first plurality of ports. These conduit portions are connected to the common conduit portion, which may be, for example, a single channel. In other words, the common portion may branch, in any which way, into a plurality of conduit portions to connect the some or all of the plurality of ports of the first cavity to the second cavity. In embodiments where the second cavity has a plurality of conduits, the conduit structure may have a similar, branched structure at the second cavity, in communication with some or all of the ports of the second cavity.

In some embodiments, the first conduit structure may comprise single channel which branches into a plurality of conduit portions. In some embodiments, two or more of the conduit portions may recombine, downstream of the two or more conduit portions, into a single channel. In some embodiments, the first conduit structure may comprise a single channel which branches into a plurality of conduit portions and then recombines into a single channel again, in order to further promote mixing of the liquid. Equally, however, in embodiments where both the first and second cavities have a plurality of ports, the conduit structure may comprise a plurality of individual channels or conduits, which each connect one port on the first cavity to one port on the second cavity. The number of ports on the first and second cavity may be different or the same. In the case where the number of ports is different between the cavities, the conduit structure may branch into any number of conduit portions in order to connect the ports of the first cavity to the ports of the second cavity.

In some embodiments, one or more reagents, for example dry reagents, are contained in one or more of the first cavity, the second cavity and the first conduit structure.

In some embodiments, the second cavity contains one or more reagents. For example, the second cavity may contain one or more dry reagents. Thus, the liquid can be caused to enter the second cavity and mix with the reagents, or, in the case of dry reagents, resuspend them. Liquid can then be moved back and forth between the cavities as described above in order to mix the one or more reagents with the liquid.

In some embodiments, the second cavity comprises a portion which is radially outwards of the one or more dry reagents. In other words, there is a radial extent of the second cavity between the one or more ports of the second cavity and the one or more dry reagents which does not comprise any reagents. In this way, liquid can be caused to enter the second cavity without advancing far enough in the second cavity to come into contact with the one or more reagents. In particular, liquid can be moved back and forth between the first and second cavities one or more times in order to mix it, by accelerating and decelerating the device between first and second rotational frequencies. Subsequently, the device can be rotated at a third rotational frequency greater than the first rotational frequency, thus urging the liquid further into the second cavity (in particular further radially inwards inside the second cavity) such that the liquid comes into contact with the one or more dry reagents and they are resuspended in the liquid. Additionally or alternatively, the first cavity may comprise one or more reagents, for example dry reagents.

The above-described embodiments have each been described as having a second cavity configured such that as liquid flows into the second cavity, a gas volume is trapped in the second cavity and a pressure of the gas increases. As mentioned above, such a cavity may comprise a network of channels. In such embodiments, the first conduit structure connects the first port (or the first plurality of ports) of the first cavity to a second port (or second plurality of ports) of the network of channels. The network of channels is configured such that as liquid flows into the network of channels, a gas volume is trapped in the network of channels and a pressure of the gas increases.

A network of channels may comprise a first plurality of conduits aligned in a radial direction and a second plurality of conduits aligned in a circumferential direction. The first and second plurality of conduits may intersect one another at a number of points. In other words, the conduits may have a grid formation.

In some embodiments, the points of intersection of radially-aligned conduits with a first circumferentially-aligned conduit may be offset from the points of intersection of radially-aligned conduits with a second circumferentially-aligned conduit, adjacent to the first.

A method in line with those described above can be employed with such embodiments to move liquid back and forth between the first cavity and the network of channels in order to mix a liquid or resuspend one or more dry reagents in a liquid.

As mentioned briefly above, in some cases, where liquid advances far enough through the structure so as to enter the second cavity, when the device is slowed or stopped and liquid is forced out of the second cavity, it may be advantageous to retain some liquid in the second cavity. In particular, this may be done in order to carry out further processing on a portion of the liquid after it has been mixed. For example, the liquid could be imaged or characteristics of the liquid otherwise measured, e.g. by obtaining a transmission or reflection spectrum of the liquid or by photometry. Various structures and cavity shapes which facilitate the retaining of a portion of the liquid in the second cavity (or air ballast structure) are set out below.

In some embodiments, the second cavity comprises a liquid-retaining portion. At least a portion of a wall of the second cavity which is disposed between the liquid-retaining portion and the second port extends radially inwards. Advantageously, there is therefore a potential barrier, at least when the liquid is under the action of a centrifugal force, that the liquid in the liquid-retaining portion would need to overcome in order to exit the second cavity. In some embodiments, a wall of the second cavity extends radially outwards from the second port.

In a first example, a wall of the second cavity extends radially inwards to connect to the second port. The wall may extend directly radially inwards from a radially-distal wall of the second cavity to connect to the second port. In other words, the port is in a side-wall between distal and proximal aspects of the second cavity. Liquid in the radially-outermost aspect of the cavity would thus need to flow radially-inwards, against the action of centrifugal force in order to exit the second cavity.

In a second example, the second cavity further comprises a mixing portion. The liquid retaining portion is separated from the mixing portion by a portion of a wall of the second cavity which extends radially inwards of the mixing portion to a first radial position and radially outwards of the first radial position to the liquid-retaining portion. This is another way of providing a potential barrier between the liquid-retaining portion and the second port. In this configuration, the second port is disposed on the mixing portion, for example configured on a radially-outermost aspect of the second cavity. Once the liquid level in the second cavity reaches the first radial position (see above), the liquid overflows into the liquid retaining portion. Thus, when the device is slowed or stopped and liquid is forced out of the second cavity by the expansion of the trapped gas, liquid is still retained in the liquid-retaining portion.

In some embodiments, the second cavity is a detection chamber. In particular, at least a portion of an external surface of the detection chamber may be configured so as to transmit a beam of light incident on the surface, in particular in a region where liquid is retained. For example, the surface may be transparent or translucent.

In some embodiments, the second cavity may comprise a first portion and an overflow portion, wherein the overflow portion is separated from the first portion by a portion of a wall of the second cavity which extends radially inwards from the first portion to a first radial position and radially outwards of the first radial position to the overflow portion. Thus, when liquid flows into the second cavity and fills, liquid will flow into the overflow portion once the liquid level reaches the first radial position. As such, a well-defined volume of liquid will be retained in the first portion.

The first portion has a distal portion radially outwards of a proximal portion and the distal portion has a greater circumferential extent than the proximal portion. This is to increase the volume of the first portion (and the second cavity more generally) for the same radial extent of the second cavity (which may be restricted due to limited space on the device, particularly in a radial direction). There is a step change in circumferential extent between the proximal and distal portions.

It will be understood that the first portion may equally have other shapes. For example, the circumferential extent of the first portion may increase linearly in a radial direction.

The above-described embodiments facilitate mixing of a liquid by moving it back and forth between a first cavity and a second cavity. The principles of the present disclosure may also be applied in order to move liquid into and out of a second cavity and also into and out of a third cavity. For example, this may be employed in order to mix a first portion of a liquid with a first reagent and transfer it into a second cavity (e.g. a chamber) for subsequent detection processes and to mix a second portion of the liquid with a second reagent and transfer it into a third cavity (e.g. a chamber) for subsequent detection processes.

To this end, a device can be configured as follows. In brief, the device comprises a further conduit structure and cavity, as described above with reference to the first conduit structure and the second cavity.

In some embodiments, the device further comprises a third cavity with a third port, the third cavity having a proximal portion radially inwards of a distal portion. The device further comprises a second conduit structure to provide a fluid flow path between the first cavity and the third port. The second conduit structure may be entirely separate from the first conduit structure, or the two conduit structures may overlap. For example, the second conduit structure may follow on from the first conduit structure or they may be otherwise connected.

In some embodiments, the second conduit structure is connected to the first conduit structure, such that liquid from the first cavity flows to the second conduit structure via at least a portion of the first conduit structure. Alternatively, the first and second conduit structures may each be connected to a port or a group of ports on the first cavity and may otherwise be separate from each other. For example, the second conduit structure may connect the first port to the third port to provide a fluid flow path therebetween.

The device is configured such that the only fluidic flow path into and out of the third cavity is via the third port. In other words, the third cavity is configured such that as liquid flows into the third cavity, a gas volume is trapped in the third cavity and a pressure of the gas increases. The third port is radially outwards of the first port. The third port may, in some embodiments, be disposed in the distal portion of the third cavity. In other embodiments, the third port may be disposed in the proximal portion of the third cavity. For example, the third port may be disposed in a radially-innermost aspect of the third cavity.

The third cavity comprises a liquid-retaining portion, wherein at least a portion of a wall of the third cavity which is disposed between the liquid-retaining portion and the third port extends radially inwards. In some embodiments, a wall of the third cavity extends radially outwards from the third port.

The third cavity may be configured in any of the ways described above with reference to the second cavity, as long as it has a liquid retaining portion. In particular, a wall of the third cavity may extend radially outwards from the third port. Equally, the second conduit structure may be configured in any of the ways described above, with reference to the first conduit structure.

In some embodiments, the device may comprise a siphon in between the first and second conduit structures. A siphon comprises an upstream, radially-inwards extending portion, a downstream, radially outwards extending portion and a crest in between the upstream and downstream portions. The siphon is configured such that the crest of the siphon is radially-inwards of a liquid level in the first cavity. To achieve this, the crest of the siphon may be disposed radially-inwards of a radially-innermost aspect of the first cavity. A siphon may be used to halt the flow of liquid until the device is stopped, i.e. it is no longer being rotated. An advantage of this, in the embodiments in which the device has both a second cavity and a third cavity, is that liquid can be moved in and out of the second cavity to mix it, whilst liquid is prevented from reaching the third cavity by a siphon valve. The device can then be stopped or slowed to allow the siphon to prime and liquid can then be transferred back and forth, into and out of the third cavity in line with the method described above. In this way, portions of a liquid (or optionally, liquids from different cavities) can be mixed with reagents in series, one after the other. In order to allow the siphon to prime, the second conduit structure comprises a vent.

In particular, in some embodiments, one or both of the first and second conduit structures comprises a first reagent chamber containing one or more reagents. The first reagent chamber comprises a distal portion which is radially outwards of a proximal portion. The first reagent chamber has a first port via which the reagent chamber is filled with liquid from the first chamber. The first port of the reagent chamber is positioned in the distal portion. For example, the first port may be positioned at a radially-outermost aspect of the reagent chamber.

Positioning the port of the reagent chamber at a distal, for example radially-outermost aspect of the reagent chamber is advantageous for similar reasons as described above, with reference to filling of the second cavity or air ballast structure from a radially-outermost aspect.

In brief, filling the reagent chamber with liquid from a distal, for example radially-outermost aspect, means that gas present in the reagent chamber is displaced radially inwards. Then, when the device is slowed or stopped and the gas trapped in the second cavity (or air ballast structure) expands and forces liquid back down the conduit structure, the gas is kept at one 'end' of the structure. In other words, the liquid is maintained as one single, continuous liquid column and there is no break in the liquid column, nor is the gas volume broken up into smaller volumes separated by liquid. However, some bubbles of gas may be present within the liquid and these may be transferred back and forth with the liquid.

In some embodiments, the device further comprises a second reagent chamber. Taking the example of the first conduit structure comprising a first reagent chamber and a second reagent chamber, the second reagent chamber is connected, by the first conduit structure, in series with the first reagent chamber. In terms of the liquid flows, liquid flows from the first cavity into the first conduit structure, through the first reagent chamber, into another portion of the first conduit structure, then through the second reagent chamber, then optionally further down the first conduit structure and optionally into the second cavity. The second reagent chamber may be configured as described above with reference to the first reagent chamber.

In some embodiments, the device may be rotated at a first rotational frequency and, under the action of centrifugal force, liquid is caused to flow into the first reagent chamber, where the one or more reagents in that first reagent chamber are resuspended in the liquid. The device may then be slowed, or stopped, such that liquid is forced back into the first cavity and the acceleration and deceleration process repeated to mix the liquid with the one or more reagents. The device may then be accelerated further, such that liquid is urged further along the conduit structure, into the second reagent chamber, where the one or more reagents in the second reagent chamber are resuspended in the liquid. A further mixing step of acceleration and deceleration may then be carried out. In this way, serial resuspension of a first reagent or first set of reagents (in the first reagent chamber) followed by a second reagent or second set of reagents (in the second reagent chamber) can be carried out.

In some embodiments, a second reagent chamber may instead be connected, by a branch of the first conduit structure, in parallel with the first reagent chamber. For example, the first conduit structure may comprise a common conduit portion which branches into two parallel conduit portions, each comprising a reagent chamber. In terms of liquid flows, liquid flows from the first cavity, into the first conduit structure. A portion of the liquid would enter the first conduit portion and flow through the first reagent chamber and another portion of the liquid would enter the second conduit portion and flow through the second chamber. In some embodiments, the two parallel conduit structures may recombine into a single, common conduit portion on the other side of the reagent chambers. Alternatively, the two conduit portions may be attached to two separate ports of the second cavity, or may be connected to two separate cavities.

Equally, in some embodiments, the second conduit structure may comprise a first reagent chamber and optionally a second reagent chamber connected in series or in parallel with the first reagent chamber as described above. It should be understood that the device may comprise any number of reagent chambers which may be connected, by the conduit structure, in parallel and/or in series with each other. Additionally or alternatively, reagents, in particular dry reagents, may be provided elsewhere in the structure. For example, the channel-like portions of the conduit structure may contain one or more reagents. It should also be understood that any embodiment described above or below may comprise one or more reagent chambers in any of the ways described herein (or otherwise). For example, embodiments in which one or both of the first and second cavities have a plurality of ports and/or in which the first cavity has mixing, metering and overflow portions (as will be described below) may comprise one or more reagent chambers in the way described. They may also be employed with any type of air ballast structure, whether it be a channel, conduit, network of channels or chamber, located anywhere with respect to the first cavity.

In some embodiments, one or both of the first and second conduit structures may comprise a meandering conduit. In other words, the conduit structure has a portion with multiple bends so as to form a serpentine shape. This configuration means that the conduit has a longer length, hence improving mixing of the liquid. Like the one or more reagent chambers, this feature may also be combined with any other feature described herein. In some embodiments, one or more dry reagents are provided in the meandering conduit.

In some embodiments, the first conduit structure contains one or more dry reagents and the first conduit structure comprises a portion which is upstream of the one or more reagents.

The above-described structures relate to embodiments suited to a method in which the device is rotated at a sufficiently high rotational velocity in order to cause liquid to enter the second cavity. However, liquid can also be mixed simply by transferring liquid out of the first cavity and into a conduit structure and then out of the conduit structure and back into the first cavity, i.e. to mix the liquid, it does not necessarily need to be transferred into and out of a second cavity.

For the back and forth mixing to take place, gas must be trapped in a structure which is downstream of the liquid so that the gas acts as an air ballast. An air ballast structure which acts to contain the air ballast may take any shape and may be located anywhere with respect to the first cavity. It may be a chamber, for example, but may also be a channel-like structure which is closed off at its far end or a network of channels. As described above, in some embodiments, the same cavity acts both to contain an air ballast and as a liquid receiving cavity.

In some embodiments, a device for handling liquid is provided. The device is configured to be rotated about an axis of rotation. The device comprises a first cavity which comprises a proximal portion radially inwards of a distal portion. The first cavity comprises a first plurality of ports disposed in the distal portion of the cavity. The device further comprises an air ballast structure configured such that as liquid flows out of the first plurality of ports, a volume of gas is trapped in the air ballast structure and a pressure of the gas increases. In some embodiments the air ballast structure may be configured to contain fluid displaced by liquid flow from the first cavity.

Alternatively, the first cavity may equally only comprise only a single port. In this case, the conduit structure connects the first port to the second port, providing a fluidic communication path therebetween.

In some embodiments, the air ballast structure is a detection chamber. In some embodiments, the device may further comprise a first conduit structure connecting the first plurality of ports to the air ballast structure. In some embodiments, the first conduit structure comprises a common conduit portion configured such that, in use, liquid flow from two or more of the first plurality of ports is combined in the common conduit portion.

The above-described device may in principle be used in a similar way as that described above with reference to a device comprising a first cavity and a second cavity. In brief, when the device is rotated at a first rotational frequency, liquid flows out of the first cavity via the first plurality of ports under the action of centrifugal force. Gas is trapped in the air ballast structure and as liquid flows out of the first cavity, the pressure of the gas trapped in the air ballast structure builds up. The device is then slowed to a second rotational velocity (or stopped) and the gas in the air ballast structure expands, thus forcing the liquid back towards the first cavity and optionally into the first cavity. The liquid may or may not enter the air ballast structure. This process of acceleration and deceleration can be repeated a number of times in order to mix the liquid.

Advantageously, configuring the first cavity such that it has a plurality of ports improves mixing of the liquid. As described above with reference to the embodiments which have a first cavity and a second cavity, when liquid is forced back into the first cavity through the plurality of ports, liquid entering the cavity via one port interacts with the liquid entering via an adjacent port.

In some cases, once the liquid has been mixed in any of the ways described above, it may be desirable to meter a particular volume of the mixed liquid. As such, some embodiments provide a structure which provides such metering. To this end, in some embodiments, the first cavity comprises a mixing portion, a metering portion and an overflow portion. The mixing, metering and overflow portions are separated from each other by respective portions of a wall of the first cavity which extend radially inward to a respective radial position and radially outwards from the respective radial position. There is a fluidic flow path between the portions which is disposed between the proximal portion of the first cavity and a radially innermost aspect of the radially inward extending wall. The first port or the first plurality of ports are disposed in the mixing portion. The metering portion has an outlet conduit connected at an outlet port, the port and/or conduit being configured so as to retain liquid in the metering portion while the metering portion fills. For example, the outlet of the metering portion may be in communication with a conduit comprising a siphon valve structure or other valve structure. Liquid can be caused to flow past these structures at the desired time by controlling the rotational frequency of the device. Accordingly, once the metering portion of the first cavity has filled with liquid and contains a well-defined volume of liquid, the volume of liquid can be caused to flow on downstream to other structures.

In use, when the device is slowed such that liquid is forced back into the first cavity by a built-up gas pressure in the second cavity or the air ballast structure (as described above), the device can be slowed sufficiently to allow a sufficiently large volume of liquid back into the first cavity, such that liquid overflows into the metering portion and subsequently into the overflow portion. The metering portion has a well-defined volume and as such, a well-defined volume of liquid can be isolated from the rest of the liquid volume. This well-defined volume may then be mixed with a dilutant (otherwise known as a diluent), for example, in order to obtain a particular liquid concentration.

In some embodiments, the mixing portion and the metering portion may be the same portion. In other words, the first cavity may comprise a mixing portion and an overflow portion, separated from each other by a portion of a wall of the first cavity which extends radially inward to a respective radial position and radially outwards from the respective radial position. As well as the first port, or the first plurality of ports, the mixing portion may have an outlet conduit connected at an outlet port, the port and/or conduit being configured so as to retain liquid in the mixing portion while the mixing portion fills. For example, the outlet of the mixing portion may be in communication with a conduit comprising a siphon valve structure or other valve structure. As such, when the device is slowed or stopped and as a result, liquid is forced back into the first cavity, some of it overflows into the overflow portion, leaving a well-defined volume of liquid in the mixing portion. Liquid can be caused to flow out of the first cavity via the outlet port and outlet conduit at the desired time by controlling the rotational frequency of the device. Accordingly, once the mixing portion of the first cavity has filled with liquid and contains a well-defined volume of liquid, the volume of liquid can be caused to flow on downstream to other structures.

This configuration of the first cavity, i.e. the first cavity comprising mixing, metering and overflow portions, may be combined with a number of other features described in this description, as long as liquid can move back into the first cavity and overflow into the metering and overflow portions. For example, this particular configuration of the first cavity may comprise a plurality of ports disposed in the mixing portion. It may be combined with embodiments which have an air ballast structure shaped in any which way, positioned anywhere relative to the first cavity. The first cavity may be in fluidic communication with a second cavity as described above and the second cavity may or may not comprise a plurality of ports, also as described above. The conduit structure may also comprise one or more reagent chambers, as described above.

Further structures configured to improve mixing of a liquid (or the resuspension of one or more reagents in a liquid) are also described. In some embodiments, the first conduit structure may comprise a channel which branches into a plurality of conduit portions. Two or more of the plurality of conduit portions may then recombine into a single channel, downstream of the two or more conduit portions. This type of structure facilitates the splitting and recombining of liquid (optionally repeatedly), thus promoting mixing of a liquid and/or resuspension of one or more dry reagents in a liquid.

In other embodiments, the conduit portions may themselves branch into further, sub-branches which may (or may not) recombine into one or more channels.

In some embodiments, the second conduit structure may, alternatively or additionally, comprise a channel which branches into a plurality of conduit portions in any of the ways described above.

In a further aspect there is provided a device for handling liquid, the device being configured for rotation about an axis of rotation. The device comprise a first cavity having an outlet port and a second cavity comprising a proximal portion radially inwards of a distal portion. The second cavity has a second port disposed in the distal portion and the second cavity is configured to receive liquid from the first cavity via the second port. The second cavity is configured such that as liquid flows into the second cavity from the first cavity, a gas volume is trapped in the second cavity and a pressure of the gas increases. The device further comprises a downstream cavity and an outlet conduit connecting the outlet port of the first cavity to an inlet of the downstream cavity. The outlet conduit extends radially inwards of the outlet port to a first bend and radially outwards of the first bend to the inlet of the downstream cavity. The first bend is disposed radially inwards of a radially-outermost aspect of the first cavity and radially outwards of a radially-innermost aspect of the first cavity.

Advantageously, this structure facilitates the control of the volume of liquid which is transferred into the downstream cavity from the first cavity. Due to the balance between the pressure in the second cavity and the centrifugal force, the liquid level in the first cavity can be controlled, enabling both the start (the time at which liquid in the first cavity rises above the bend) and the volume (the liquid present in the first cavity after that) to be controlled, as discussed in detail below, in particular with reference to FIG. 10f.

In some embodiments, the outlet conduit extends radially outwards of the outlet port to a second bend and radially inwards of the second bend to the first bend.

In some embodiments, the second port is on a radially-outermost aspect of the second cavity.

In some embodiments, one or more reagents are contained in one or both of the first and second cavities. In some embodiments, the second cavity comprises a portion which is radially outwards of the one or more reagents.

In some embodiments, the second cavity comprises a liquid-retaining portion, wherein at least a portion of a wall of the second cavity which is disposed between the liquid-retaining portion and the second port extends radially inwards.

In some embodiments, a wall of the second cavity extends radially outwards from the second port. In some embodiments, the second cavity is a detection chamber. In some embodiments, the second cavity comprises a first portion and an overflow portion, wherein the overflow portion is separated from the first portion by a portion of a wall of the second cavity which extends radially inwards from the first portion to a first radial position and radially outwards of the first radial position to the overflow portion.

In some embodiments, the device is a microfluidic device. For the avoidance of doubt, the term "microfluidic" is referred to herein to mean devices having a fluidic element such as a reservoir or a channel with at least one dimension below 1 mm. The device may be configured to handle volumes of liquid on the scale of nanolitres to microlitres. Examples of liquids include whole blood, plasma, serum and urine. Examples of possible reagents include particles, buffers, salts, sugars, biologically active elements (antibodies, enzymes etc.) and polymers. In some embodiments, the device may be a disc.

In some embodiments there is provided a method of driving liquid flow in a device. The method comprises rotating the device at a first rotational frequency to transfer liquid into a first, vented, cavity of the device, and into a first conduit structure in communication with the first cavity and/or a second, unvented cavity. The method further comprises rotating the device at a second rotational frequency lower than the first rotational frequency to transfer at least some liquid from the second cavity back into the first cavity and to transfer at least some liquid from the first cavity into a downstream cavity in communication with the first cavity.

In this way, a metered volume of liquid can be separated from a volume of liquid in the first and second cavities by transferring the metered volume into the downstream chamber. In other words, the method can be used to meter a volume of liquid. Advantageously, the timing can be controlled by slowing down the device but without the need to stop the device.

The method can, for example, be implemented using the structure described above, in which the first cavity is connected to a downstream cavity by a conduit which has a first bend which is radially inwards of a radially-outermost aspect of the first cavity and radially outwards of a radially-innermost aspect of the first cavity.

In some embodiments, the method comprises, after rotating the device at the first rotational frequency and before rotating the device at the second rotational frequency, rotating the device at a third rotational frequency and subsequently a fourth rotational frequency in order to mix the liquid. The third and fourth rotational frequencies are greater than the second rotational frequency and the fourth rotational frequency is greater than the third rotational frequency. The third frequency may be the same as or different from the first frequency.

In varying the rotational frequency between the third and fourth rotational frequencies, liquid can be moved back and forth, between the first cavity and the conduit structure which is in communication with the first cavity, due to the interaction of gas pressure in the second cavity and centrifugal forces, as described below in detail. This movement of liquid back and forth may facilitate mixing of the liquid or liquids.

In some embodiments, the method comprises, subsequent to beginning to transfer liquid from the first cavity into the downstream cavity, rotating the device at a fifth rotational frequency different to the second rotational frequency to control the volume of liquid which is transferred from the first cavity to the downstream cavity.

The fifth rotational frequency may be greater than the second rotational frequency, decreasing the volume transferred or may be less than the second rotational frequency, increasing the volume transferred. Thus, advantageously, the metered volume can be controlled by controlling a rate of rotation of the device.

As well as methods of metering, methods of mixing liquid in a device are provided by the present disclosure, as will now be described.

In some embodiments, a method of mixing a liquid in a device is provided. Mixing a liquid in a device may include mixing two or more liquids or two or more components of a liquid. The method comprises rotating the device to split a liquid column into a plurality of liquid columns and changing the rotational frequency to recombine the liquid columns. In some embodiments, changing the rotational frequency to recombine the liquid columns includes reducing the rotational frequency. In some embodiments, changing the rotational frequency to recombine the liquid columns includes increasing the rotational frequency. In some embodiments, the device is not stopped (i.e. the rotational frequency of the device is not reduced to zero) in between rotating the device to split the liquid column into a plurality of liquid columns and changing the rotational frequency to recombine the liquid columns.

In other words, in some embodiments, the method comprises rotating the device at a first rotational frequency to split a liquid column into a plurality of liquid columns and rotating the device at a second rotational frequency to recombine the liquid columns. In some embodiments, the first rotational frequency is greater than the second rotational frequency. In other embodiments, the second rotational frequency is greater than the first rotational frequency. In some embodiments, the device is not stopped (i.e. its rotational frequency is not reduced to zero) in between rotating the device at the first and second rotational frequencies.

This method may be performed using the structure of one or more of the above-described embodiments which include a conduit structure with a 'branched' portion at one or both of its ends which connects a common conduit portion to a plurality of ports of a cavity (or a plurality of conduit portions). Equally, the method may be performed using the structure of one or more of the above-described embodiments in which one or both of the first and second conduit structures comprise a channel which branches into a plurality of conduit portions, which then recombine into a single channel. The method may be implemented using any structures capable of splitting and re-combining liquid flows as liquid moves back and forth in the structure.

In some embodiments, a method of mixing a liquid and resuspending one or more dry reagents in the liquid in a device is provided. The method comprises rotating the device at a first rotational frequency and then a second rotational frequency lower that the first rotational frequency to mix the liquid. The method further comprises rotating the device at a third rotational frequency greater than the first rotational frequency to resuspend the one or more reagents in the liquid. This method can be implemented using one or more of the above-described embodiments in which reagents are provided somewhere in the structure other than the first cavity, for example in the second cavity (or air ballast structure), in particular when the second cavity (or air ballast structure) comprises a portion which is radially outwards of the one or more reagents, or in one or more reagent chambers. One or more reagents could also be provided in the conduit structure, for example in a channel or in one or more reagent chambers. In some embodiments, mixing the liquid may comprise resuspending one or more dry reagents in the liquid. In other words, this method may be used to resuspend one or more dry reagents (or groups of dry reagents) in series.

In some embodiments, a method of mixing a liquid and metering a volume of the liquid in a device is provided. The method comprises rotating the device at a first rotational frequency to transfer liquid into a first cavity of the device and into a conduit structure in communication with the first cavity. The method further comprises rotating the device at a second frequency to isolate, in the first cavity, a portion of the liquid from the rest of the liquid. The second rotational frequency is lower than the first rotational frequency. This method may be implemented using one or more of the above-described embodiments in which the first cavity includes mixing, metering and overflow portions (or only mixing and overflow portions). In some embodiments, isolating a portion of the liquid from the rest of the liquid includes isolating a well-defined volume of liquid from the rest of the liquid.

In some embodiments, the method of mixing a liquid and metering a volume of the liquid in a device comprises, after rotating the device at the first frequency and before rotating the device at the second rotational frequency, rotating the device at a third rotational frequency and subsequently a fourth rotational frequency in order to mix the liquid. The third rotational frequency is less than the first rotational frequency and greater than the second rotational frequency and the fourth rotational frequency is greater than the third rotational frequency. For the avoidance of doubt, the ordering of the four rotational frequencies is as follows:
first rotational frequency
third rotational frequency
fourth rotational frequency
second rotational frequency.

As mentioned above, in some embodiments, mixing the liquid may comprise resuspending one or more dry reagents in the liquid.

In some embodiments, a method of separating a liquid into a plurality of components (otherwise referred to as fractions or phrases) of differing densities in a device is provided. The method comprises rotating the device to cause liquid to flow from a first cavity into a second cavity and to cause a pressure of a volume of gas in the second cavity to increase. The method further comprises rotating the device to separate the liquid into a plurality of components of differing densities. The method also comprises decelerating (or slowing down) the device to cause at least a portion of the liquid to flow out of the second cavity. The portion of liquid that flows out of the second cavity is a portion of one of the components of the liquid. In other words, a portion of one of the components of the liquid is caused to flow out of the second cavity.

Such a method may be employed using the any of the structures described above in which as liquid flows into the second cavity (or air ballast) a pressure of a gas volume in the second cavity increases. In this way, liquid can be caused to flow into the second cavity (or air ballast) under the action of centrifugal force, thus building up gas pressure in the second cavity. The device can then be rotated to cause separation of the liquid into its components of differing densities. The device can then be slowed or stopped to allow the gas in the second cavity to expand, thus forcing at least a portion of one of the components of the liquid back out of the second cavity.

In some embodiments, the port of the second cavity may be positioned radially inwards of a portion of the second cavity and, in particular, radially inwards of the radial position of an interface between two components of the liquid, such that at least a portion of the lighter of the two components is caused to flow back out of the device and the denser of the two components is retained in the second cavity.

In some embodiments, the above-described method may be used to separate a volume of blood into cellular material and plasma and then cause a volume of plasma to flow out of the second cavity whilst the cellular material is retained in the second cavity.

It will be understood that many of the features and embodiments described above may be combined in a number of different ways. Particular embodiments, comprising a combination of features described above are set out below.

In some embodiments, a device comprises a first cavity with a first port and a second cavity with a second port. The second port may be radially outwards of the first port. The first and second ports are connected by a first conduit structure. The second cavity comprises a liquid retaining portion, as described above. In particular, a wall of the second cavity may extend radially outwards from the second port. The second cavity is configured such that as liquid flows into the second cavity, a gas volume is trapped in the second cavity and a pressure of the gas increases. In other words, the second cavity is configured such that the only fluid flow path into and out of the second cavity is via the second port. The first conduit structure comprises one or more reagent chambers as described above. In particular, the first conduit structure comprises a first reagent chamber containing one or more reagents. The first reagent chamber comprises a distal portion radially outwards of a proximal portion. The first reagent chamber has a first port via which the reagent chamber is filled with liquid from the first cavity. The first port of the reagent chamber is disposed in the distal portion of the chamber. For example, the first port may be positioned at a radially outermost aspect of the reagent chamber. Equally, the conduit structure may not comprise any reagent chambers, but instead may comprise a meandering conduit. In some embodiments, the meandering conduit may contain one or more dry reagents.

In some embodiments, a device comprises a first cavity with a distal portion radially outwards of a proximal portion. The first cavity comprises a first plurality of ports, disposed on the distal portion of the first cavity. For example, the first plurality of ports may be disposed on a radially-outermost aspect of the first cavity. The device further comprises a second cavity with a distal portion radially outwards of a proximal portion. The second cavity comprises a second plurality of ports, disposed on the distal portion of the second cavity. For example, the second plurality of ports may be disposed on a radially-outermost aspect of the second cavity. The second cavity is configured such that as liquid flows into the second cavity, a gas volume is trapped in the second cavity and a pressure of the gas increases. In other words, the second cavity is configured such that the only fluid flow path into and out of the second cavity is via the second plurality of ports. The device further comprises a conduit structure which connects the first plurality of ports to the second plurality of ports, providing a fluid flow path therebetween. The conduit structure comprises a common conduit portion and branches into a plurality of conduit portions at the first cavity. Each conduit portion is connected to a respective one of the first plurality of ports. The conduit structure comprises the same branched structure at the second cavity.

In some embodiments there is provided a device for handling liquid, the device being configured for rotation about an axis of rotation to drive liquid flow within the device. The device comprises a chamber and a conduit each for containing liquid. The chamber has an inlet port connected to an upstream liquid handling structure to receive liquid from the upstream liquid handling structure. The chamber also has an outlet port connected to the conduit. The conduit extends radially inward from the outlet port to a crest and radially outward from the crest. The chamber extends radially inward of the crest. The chamber has a first radial region extending radially inward and outward of the crest and a second radial region radially outward of the first radial region in which the outlet port is disposed. A cross-sectional area of the chamber in the first radial region is smaller than a cross-sectional area of the chamber in the second radial region. This structure facilitates better control of the time at which the conduit is primed (i.e. liquid flows over the crest of the conduit), as will be explained in greater detail below, with reference to FIG. 20. In some embodiments, the cross sectional area of the chamber in the first radial region is reduced relative to the cross sectional area of the chamber in the second radial region by one or more pillars disposed in the chamber. Alternatively or additionally, the cross sectional area of the chamber in the first radial region is, in some embodiments, reduced relative to the cross sectional area of the chamber in the second radial region by a reduction in a circumferential extent of the chamber in the first radial region and/or a reduction in depth of the chamber (i.e. the dimension of the chamber parallel to the axis of rotation) in the first radial region. For example, there may be a step change in the circumferential extent of the chamber between the first and second regions and/or a step change in the depth of the chamber between the first and second regions. In some embodiments, a radial extent of the first radial region radially inward of the crest is less than a radial extent of the second radial region.

For the avoidance of doubt, the term 'radially' as used herein will be understood relative to an axis of rotation of the device. Reference to mixing of a liquid may refer to mixing of a liquid volume containing two or more different liquids (e.g. a sample and a dilutant), or the mixing of a liquid with particles in suspension (for example whole blood, latex beads or other nanoparticle suspension). It may also refer to mixing of one or more liquids with one or more dry reagents, in particular to resuspending the dry reagents. Use of the terms 'upstream' and 'downstream' will be understood with respect to liquid flow under the action of centrifugal force. Use of the term 'air ballast' will be understood to refer to a volume of air entrapped in a cavity, the volume being defined by confining solid surfaces of the cavity and at least one liquid wall or plug. A cavity will be understood to be an empty space inside the device in which fluid can be contained or guided. An example of a cavity is a chamber. A cavity can also be defined by a network of channels. Further examples of cavities are a single channel (e.g. a channel closed off at one end, i.e. a channel with a dead-end), a branched channel, a multi-chamber arrangement or combinations thereof. Depending on the embodiment, any of the cavities discussed above may take any suitable form, for example a chamber, a network of channels or any of the foregoing or any combinations of the foregoing. The term "conduit structure" will be understood to be a structure through which, in use, fluid flows. For example, a conduit may connect two or more ports to guide fluid flow therebetween. A conduit structure will be understood to be a structure which guides a liquid volume between a first port and a second port without a break in the liquid volume. In other words, liquid is conducted by a conduit structure as a single, continuous volume without any breaks. Seen from a different angle, liquid advances in the conduit structure from a first port to a second port with a single meniscus advancing in the conduit. Of course, it will be appreciated that this discussion applies to liquids without trapped gas. If gas volumes or bubbles are trapped in the liquid as it advances, the corresponding menisci will of course advance together with the liquid.

In some embodiments, the device comprises a feature which defines the axis of rotation and which is configured to be coupled to a rotational element to drive rotation of the device. For example, the device may be a centrifugal disc, such as a microfluidic disc. The device, disc-shaped or otherwise, may comprise a central hole which is configured to engage with a spindle of a drive system, the spindle being coupled to a motor for driving rotation of the spindle, which in turn drives rotation of the engaged device.

BRIEF DESCRIPTIONS OF THE DRAWINGS

Embodiments are now described in detail by way of example, with reference to the accompanying drawings, in which:

FIG. 6 illustrates schematically a device for resuspending one or more dry reagents in a liquid;

FIGS. 7a and 7b illustrate schematically further devices for mixing a liquid;

Figure 9:
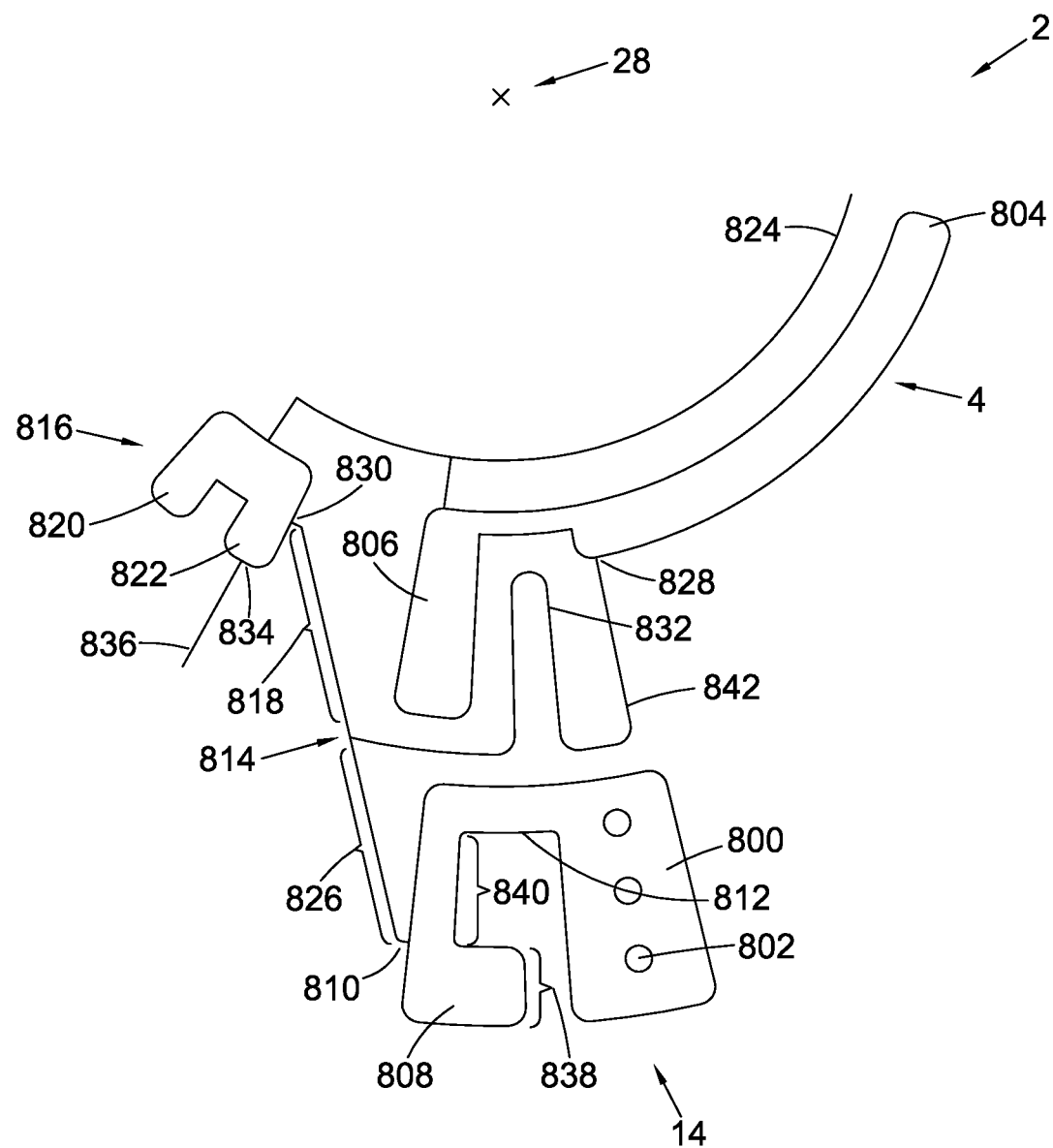
FIG. 9 illustrates a device for separating a liquid into a plurality of components of differing densities and extracting a volume of one of the components.
Figure 11A:
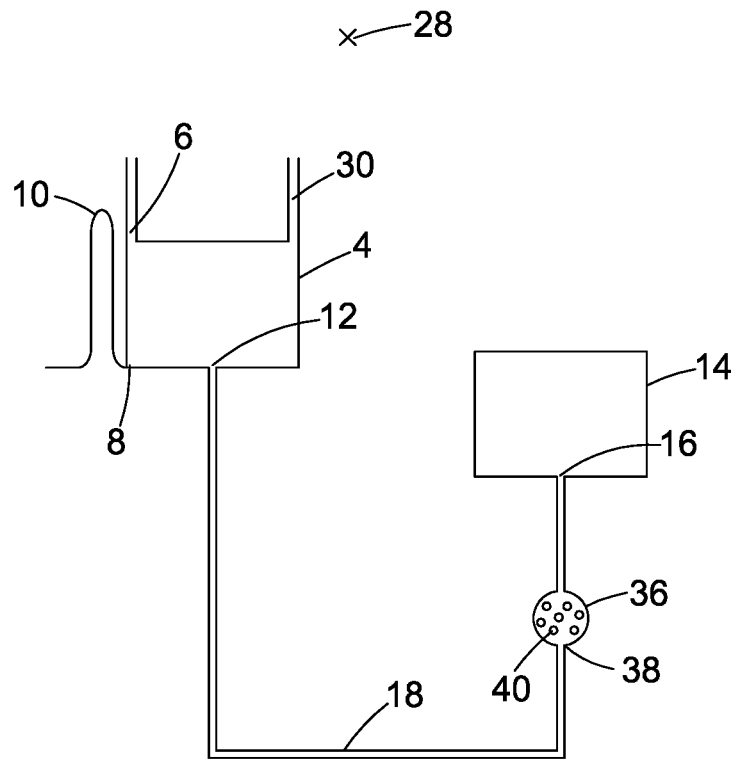
Figure 11B:
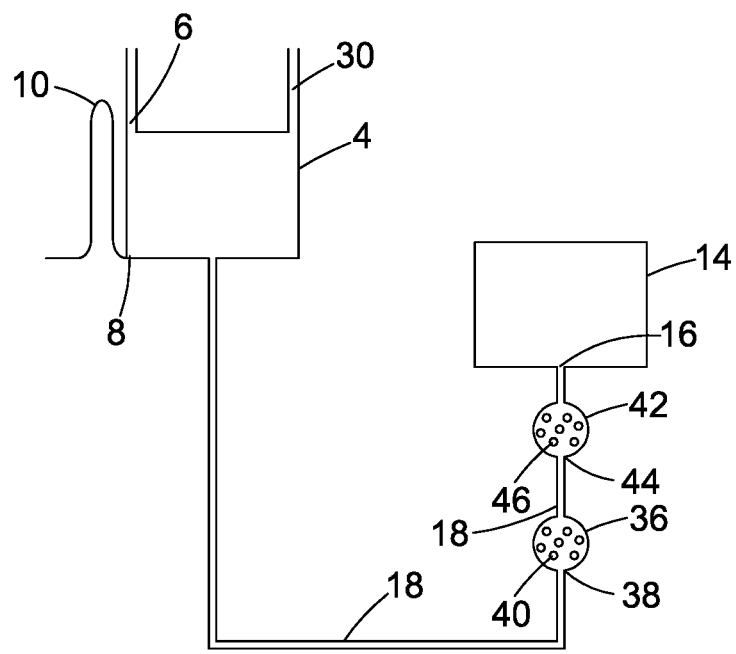
Figure 11C:
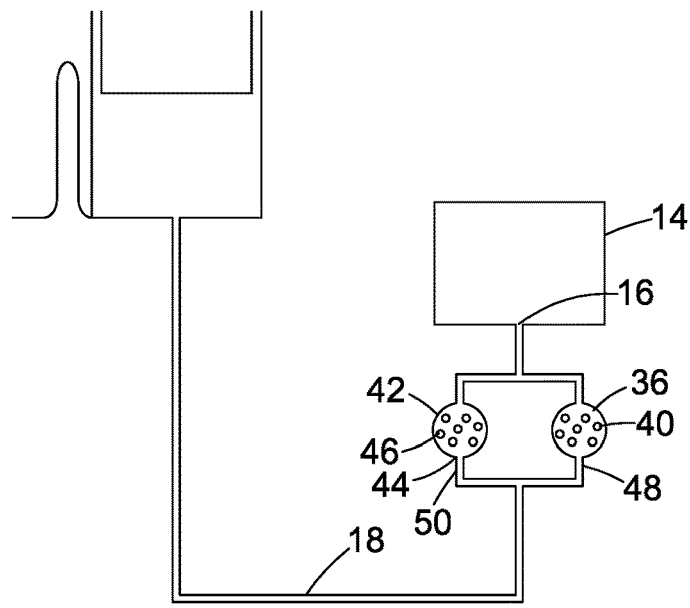
Figure 12:
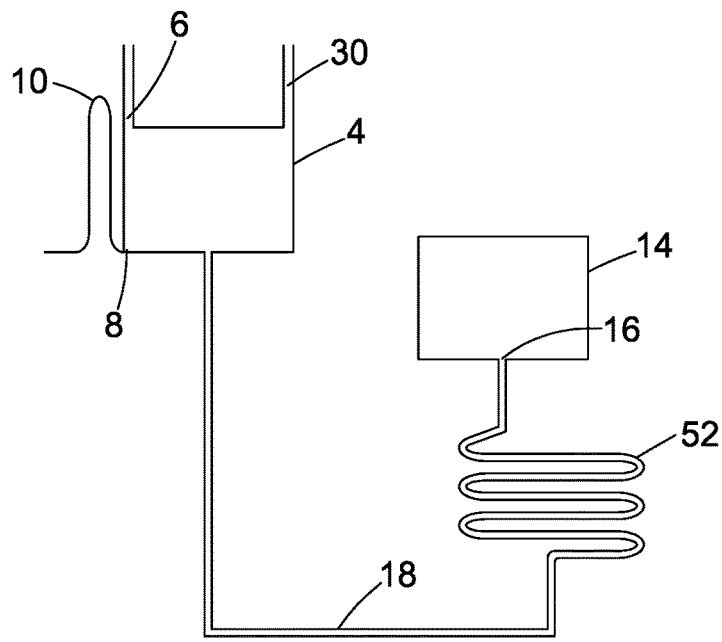
Figure 13:
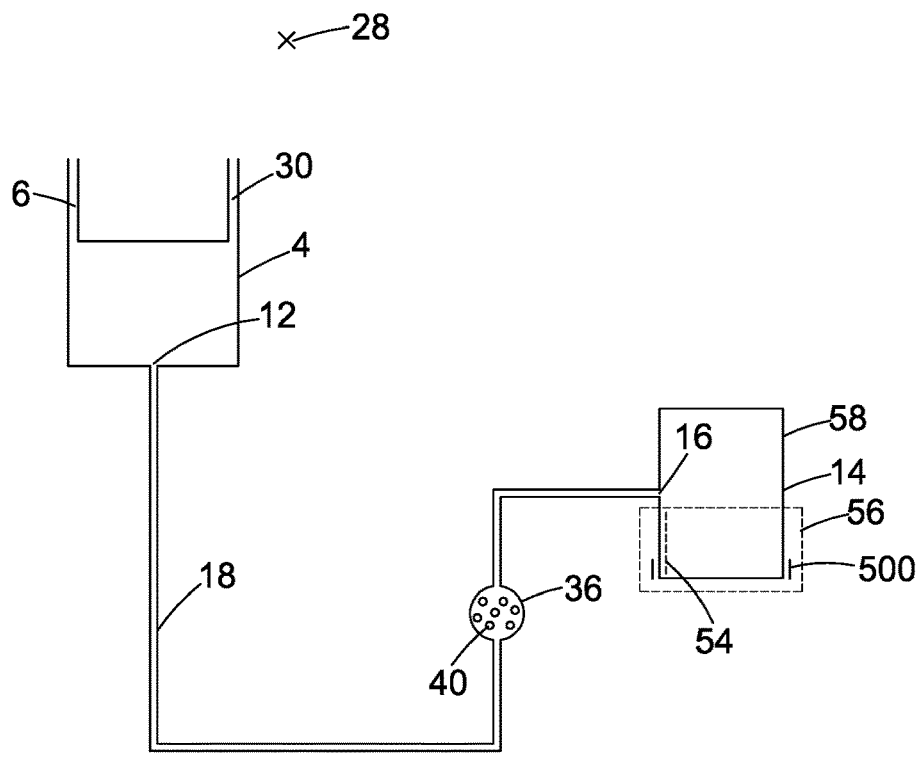
Figure 14:
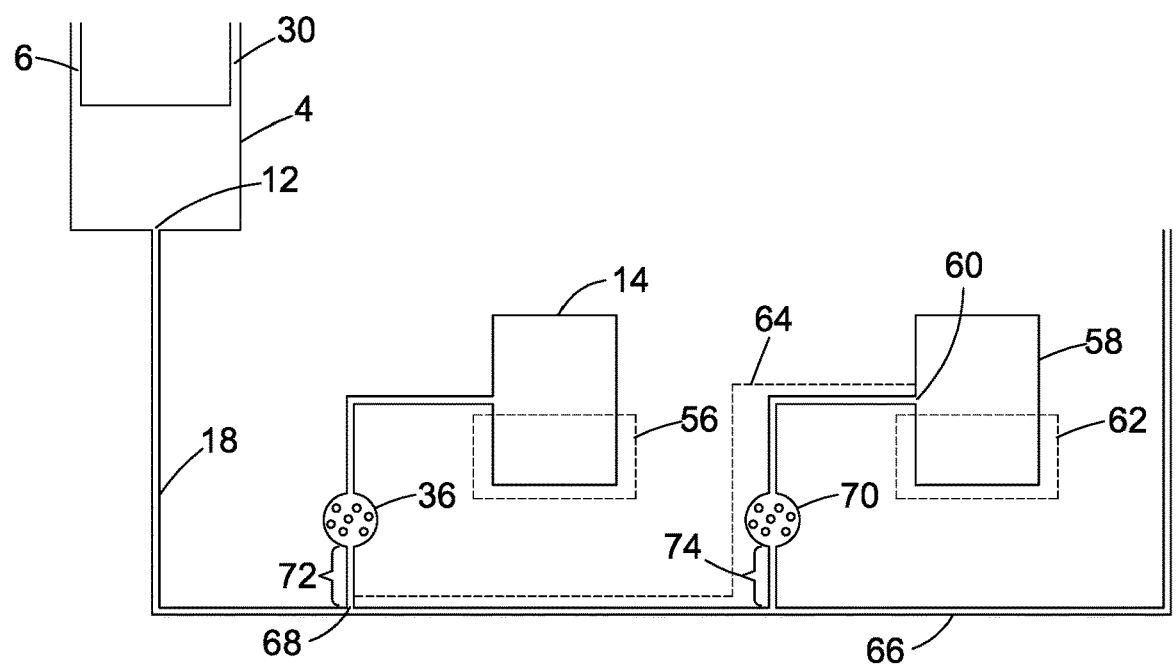
Figure 15:
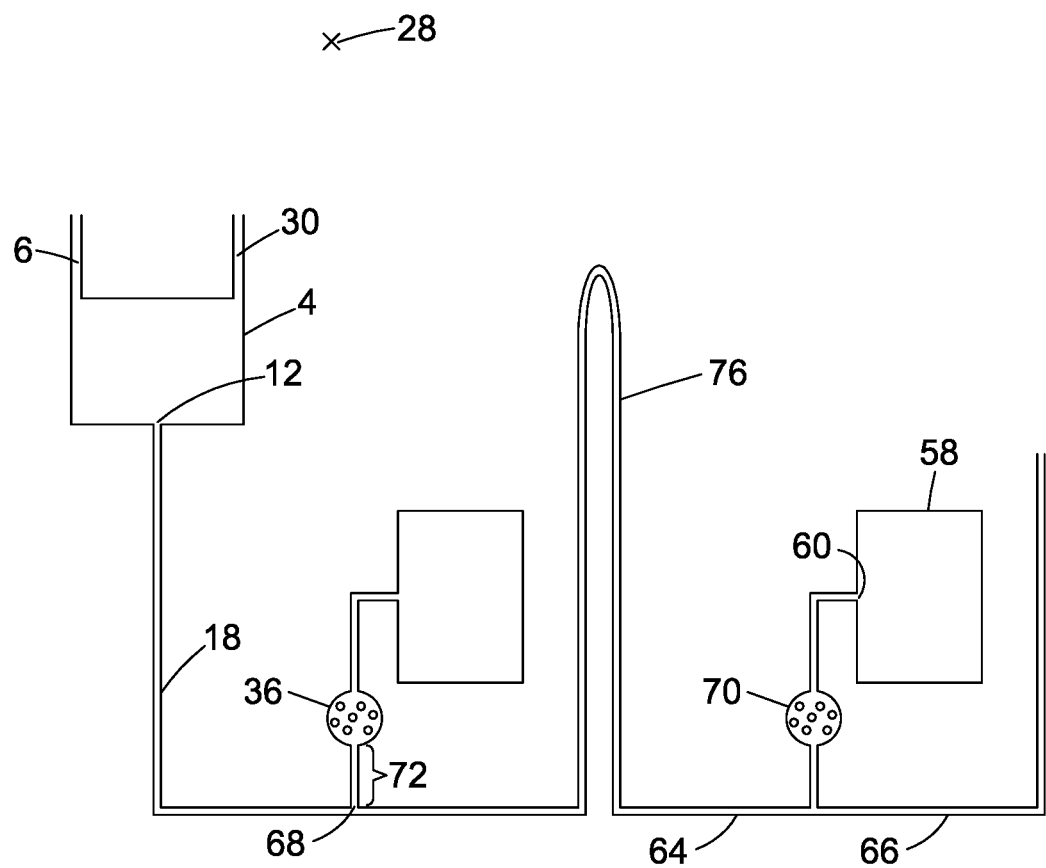
Figure 16:
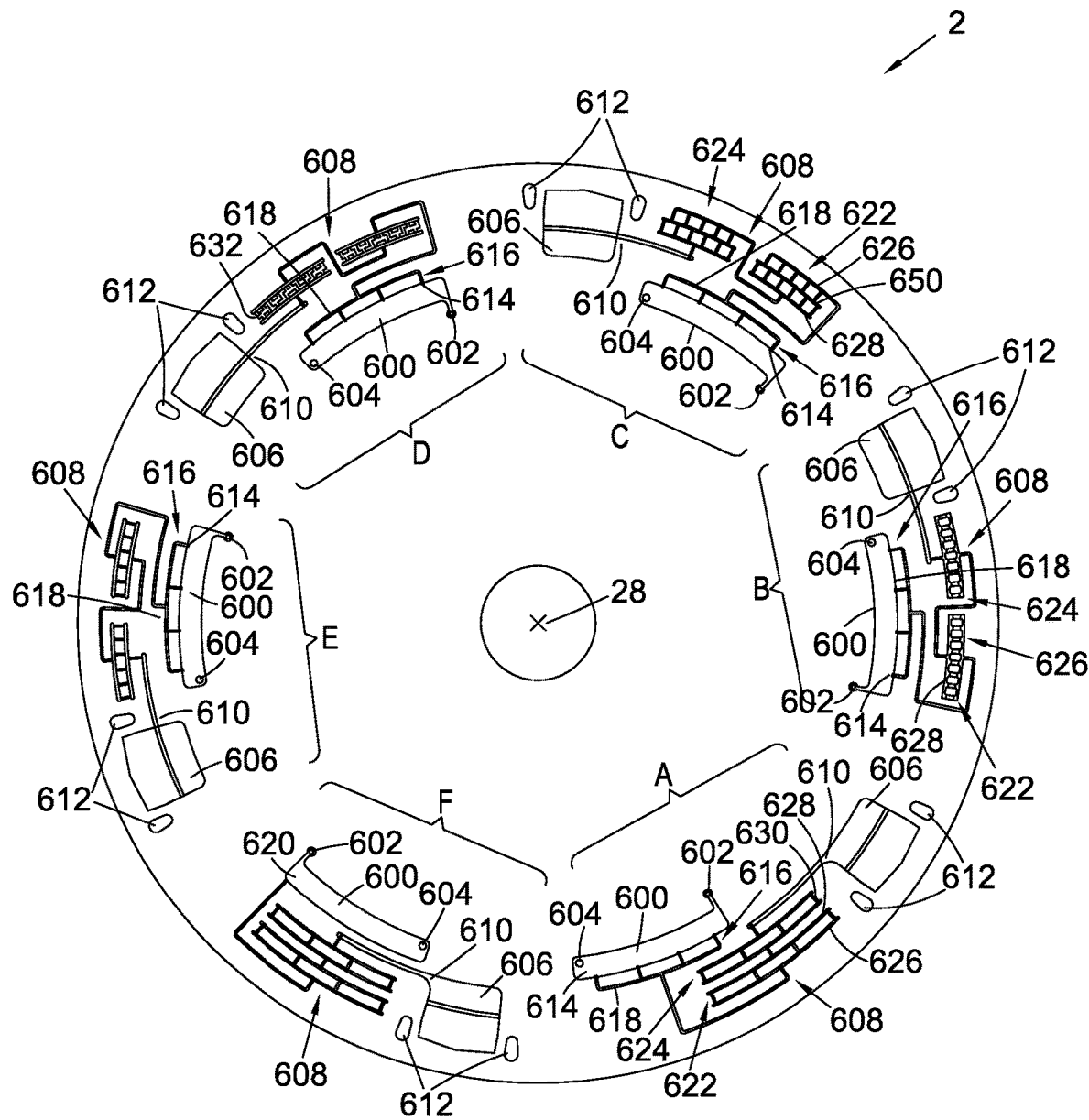
Figure 17:
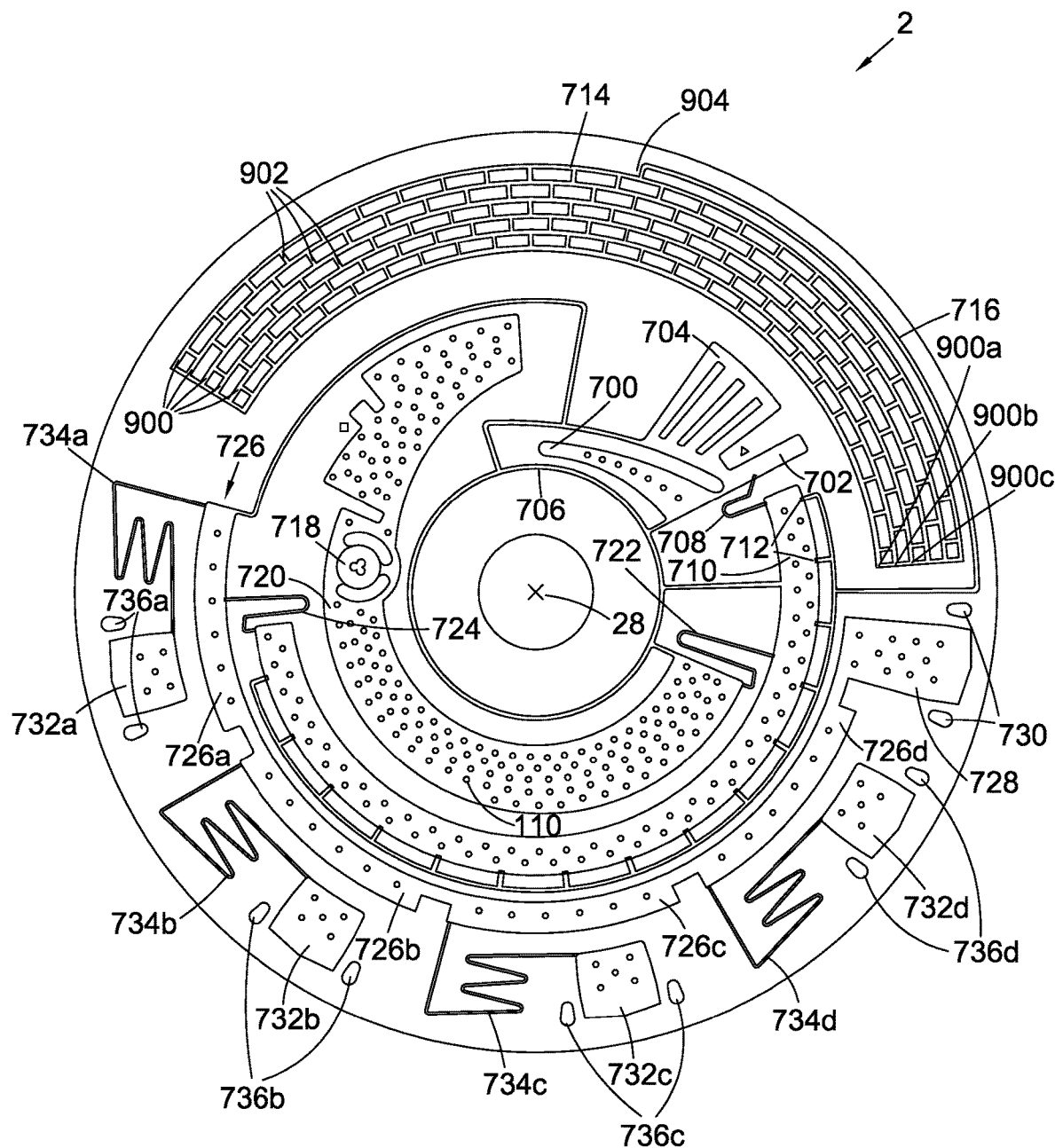
Figure 18:
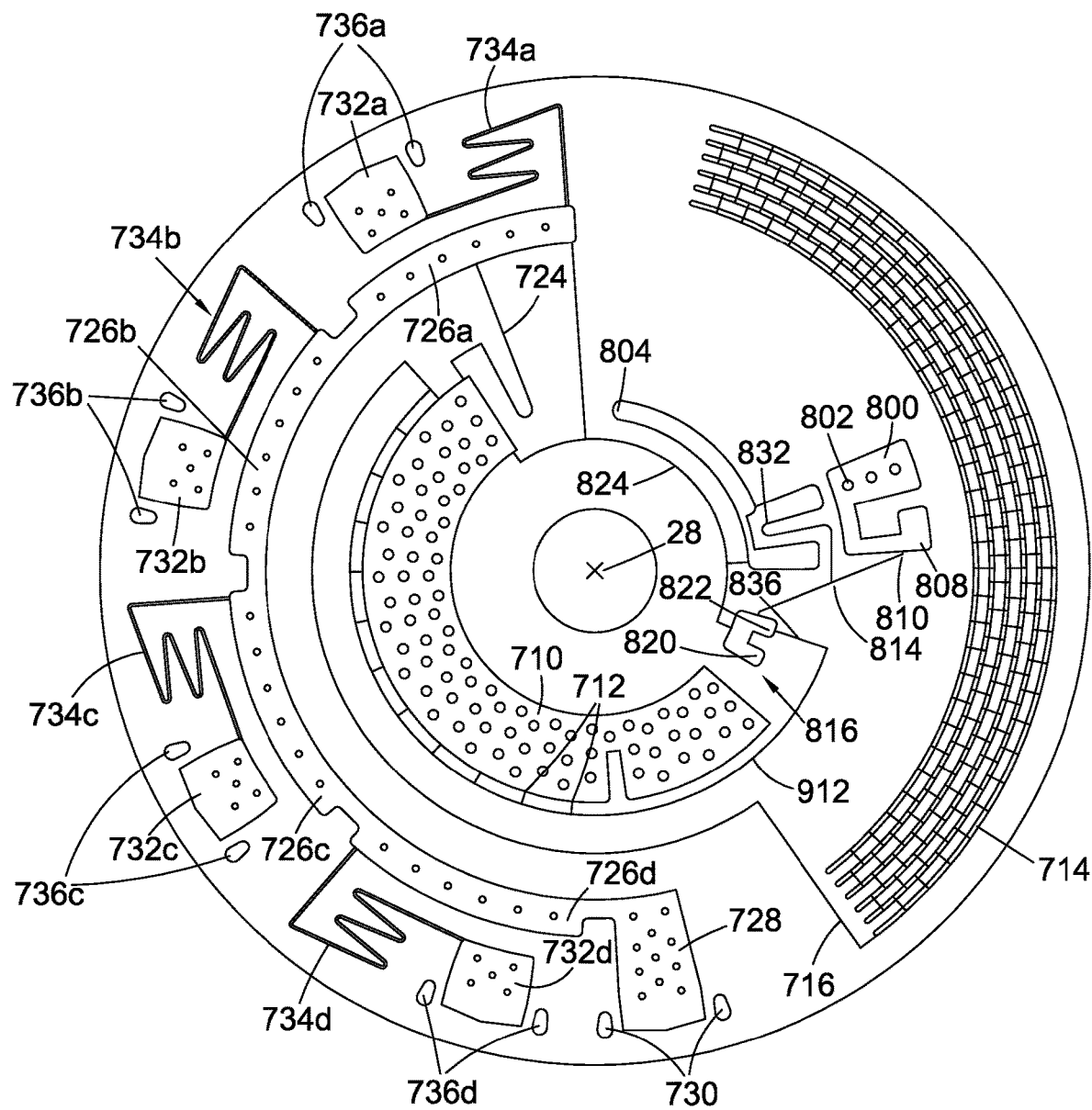
Figure 19A:
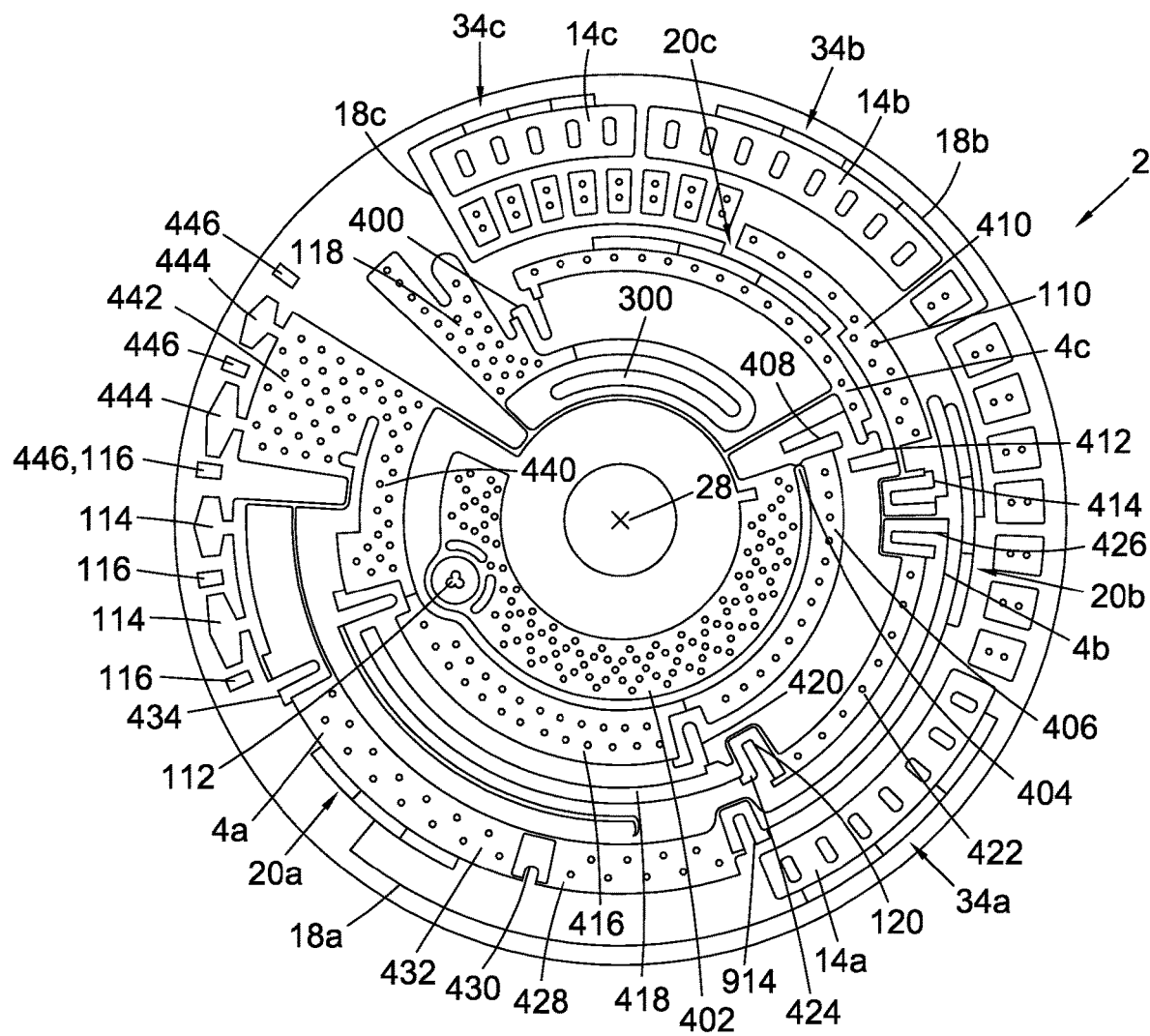
Figure 19B:
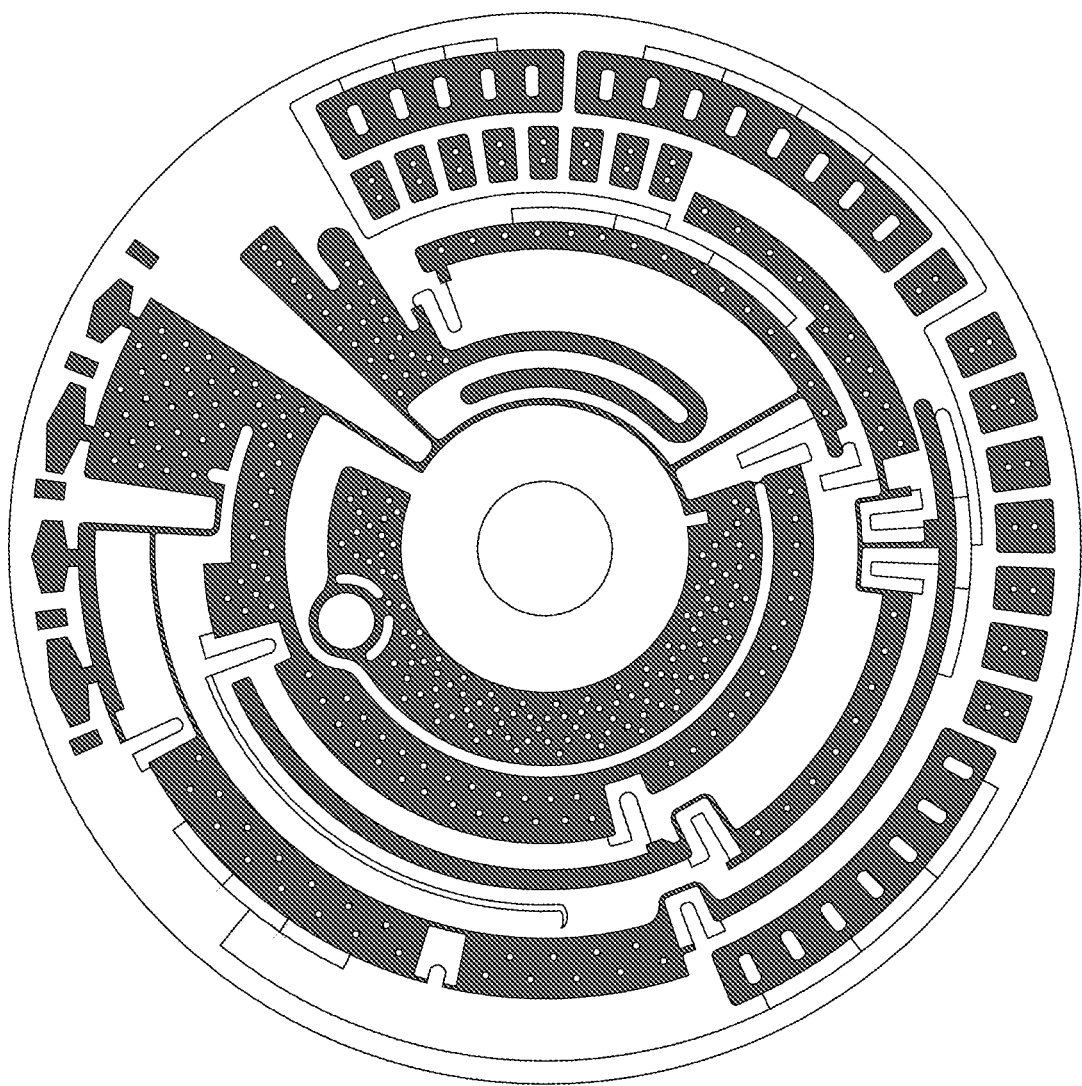
Figure 20:
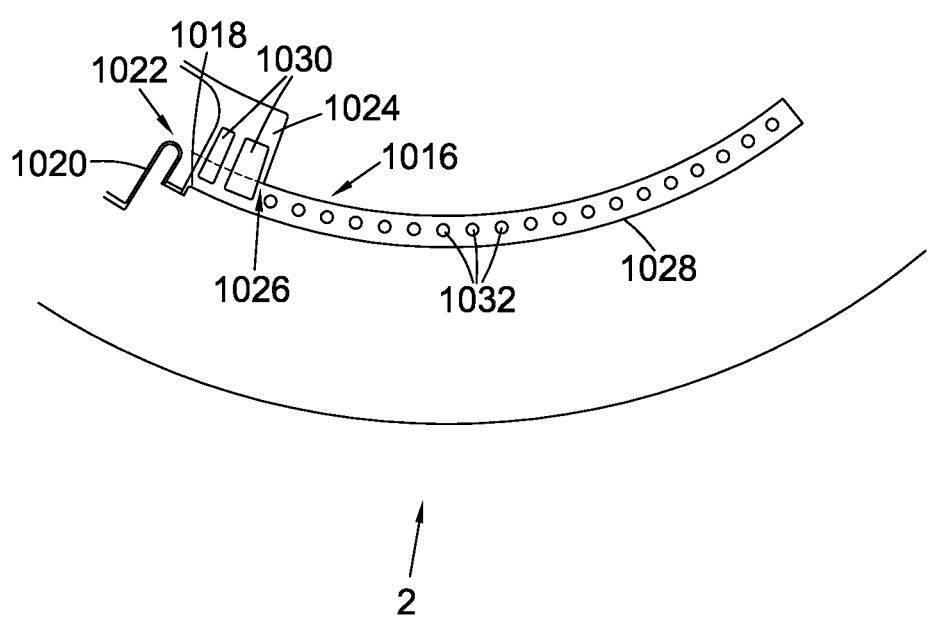

FIGS. 9a-d illustrate liquid flows within the device as illustrated in FIG. 9;

FIGS. 10a to 10g illustrate schematically a device for metering a volume of liquid;

FIGS. 11a, 11b and 11c illustrate schematically a device for resuspending one or more dry reagents in a liquid;

FIG. 12 illustrates schematically a device for mixing a liquid;

FIG. 13 illustrates schematically a device for mixing a liquid and then causing at least a portion of that liquid to flow into a detection chamber;

FIGS. 14 and 15 illustrate schematically a device for mixing a liquid with different reagents and having a plurality of detection chambers;

FIG. 16 illustrates a number of structures for splitting and recombining liquid columns;

FIG. 17 illustrates a device, for example a disc, layout incorporating a number of structures described herein;

FIG. 18 illustrates a further device layout incorporating a number of structures described herein;

FIGS. 19a and 19b illustrate schematically a 'lab on a disc' device for mixing one or more liquids;

FIG. 20 illustrates an arrangement for a metering siphon; and

Figure 21:
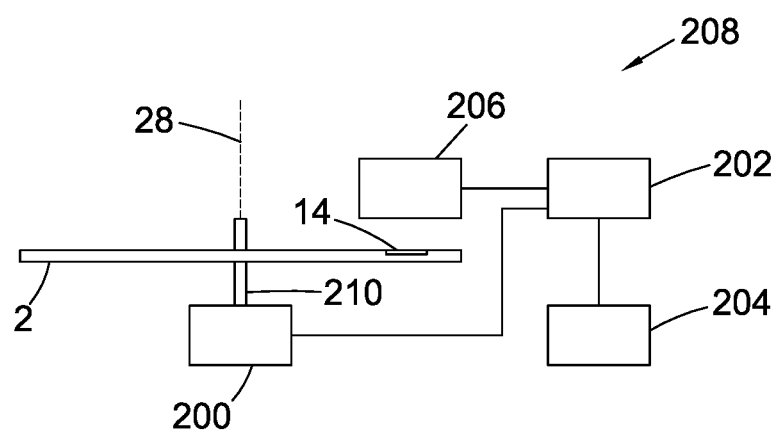

FIG. 21 illustrates a drive system for use with a device as described herein.

DETAILED DESCRIPTION

Figure 1:
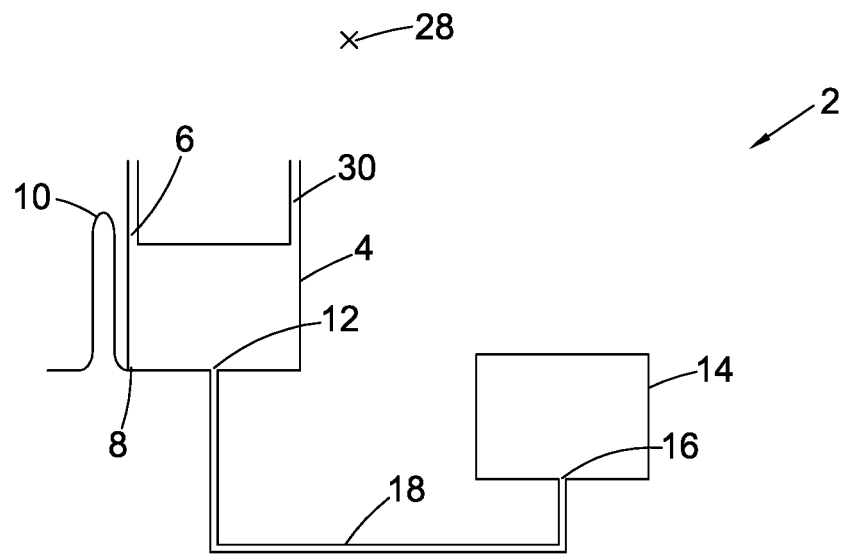
FIG. 1 illustrates schematically a device for mixing a liquid.

With reference to FIG. 1, a microfluidic device 2 is configured for rotation about an axis of rotation 28. The device 2 comprises a first cavity, specifically a first chamber 4. The first chamber 4 comprises an inlet 6, via which liquid is introduced into the chamber 4. The chamber 4 has an outlet 8, which is in communication with a siphon valve 10. The first chamber 4 also has a first port 12.

The device 2 further comprises a second cavity, specifically a second chamber 14, which has a second port 16. A conduit structure 18 connects the first port 12 to the second port 16, to guide liquid flow between the first and second ports. The second port 16 is radially outwards of the first port 12.

The first and second ports are located on the radially-outermost aspects of the first and second chambers respectively. In some embodiments, however, the first and second ports may not be disposed on the radially-outermost aspects of the first and second chambers, but instead may be disposed at any location on the chamber which is radially outwards of the respective radially-innermost aspects of the first and second chambers. In other words, the first and second chambers may comprise respective proximal portions which are radially inwards of respective distal portions of the first and second chambers, with the first and second ports disposed on the distal portions of the first and second chambers respectively.

The device 2 is configured such that the only fluidic flow path into and out of the second chamber 14 is via the second port 16. Thus the second chamber 14 may be unvented, i.e. it comprises no vents. Conversely, the first chamber 4 comprises a vent 30 such that gas is able to flow into and out of the first chamber 4 via the vent. The vent 30 may be in communication with the atmosphere or an internal air circuit.

A method of mixing liquid using the device as illustrated in FIG. 1 and the liquid flows within the device will now be described with reference to FIGS. 2a-c.

Figure 2A:
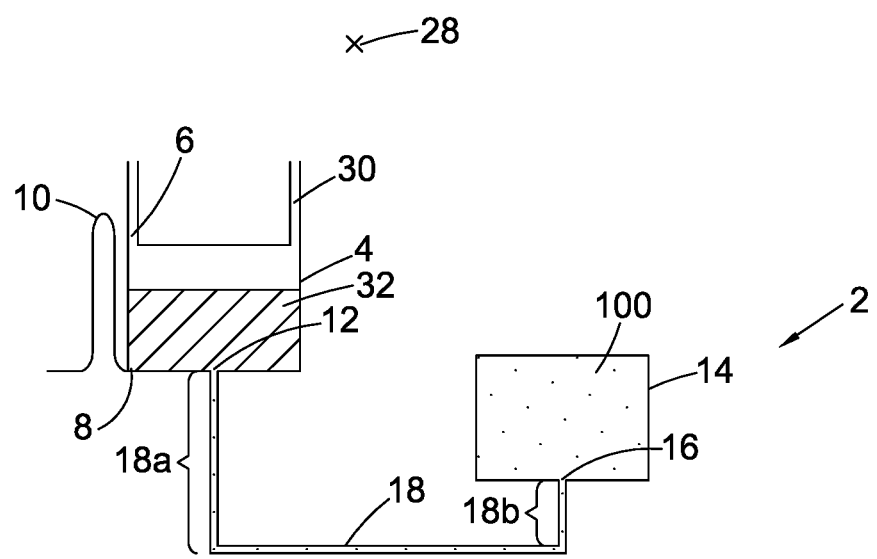
FIGS. 2a, 2b and 2c illustrate schematically liquid flows within the device illustrated in FIG. 1.

With reference to FIG. 2a, as a first step, a liquid 32 is introduced into the first chamber 4, via the inlet 6 and seals a volume of gas 100 in the conduit structure 18 and the second chamber 14 from the vent 30.

Figure 2B:
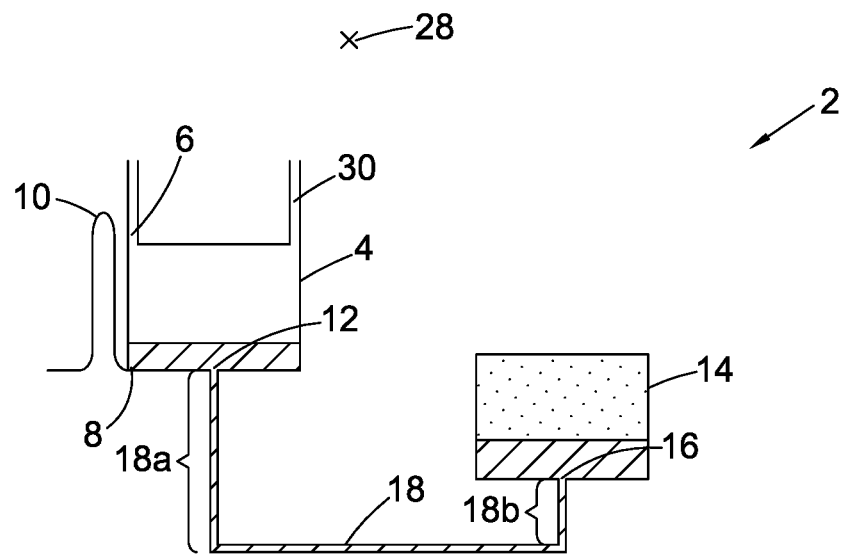
Figure 2C:
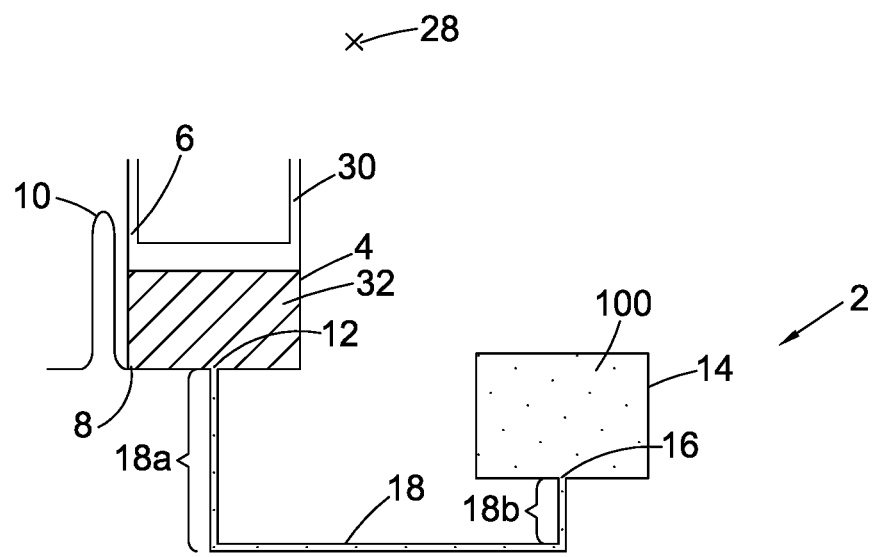

With reference to FIG. 2b, the device 2 is then accelerated to a first rotational frequency. This causes liquid to flow from the first chamber 4 into the conduit structure 18, via the first port 12, under the action of centrifugal force. As liquid flows into the conduit structure 18, gas in the conduit structure 18 is displaced by the liquid flowing into the conduit structure and is forced along the conduit structure and into the second chamber 14. As the liquid flows, the gas is compressed and a pressure of the gas trapped in chamber 14 increases. The higher pressure gas 100 is depicted with dots of a greater density.

The extent to which the liquid advances down the conduit structure 18 will depend on the following:
    the absolute positions, for example the radial positions, and relative dimensions of the first and second chambers and the conduit structure,
    the first rotational frequency to which the device is accelerated,
    the volume of liquid
and potentially, other factors. The above features can be selected and adjusted in order to control how far down the conduit structure 18 the liquid advances.

In some embodiments, liquid may enter the second chamber 14, via the second port 16. In other embodiments, the liquid front may only advance some way down the conduit structure 18, without entering the second chamber 14. Similarly, the entire volume of liquid may be transferred out of the first chamber 4 and into the conduit structure 18 (and optionally into the second chamber 14). Alternatively, only a portion of the liquid introduced into the first chamber 4 may be transferred from the first chamber into the conduit structure 18, with the rest of the liquid volume remaining in the first chamber 4. Similarly, some, most or all of the liquid may enter the second chamber 14.

When the device is rotated at the first rotational frequency, the centrifugal force acting on the liquid acts to compress the gas in the second chamber 14. With reference to FIG. 2c, the device is then decelerated to a second rotational frequency, which is lower than the first, or is stopped. This reduces (or eliminates) the centrifugal force acting on the liquid and as a result, the gas in the second chamber 14 expands, forcing the liquid back down the conduit structure 18. Again, depending on the relative dimensions of the first and second chambers and the conduit structure, the volume of liquid and the second rotational velocity (which, as mentioned above, may be zero), the entire volume of liquid may be forced back into the first chamber 4, or only a portion of the liquid may re-enter the first chamber 4 (while the device is rotated at a non-zero frequency), with the rest of the liquid volume remaining in the conduit structure 18.

This process of accelerating and decelerating the device may be repeated one or more times. In moving the liquid back and forth, in particular in moving it from a chamber, into a narrow conduit, and then back out again, into the same or a different chamber, the liquid is mixed.

As described above, the second port 16 is positioned radially outwards of the first port 12. This is to facilitate the filling of the second chamber 14 under the action of centrifugal force, as will now be described.

The first and second chambers act as communicating vessels and under the action of centrifugal force, if both the first and second chambers were vented, the liquid level in the first chamber 4 (or the portion of the conduit 18a) would balance with that in the second chamber 14 (or the conduit portion 18b). As mentioned above, the only fluidic flow path into and out of the second chamber 14 is via the second port 16 so there will be an additional contribution from the build up of gas pressure in the second chamber. There will therefore come an equilibrium point at which the centrifugal force acting on the liquid column in the first chamber and the conduit portion 18a will be balanced by the gas pressure in the second chamber 14. However, the volume of the second chamber 14 can be selected so as to be sufficiently large such that this equilibrium point is not reached until at least some of the liquid enters the second chamber. Positioning the second port 16 such that it is radially-outwards of the first port 12, also facilitates the filling of the second chamber 14 with at least some of the liquid 32. As mentioned above, mixing of the liquid is achieved by moving it back and forth and in particular by moving the liquid 32 from a chamber (either the first or the second chamber) into a narrower conduit (i.e. the conduit structure 18) and then back out again (into either the first or second chamber).

Positioning the second port at a radially-outermost aspect of the second chamber 14 is advantageous for the following, different reason. By positioning the second port relative to the second chamber in this way, liquid fills the second chamber in a direction opposite to that in which the centrifugal force acting on the liquid acts (as mentioned above, liquid is forced into the second chamber as a result of the centrifugal force acting on the column of liquid in the first chamber and the conduit portion 18a). A result of filling the second chamber in this way is that the gas in the second chamber is forced radially inwards. If the second port were positioned at a radially-inward aspect of the second chamber, for example, liquid would enter the second chamber and flow to the radially-outermost aspect of the chamber, displacing the gas present there, which would move to a more radially-inwards position in the chamber. As the liquid has a greater density than the gas, the centrifugal force acting on the liquid would be greater than that acting on the gas (since the centrifugal force acting on an object is proportional to its mass).

Then, when the rotational frequency of the device was reduced, the gas in the second chamber (being radially inwards of the liquid in the chamber and closer to the second port) would escape out of the second chamber via the second port and into the conduit structure 18. Liquid would then be trapped in the second chamber 14 and would not move back into the conduit 18 and first chamber 4. The transfer of that liquid back and forth (in order to mix it) would not be facilitated by the acceleration and deceleration of the device, as it is when the second port is located at a radially-outwards (or radially-outermost) position.

In other words, by disposing the second port on a radially-outermost aspect of the second chamber, as the chamber fills with liquid, it separates the gas in the second chamber from the second port. As a result, when the gas expands, liquid is forced radially outwards and out of the second chamber via the second port before any gas is able to escape from the second chamber.

The first port 12 is positioned at a radially-outermost aspect of the first chamber. This is advantageous in helping to ensure that, under the action of centrifugal force, any liquid in the first chamber is able to exit the chamber via the first port 12 and that liquid is not trapped in the first chamber. In other words, positioning the first port in this way facilitates the emptying of the first chamber 4 (should this be desired).

Figure 3A:
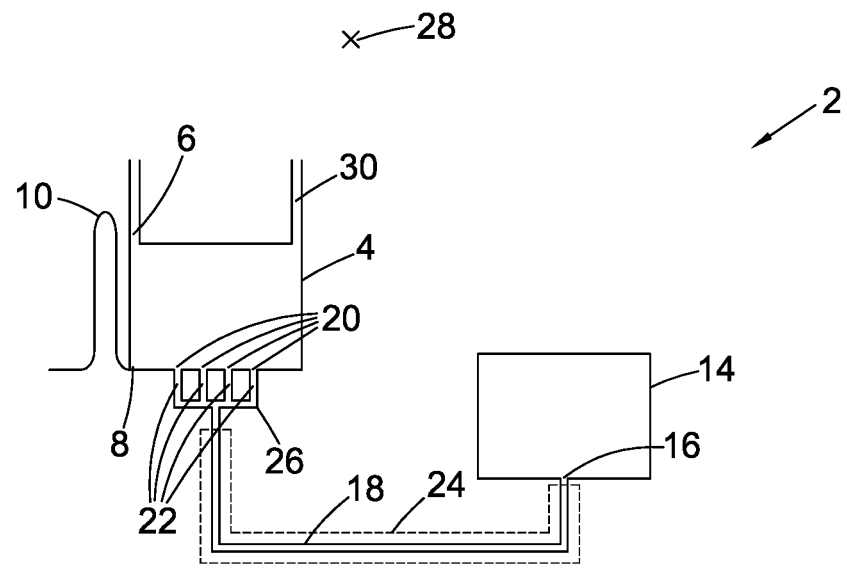
FIGS. 3a, 3b, 4 and 5 illustrate schematically a device with a multi-port chamber for mixing a liquid.
Figure 3B:
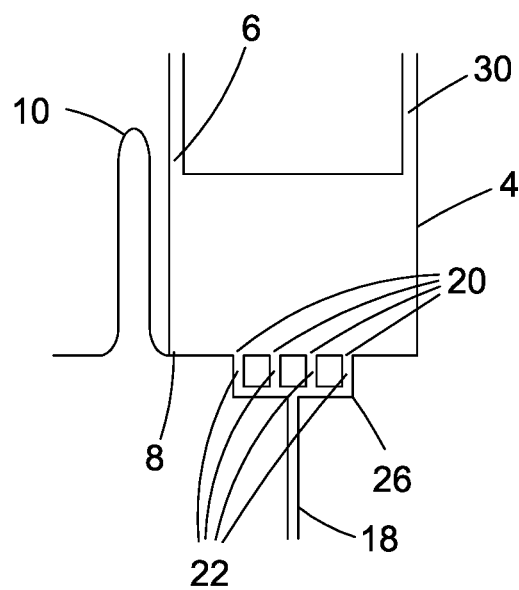

With reference to FIGS. 3a and 3b, a structure providing further means for facilitating effective mixing of a liquid, is provided in which a first cavity, specifically chamber 4, of the device 2 comprises a first plurality of ports 20 and the conduit structure 18 may comprise a plurality of conduit portions 22 each connected to a respective one of the first plurality of ports 20. The conduit structure 18 further comprises a common conduit portion 24 and a manifold structure 26. The first plurality of ports 20 are connected to the second port 16 via the plurality of conduit portions 22, the manifold structure 26 and the common conduit portion 24. In other words, the common conduit portion 24 branches into a plurality of conduit portions 22, each of which are connected to one of the plurality of ports 20. In some embodiments, the manifold structure 26 may be directly connected to the first plurality of ports 20, with no intervening conduit portions 22.

The method of using a device as illustrated in FIG. 3a is the same as that as for the device illustrated in FIG. 1. The device is accelerated to a first rotational frequency to cause liquid to flow from the chamber 4 into the conduit structure 18 and optionally into the second chamber 14. The device is then decelerated to a second rotational frequency (or stopped), such that at least some of the liquid is forced, by the pressure built up in the chamber 14, back into the first chamber 4. In flowing from the first chamber 4 into the conduit structure 18, the liquid flows into the plurality of conduit portions 22. The liquid then flows into the common conduit portion 24 via the manifold structure 26.

Figure 4:
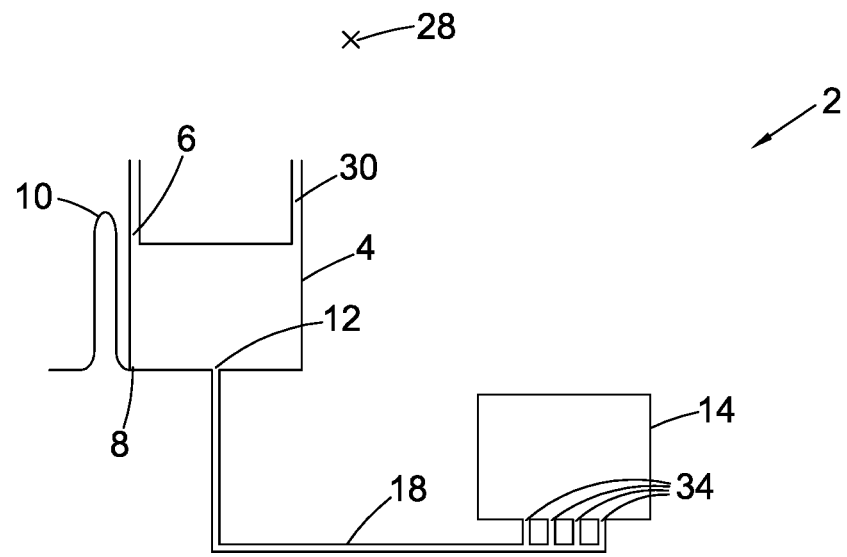

With reference to FIG. 4, a second cavity, specifically a second chamber 14 may comprise a plurality of ports 34 connected to the conduit structure 18 as described above for the ports 20. Equally, with reference to FIG. 5, both the first and second cavities (specifically, the first and second chambers) may comprise a plurality of ports and the conduit structure may comprise branched structures at both ends of the common conduit portion 24.

With reference to FIG. 6, a second cavity, specifically a second chamber 14, may comprise one or more dry reagents 104. When the device 2 is rotated and liquid enters the second chamber 14, it will come into contact with the dry reagents 104. In some embodiments, the one or more reagents 104 may be disposed such that there is a portion 102 of the second chamber which is radially outwards of the one or more dry reagents 104. This is to allow a preliminary step of transferring the liquid back and forth, in line with the method described above, before mixing the liquid with the reagents in the second chamber.

Specifically, the extent to which the liquid front advances in the conduit or the second chamber will depend the frequency at which the device is rotated and this can be controlled in order to control how far the liquid advances in the structure. One benefit of this is that the time at which the liquid comes into contact with one or more reagents in the device can be controlled. This is achieved by positioning the reagents radially inwards of the second port (or second plurality of ports) in the second chamber 14. Liquid can be transferred back and forth between the first and second chambers without coming into contact with the reagents if the rotational velocity is controlled such that the liquid front does not advance sufficiently far in the second chamber to reach the one or more reagents.

In this way, the liquid can first be mixed by accelerating and decelerating the device between a first rotational frequency and a second rotational frequency lower than the first. The device is then accelerated further, to a third rotational velocity higher than the first rotational velocity, such that the liquid advances further radially inwards in the second chamber than it had done at the first rotational frequency, such that it comes into contact with the dry reagents. The device can then be accelerated and decelerated to mix the solution further.

In the embodiment illustrated in FIG. 6, both the first and second chambers have multiple ports. However, one or both of the first and second chambers may have only one, or a plurality of ports and one or both of the first and second chambers may contain one or more dry reagents.

Specific configurations of the first and second chambers and their respective ports have been described above, in particular in terms of facilitating mixing in situations where liquid is caused to enter the second chamber. As mentioned above, however, the liquid may not necessarily advance into the second chamber, but can still be transferred back and forth between the first chamber 4 and the conduit structure 18, i.e. out of and into the first chamber to mix it. As such, the location and configuration of the second chamber, as well as that of its ports, can be arranged in a number of different ways, for example in order to save on space or to fit in around other structures which may be present on the device.

With reference to FIGS. 7a and 7b, other configurations of a second cavity, specifically a second chamber 14, relative to a first cavity, specifically a first chamber 4, and the conduit structure are described. In the embodiment illustrated in FIG. 7a, the second chamber 14 is positioned radially outwards of the first chamber 4. The port 16 of the second chamber 14 is located at a radially inner-most aspect of the second chamber. In some embodiments, the second port 16 may be disposed elsewhere on the second chamber 14. Under the action of centrifugal force, liquid in the first chamber 4 flows out of the first plurality of ports 20 and into the conduit structure 18. As the liquid flows, the pressure of the gas trapped in the second chamber 14 builds up. When the device is slowed or stopped, the built-up gas pressure in the second chamber 14 forces liquid in the conduit structure 18 back into the first chamber 4.

In the embodiment illustrated in FIG. 7b, the second cavity, specifically the second chamber 14, is disposed radially inwards of the first chamber 4. As described above, with reference to FIG. 7a, liquid enters the conduit structure 18 under the action of centrifugal force and when the device is slowed or stopped, liquid is forced back into the first chamber 4 by the overpressure in the second chamber 14.

Figure 8A:
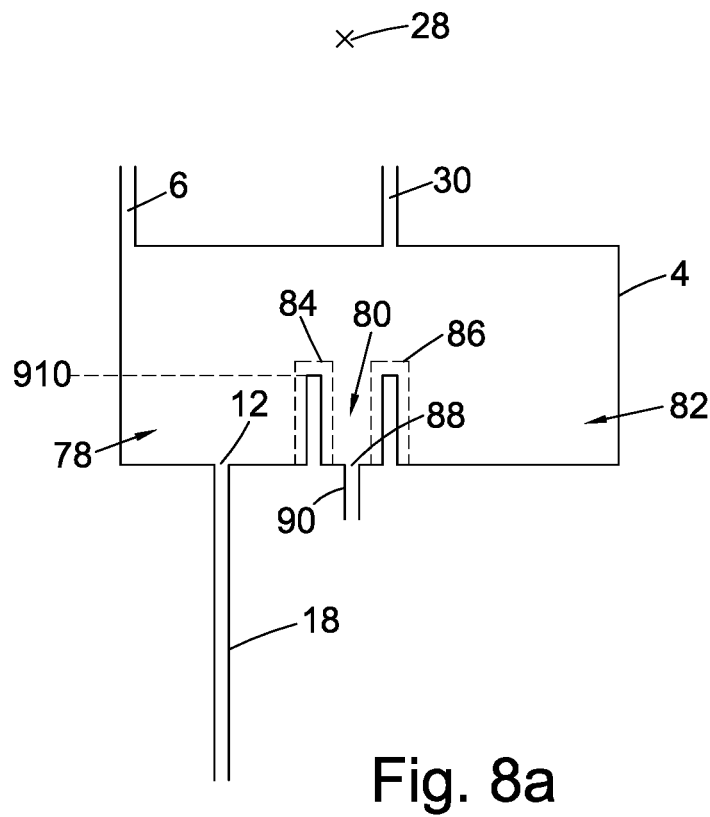
FIGS. 8a and 8b illustrate schematically a device for mixing a liquid and then metering a volume of that liquid.

In some situations, it may be desirable to isolate a well-defined volume of liquid from the rest of the liquid. With reference to FIG. 8a, a structure which facilitates aliquoting (the isolation of a well-defined volume of the liquid), once it has been mixed, is described. In such a structure, a first cavity, specifically a first chamber 4, comprises a mixing portion 78, a metering portion 80 and an overflow portion 82. As set out in embodiments described above, the first chamber 4 also comprises an inlet 6 and a vent 30.

The mixing, metering and overflow portions of the first chamber 4 are separated by portions 84 and 86 of a wall of the first chamber. Portion 84 extends radially inwards from the mixing portion to a first radial position and radially outwards from the first radial position to the metering portion. Portion 86 extends radially inwards from the metering portion to a second radial position and radially outwards from the second radial position to the overflow portion 82. The first and second radial positions may be the same or different. The second radial position is the same as or radially outwards of the first radial position.

In either case, the volume of liquid that can be contained in the metering portion 80 (before liquid overflows into the overflow portion 82, or back into the mixing portion 78) will be determined by the second radial position and the geometry and dimensions of the metering portion 80. The metering portion 80 comprises an outlet 88 in communication with a conduit 90. The metering portion 80 is configured to retain liquid while the metering portion fills. For example, the conduit 90 may comprise a siphon valve or other valve to prevent liquid from flowing further downstream until the valve is overcome.

In brief, a siphon valve is arranged to stop flow in the conduit past the capillary siphon due to centrifugal pressures acting on the liquid column in the capillary siphon, as the device is rotated. The device is then stopped or slowed down sufficiently to draw liquid past the crest of the siphon due to capillary action. Once the siphon has been primed in this way, that is once liquid has been drawn past the crest of the siphon, rotation of the device can be resumed to draw the liquid using a siphon effect. Thus, the siphon acts as a valve, blocking flow as the device is initially rotated, which can be opened by briefly stopping or slowing rotation of the device.

As in some previous embodiments, the first chamber 4 has a port 12 which is connected to the first conduit structure 18. The port 12 is provided in the mixing portion 78.

Figure 8B:
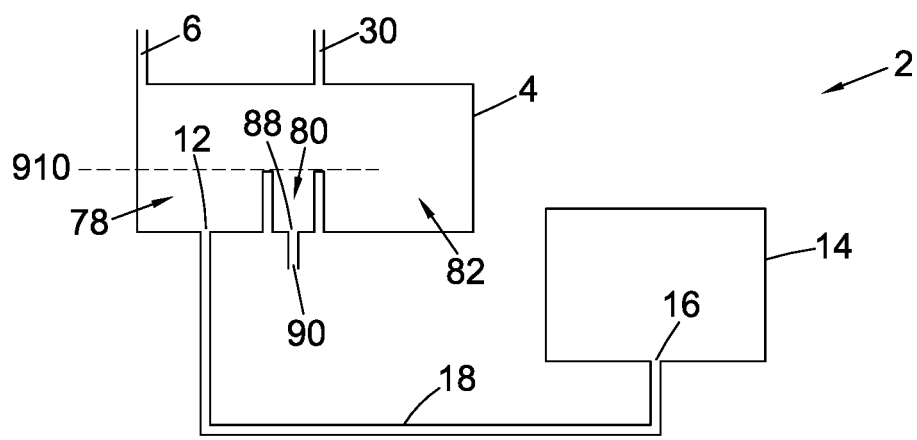

With reference to FIG. 8b, the device further comprises a second cavity, specifically a second chamber 14, which has a port 16 disposed on its radially-outermost aspect. As mentioned above, the port 16 may be disposed anywhere on the second chamber 14 which is radially outwards of a radially-innermost aspect of the second chamber 14. In other words, the port 16 may be disposed anywhere on the second chamber 14 other than a radially-innermost aspect of the chamber 14. The second chamber 14 is configured such that the only fluidic flow path into and out of the second chamber is via the port 16. For example, the second chamber 14 may be unvented.

In some embodiments, as mentioned above, liquid may not enter the second chamber. In this case, the port of the second chamber may be disposed anywhere in the second chamber.

Liquid flows between the portions of the first chamber 4 will now be described with reference to FIGS. 8a and 8b.

In use, as a first step, the device 2 is rotated in order to transfer a liquid into the first chamber 4 via the inlet 6 under the action of centrifugal force. The liquid flows into the mixing portion 78 and subsequently into the conduit structure 18. As liquid flows into the conduit structure 18, gas is displaced along the conduit structure 18 and into the second chamber 14, where it is trapped. The device is rotated until a volume of liquid which is greater than a total volume that can be contained in the mixing 78 and metering 80 portions of the first chamber before it overflows into the overflow portion 82 is contained within the mixing portion 78 and the first conduit structure 18 and optionally also the second chamber 14.

The device 2 is then slowed or stopped, and as a result, the gas in the second chamber is able to expand, thus forcing liquid back along the conduit structure 18, towards the first chamber 4. The rotational frequency of the device 2 is controlled such that the liquid level in the first chamber 4 does not advance past level 910 (see FIGS. 8a and 8b) and thus overflow into metering portion 80.

The device 2 can then be accelerated and decelerated one or more times in order to move liquid back and forth along conduit structure 18 and optionally into and out of the first and second chambers in order to mix it. Once the liquid has been mixed sufficiently, the device 2 is then slowed further. Again, the gas trapped in the second chamber expands, forcing liquid back along the conduit structure and into the first chamber 4. The device is slowed sufficiently so as to allow a volume of liquid larger than a total volume of liquid that can be contained in the mixing and metering portions back into the first chamber 4. As result, liquid advances past level 910 and overflows into the metering portion 80 and subsequently into the overflow portion 82. As mentioned above, the metering portion is configured so as to retain liquid as it fills.

Liquid overflows from the metering portion 80 into the overflow portion 82 and as a result, the liquid in the metering portion 80 has a well-defined volume. This volume can then be extracted from the metering portion (and the first chamber 4) via the outlet 88 and used in further processes within the device.

With reference to FIG. 9, a structure which is configured to facilitate the separation of blood into plasma and cellular material (or the separation of a multi-phase liquid into a number of phases with differing densities) is described. The structure is provided on a device 2 which is configured for rotation about an axis of rotation 28. A first cavity, specifically chamber 4, is in communication with a sample inlet 804, via which a blood sample, for example, is inserted into the device, e.g. by a user. The first chamber 4 comprises an overflow portion 806. The overflow portion 806 is separated from the rest of the first chamber 4 by a portion of a wall of the first chamber 4 which extends radially inwards to a first radial position and then radially outwards from the first radial position to the overflow portion 806. The overflow portion is provided to facilitate the metering of a precise volume of blood. The first chamber 4 has a port 828 which is connected to a first conduit portion 842. The first conduit portion comprises a meander 832. The first conduit portion 842 is connected, at a junction 814, to a second conduit portion 826, which in turn is connected to a port 810 of a second cavity, specifically a second chamber 14.

The second chamber 14 comprises a separation portion 808 and also an overflow portion 800, which in turn comprises a number of support pillars 802. The overflow portion 800 is separated from the separation portion 808 of the second chamber 14 by a portion of a wall of the second chamber 812, which extends radially inwards from the separation portion 808 to a second radial position and then radially outwards from the second radial position to the overflow portion 800. The separation portion 808 has a first portion 838 radially outwards of a second portion 840 and the first portion 838 has a greater circumferential extent than the second portion 840. There is a step change in circumferential extent between the first and second portions. The larger circumferential extent of the second portion is to increase the volume of the separation portion (and the second chamber 14 more generally) for the same radial extent of the second chamber (which may be restricted due to limited space on the device 2, particularly in a radial direction). It will be understood that the separation portion may equally have other shapes. For example, the circumferential extent of the separation portion may increase linearly in a radial direction, as that of the overflow portion 800 does.

The first conduit portion 842 and the second conduit portion 826 are connected, at junction 814, to a third conduit portion 818. The third conduit portion 818 is connected to a port 830 of a metering chamber 816. In this way, the second and third conduit portions provide a fluidic communication path between the second chamber 14 and the metering chamber 816. The port 830 is at the same radial position as port 828 but may equally be radially inwards of it or radially outwards of it. The port 830 is positioned such that when rotating at the first rotational frequency liquid flows via conduit structures 842 and 826 into the second chamber 14 and does not flow through port 830.

The metering chamber 816 also has an overflow portion 820 separated from a metering portion 822 by a portion of a wall of the metering chamber, which extends radially inwards from the metering portion 822 to a third radial position and then radially outwards from the third radial position to the overflow portion 820. The portion 822 also comprises an outlet port 834 which is connected to an outlet conduit 836.

Each of the first chamber 4 and the metering chamber 816 are connected to an internal air circuit 824.

It should be understood that the device 2 may, in some embodiments, not comprise one or more of overflows 800, 806 and 820. In particular, the second chamber 14 may not comprise overflow portion 800. In such embodiments, a blood sample may still be separated into its components in the second chamber 14 as long as the port 810 is positioned radially inwards of the cellular material-plasma interface.

With reference to FIGS. 9a, 9b, 9c and 9d, liquid flows within the structure as illustrated in FIG. 9 will be described.

Figure 9A:
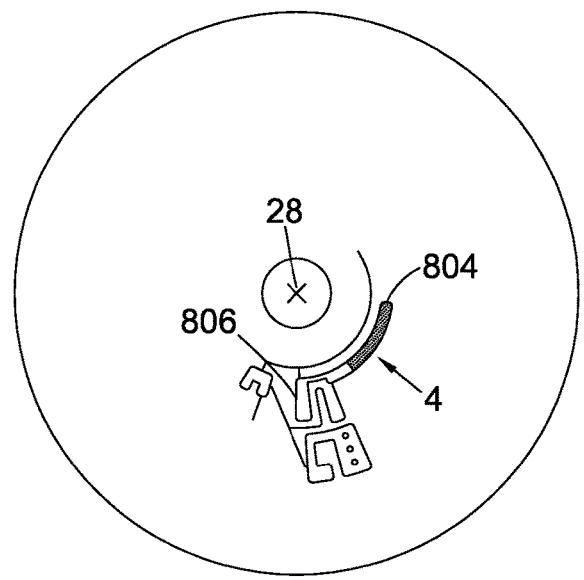

As a first step, a sample, for example a blood sample, is inserted into the device 2 via inlet 804, for example by a user. The blood sample then flows into the first chamber 4, as illustrated in FIG. 9a.

Figure 9B:
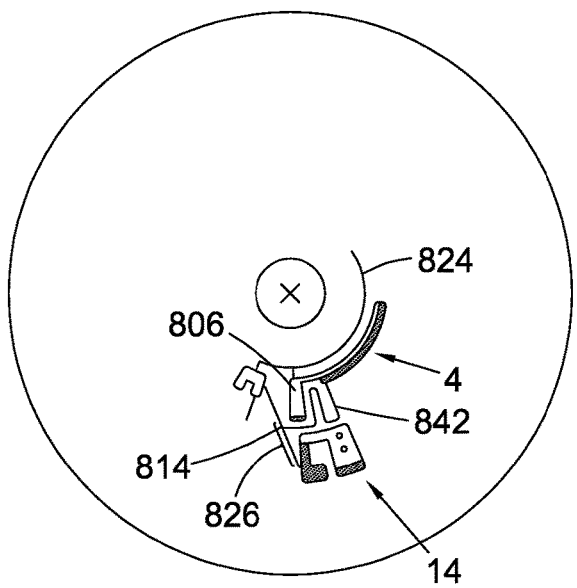

With reference to FIG. 9b, the device 2 is then rotated at a first rotational frequency and, under the action of centrifugal force, a volume of the sample overflows into the overflow portion 806 and the portion retained in the first chamber 4 flows into the first conduit portion 842, towards the second chamber 14. As liquid flows, gas in the first conduit structure is displaced further along the conduit structure. Once liquid has passed junction 814, gas displaced by liquid flow is no longer able to escape into the metering chamber 816 (which is connected to the internal air circuit 824). As such, once liquid has passed junction 814, gas is trapped in the second chamber 14 and as liquid flows, a pressure of the gas trapped in the second chamber 14 increases. The device can then be slowed or stopped, such that the gas in the second chamber expands, thus forcing liquid back along the second conduit portion 826. This process of acceleration and deceleration can be repeated, in order to move liquid back and forth along the second conduit portion 826. In some embodiments, the second conduit portion 826 may contain one or more dry reagents and back and forth motion may be advantageous in order to resuspend the one or more dry reagents in the liquid. However, it should be understood that the step of deceleration and reacceleration is optional and may not be carried out.

Under the action of centrifugal force, liquid then flows into the second chamber 14 and a portion of the liquid overflows into overflow portion 800.

Figure 9C:
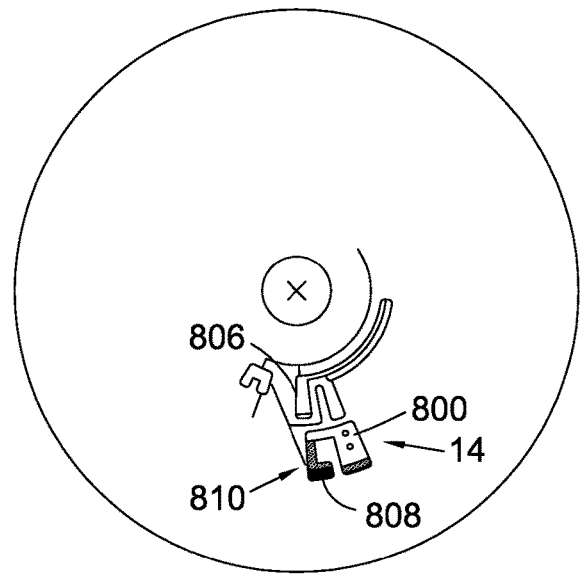

With reference to FIG. 9c, the device 2 is rotated in order to separate the components of the blood. Under the action of centrifugal force, the denser cellular material sediments to the radially-outermost aspect of the second chamber 14 and the plasma settles radially inwards of the cellular material.

The port 810 of the second chamber 14 is configured to be positioned radially inwards of an interface between the cellular material and the plasma. Due to the various metering stages facilitated by the overflow portions 806 and 800, the volume of blood in the separation portion 808 of the second chamber 14 is known. Accordingly, the device can be designed such that the position of the port 810 of the second chamber 14 is radially inwards of the cellular material-plasma interface. In particular, the port 810 is positioned radially inwards of the hypothetical position of the cellular material-plasma interface for the known volume of blood for the maximum proportion of the blood sample that could be comprised of cells.

Figure 9D:
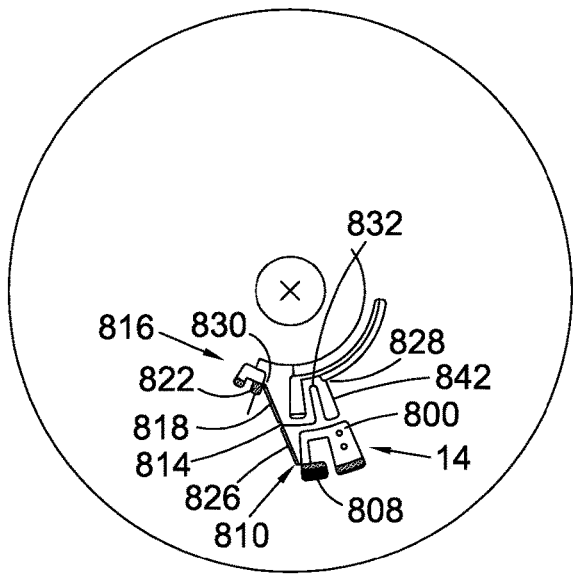

With reference to FIG. 9d, the device is then slowed or stopped and the gas trapped in the second chamber 14 expands. As a result, any liquid in the separation portion 808 which is radially inwards of the port 810 is forced back into the second conduit portion 826. Advantageously, the liquid which is forced out of the second chamber 14 is plasma and the cellular material is trapped in the portion of the second chamber 14 which is radially outwards of the port 810.

Any liquid in the overflow portion 800 of the second chamber 14 is also trapped in the second chamber and is not forced back out of the second chamber by expansion of the trapped gas.

As mentioned above, plasma is forced out of the second chamber 14 and into the second conduit portion 826. At junction 814, plasma subsequently flows into the first conduit portion 842, back towards the first chamber 4, and also into the third conduit portion 818, towards the metering chamber 816. Advantageously, the hydraulic resistance of the first conduit portion 842 is configured to be greater than the hydraulic resistance of the third conduit portion 818. This is, for example, facilitated by reducing the cross-section of or lengthening conduit 842 such as for example using meander 832. As such, liquid reaches the metering chamber 816 before liquid reaches the first chamber 4.

Liquid enters portion 822 of metering chamber 816 and a volume of the liquid overflows into overflow portion 820. As such, a well-defined volume of plasma is retained in portion 822, which can then be used in further processes within the device.

It will be understood that this structure may be combined with any other structures described above or below. For example, the structure described with reference to FIG. 9 may be employed to isolate a well-defined volume of plasma which may then be mixed with a further liquid or one or more dry reagents in line with any of the methods described herein.

The above structure has been described with reference to the separation of a blood sample into its components, but it may equally be used in order to separate a multi-phase liquid into various phases of differing densities. It may also be used to sediment out particles suspended in a liquid.

As mentioned above, some of the principles described in the present disclosure may be used to meter a volume of liquid. In other words, the principles may be used to extract a well-defined volume of liquid from a larger volume of liquid. Advantageously, the volume extracted can be controlled by controlling the rotational frequency of the device. Some devices and methods that may be used for this purpose are now described with reference to FIGS. 10a to 10g.

Figure 10A:
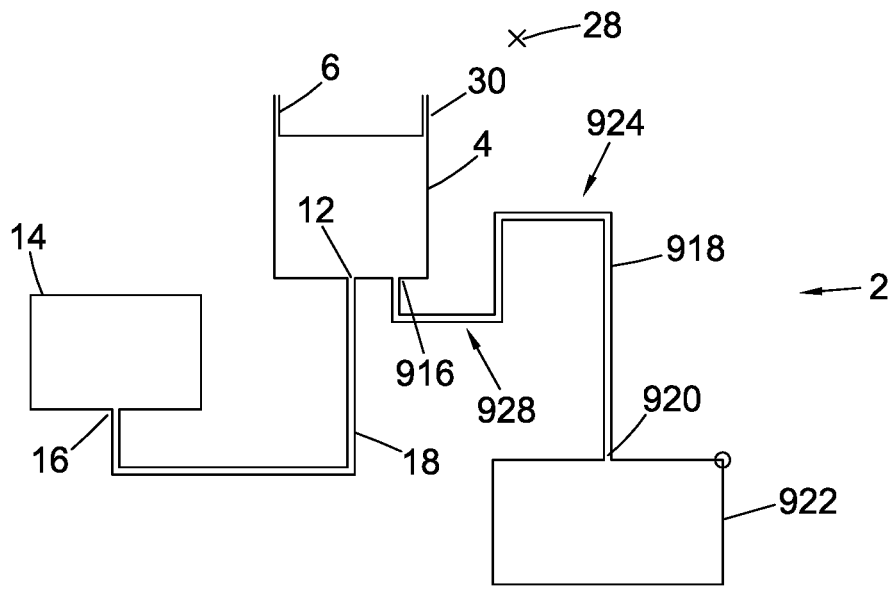

With reference to FIG. 10a, the first chamber 4 may comprise an outlet port 916 which is connected to an outlet conduit 918 acting as a metering siphon and replacing the siphon valve 10 illustrated in e.g. FIG. 1. In some embodiments, the outlet port 916 is disposed in a radially-outermost aspect of the first chamber 4, as illustrated in FIG. 10a. In other embodiments, the outlet port 916 is disposed elsewhere in the first chamber 4, for example in a side wall of the first chamber 4, such that liquid can be driven through the outlet port 916 by centrifugal forces.

The outlet conduit 918 is connected to an inlet 920 of a downstream cavity, in particular a downstream chamber, 922. The outlet conduit 918 comprises a first bend 924. The first bend is disposed radially between a radially outermost aspect of the first chamber 4 and a radially-innermost aspect of the first chamber 4. The outlet conduit also comprises a second bend 928 which is disposed radially outwards of the outlet port 916 of the first chamber 4.

In some embodiments, the conduit 918 extends radially outwards from the outlet port 916 to the second bend 928 and radially inwards from the second bend 928 to the first bend 924. The outlet conduit 918 extends radially outwards from the first bend 924 to the inlet 920 of the downstream chamber 922. Thus, the second bend is upstream of the first bend. In other embodiments, the second bend is downstream of the first bend. The downstream chamber 922 is vented.

Figure 10B:
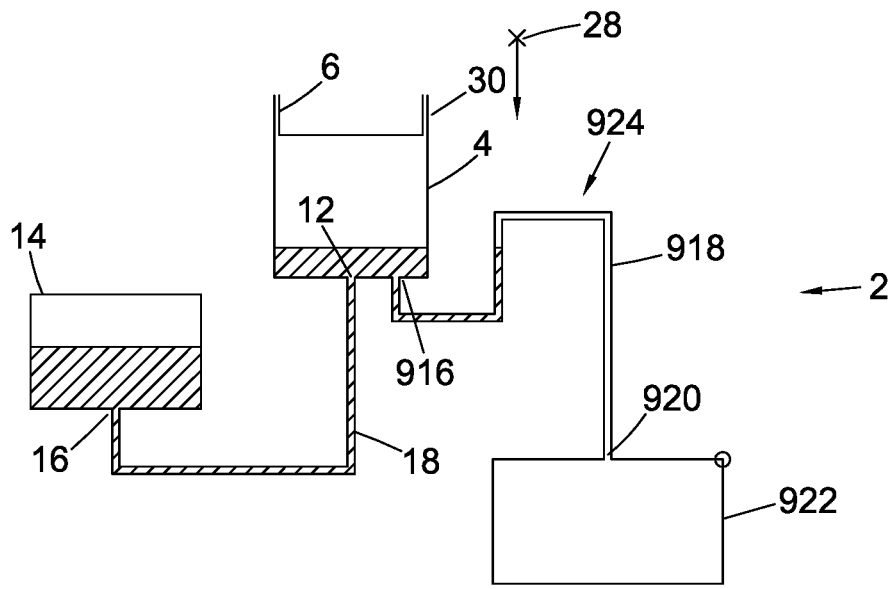

With reference to FIGS. 10b, c and d, centrifugally-driven liquid flows within the structure shown in FIG. 10a are described.

Initially, the device 2 is rotated at a first rotational frequency in order to transfer liquid from an upstream liquid handling structure (such as a chamber) into the first chamber 4 via the inlet 6. The liquid seals a volume of gas in the conduit structure 18 and the second chamber 14 from the vent 30. Liquid also enters the outlet conduit 918 from the first chamber 4 and fills it to a level the same as the level of liquid in the first chamber 4. The dimensions of the structure (in particular the first chamber 4, the inlet 6, the outlet conduit 918, for example) are configured and/or the rotational frequency of the device is selected such that a liquid level in the first chamber 4 remains radially outwards of a radially-innermost aspect of the first bend 924 of the outlet conduit 918. As such, although liquid enters the outlet conduit, it does not traverse the first bend 924 of the outlet conduit 918.

With reference to FIG. 10b, liquid flows from the first chamber 4 into the conduit structure 18, via the first port 12, under the continued action of centrifugal force. As more liquid flows into the conduit structure 18 from the first chamber 4, gas in the conduit structure 18 is displaced by the liquid flowing into the conduit structure and is forced along the conduit structure and into the second chamber 14. As the liquid flows towards the second chamber 14, the gas is compressed and a pressure of the gas trapped in chamber 14 increases.

Figure 10C:
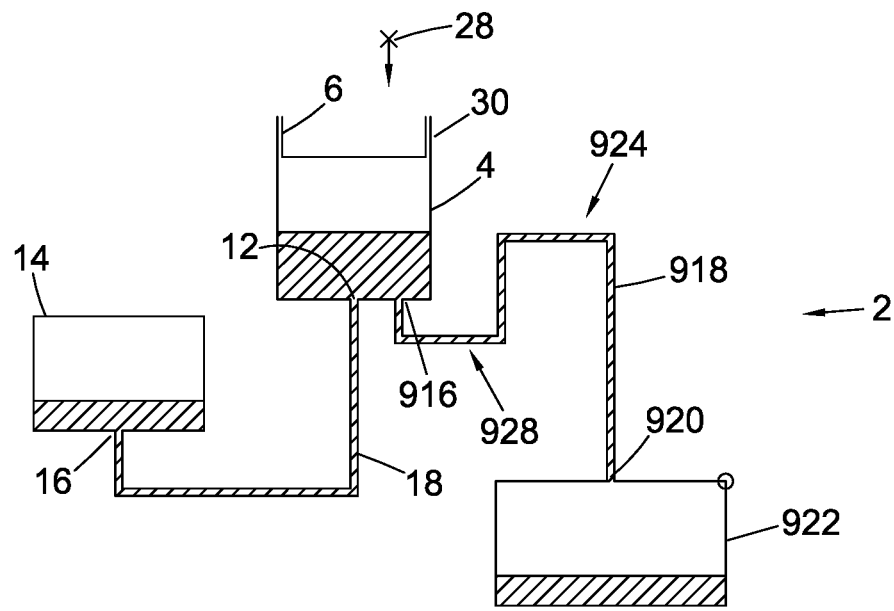
Figure 10D:
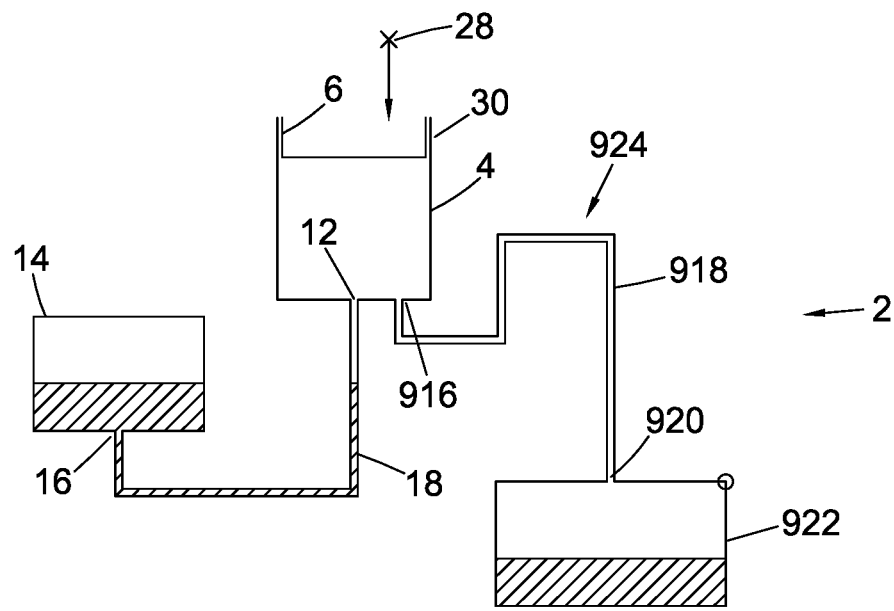

With reference to FIG. 10c, the device is then decelerated to a second rotational frequency, lower than the first. As a result, the gas trapped in the second chamber 14 and in the conduit structure 18 expands and forces liquid back along the first conduit structure 18 and into the first chamber 4. As a result, the fill level of liquid in the first chamber 4 rises. If the second rotational frequency is sufficiently high that the fill level in the first chamber 4 is maintained at a level which is radially outwards of a radially-innermost aspect of the first bend 924 in the outlet conduit 918, no liquid traverses the first bend. The rotational frequency can then be increased again in order to force liquid back into the first conduit structure 18 from the first chamber 4, thus compressing the trapped gas again.

The rotational frequency can be decreased and increased in this way a number of times in order to move liquid back and forth, for example to mix it. Mixing in this way is particularly effective if one or both of the first 4 and second 14 chambers has a plurality of ports, for example in line with the embodiments described with reference to FIGS. 3a, 3b, 4, 5, 6, 7a and 7b. In some embodiments, this mixing step may be omitted.

If the device is decelerated to a rotational frequency which is sufficiently low that the liquid level in the first chamber 4 rises to be radially inwards (or at least at the same radial position as) the first bend 924 of the outlet conduit 918, as a result of liquid moving from the conduit structure 18 (and optionally the second chamber 14) back into the first chamber 4, liquid in the outlet conduit 918 crosses the bend 924 and flows into the downstream chamber 922 due to the resulting siphon action.

Liquid will continue to flow from the first chamber 4 into the downstream chamber 922 under the action of centrifugal force until the liquid outlet 916 is clear of liquid. The moment at which the liquid outlet 916 is clear of liquid and, as a result, the liquid in the outlet conduit 918 is separated from any liquid in the conduit structure 18, can be controlled by controlling the rotational frequency of the device 2 as will now be described.

Once liquid in the outlet conduit 918 has traversed the first bend 924, the rotational frequency of the device 2 can either be:

maintained at a constant value,
increased or
decreased.

In the case that the rotational frequency is maintained at a constant value, liquid flows from the first chamber 4 into the downstream chamber 922 under the action of centrifugal force. As liquid flows out of the first chamber 4, the column of liquid in the upstream chamber, the conduit structure 18 and, if liquid is present in the second chamber 14, the second chamber decreases. Accordingly, the centrifugal force acting on this reduced liquid column no longer balances the pressure of the trapped gas and liquid therefore moves from the conduit structure 18 back into the first chamber 4 to balance the pressure. This process will continue under rotation at a constant frequency, with liquid moving from the first chamber 4 into the downstream chamber and liquid moving from the conduit structure 18 back into the first chamber 4.

As long as there is liquid in the upstream chamber 4 which is radially inwards of the outlet port 916 (and rotation is continued at a constant rate), liquid will flow from the upstream chamber 4 into the downstream chamber 922. As there is a finite amount of liquid in the conduit structure 18 and the second chamber 16 available to flow back into the first chamber 4 to top-up the liquid level in the upstream chamber, the upstream 4 chamber will eventually be empty of liquid. However, some liquid will be held in the conduit structure 18 (and optionally in the second chamber 14) as long as rotation is continued.

At the point at which the first chamber 4 empties of liquid, liquid in the conduit structure 18 (and optionally in the second chamber 16) is no longer connected to liquid in the outlet conduit 918), the outlet port 916 is clear of liquid and as a result, air enters the outlet conduit 918 from the first chamber 4. It will be appreciated that, in embodiments where the outlet port 916 is not positioned on a radially-outermost aspect of the first chamber 4, but instead is positioned radially inwards of this, for example in a sidewall of the chamber 4, this will occur once the liquid level in the first chamber 4 falls below the radial position of the outlet port.

If, once liquid has traversed the first bend 924, the rotational frequency of the device 2 is increased, more liquid will flow from the first chamber 4 into the first conduit structure 18, further compressing the gas trapped in the second chamber 14. Meanwhile, liquid also flows from the first chamber 4 into the downstream chamber 922. Accordingly, the liquid fill level in the first chamber 4 will fall faster, as compared to a scenario in which the rotational frequency is maintained at a constant value. As a result, liquid in the conduit structure 18 and liquid in the outlet conduit 918 will be separated (and air will enter the outlet conduit 918 from the upstream chamber 14) sooner. Accordingly, in total, less liquid is transferred from the first chamber 4 into the downstream chamber, as compared to a scenario in which the rotational frequency is maintained at a constant value. In this way, the amount of liquid which is transferred from the first chamber 4 into the downstream chamber 922 can be reduced by increasing the rotational frequency.

It will be understood that the rate of transfer of liquid into the downstream chamber 922 may be higher if the rotational frequency is increased and that this will need to be taken into account in the design of the structure (e.g. in the selection of the dimensions of the structure) and the determination, for example by calculation or simulation, of the various rotational frequencies.

If, once liquid has traversed the first bend 924, the rotational frequency of the device 2 is decreased, the gas trapped in the second chamber 14 expands and forces liquid in the first conduit structure 18 back into the first chamber 4. As such, as liquid flows out of the first chamber 4 into the downstream chamber 922, the liquid in the first chamber 4 is topped up with liquid from the second chamber (faster than it would be if the rotational frequency is maintained at a constant level). Accordingly, the fill level of liquid in the first chamber 4 may be maintained, may increase, or may still fall (but at a slower rate than if the rotational frequency was maintained at a constant value rather than being decreased). As a result, the moment at which the outlet port 916 is clear of liquid is delayed and more liquid, in total, is transferred from the first chamber 4 into the downstream chamber 4. In this way, the amount of liquid which is transferred from the first chamber 4 into the downstream chamber 922 can be increased by decreasing the rotational frequency. Again, it will be understood that the rate of transfer of liquid into the downstream chamber 922 may be lower if the rotational frequency is decreased and that this will need to be taken into account in the design of the structure (e.g. in the selection of the dimensions of the structure) and the determination, for example by calculation, of the various rotational frequencies.

The volume of liquid which is transferred into the downstream chamber 922 can be controlled by controlling the rotational protocol (frequency and, optionally time at each frequency) of the device. In this way, the structure described acts a variable volume metering structure.

It will be appreciated that various features described herein may be implemented in combination with the above-described variable volume metering structure, some examples of which are:
- multiple ports in one or both of the first and second chambers, as described with reference to FIGS. 3a, 3b, 4 and 5
- reagents in the second chamber as described with reference to FIG. 6
- various configurations of the second chamber, as described with reference to FIGS. 7a and 7b,
- reagent chamber(s) as described with reference to FIGS. 11a, 11b and 11c
- a serpentine structure as described with reference to FIG. 12
- a liquid-retaining portion in the second chamber as described with reference to FIG. 13, 14 or 15
- any of the structures described with reference to FIG. 16, 17, 18, 19a or 19b.

Figure 10E:
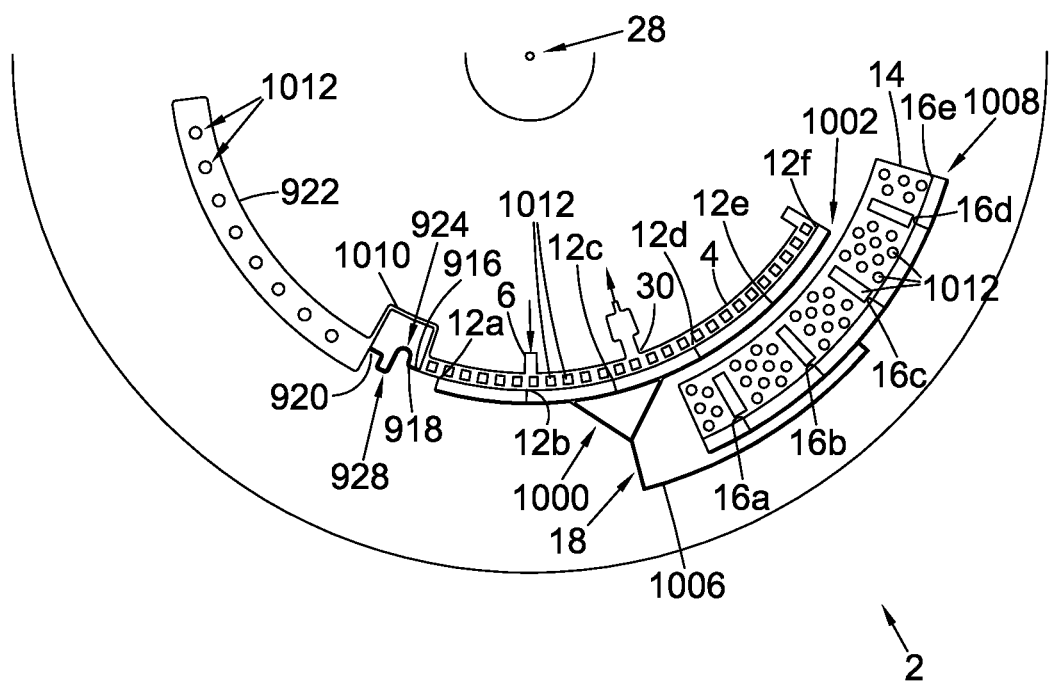

With reference to FIG. 10e, an implementation of the structures described above with reference to FIGS. 10a, 10b, 10c and 10d is now described. Like parts are labelled with like reference numerals. The first chamber 4 comprises an inlet 6, which is connected to an upstream liquid handling structure (not shown), and a vent 30, which is connected to an internal air circuit (not shown).

The first chamber 4 comprises a plurality of ports 12a, 12b, 12c, 12d, 12e and 12f The ports are connected to the first conduit structure 18. Each of the plurality of ports is connected to a radially aligned conduit portion which are each connected to a circumferentially aligned conduit portion 1002. In turn, conduit portion 1002 is connected to a forked structure 1000, which in turn is connected to a common conduit portion 1006. The common conduit portion 1006 is connected to a second circumferentially aligned conduit portion 1008, which in turn is connected to a plurality of radially-aligned conduit portions, each of which is connected to one of the plurality of ports 16a, 16b, 16c, 16d and 16e of the second chamber 14. The conduit structure 18 is then, in essence, configured in an analogous fashion to the structure described with reference to FIGS. 3a, 3b, 4 and 5.

The outlet port 916 of the first chamber 4 is connected to the outlet conduit 918, which comprises a first bend 924 and a second bend 928. The outlet conduit 918 is connected to the inlet 920 of the downstream chamber 922. The device 2 further comprises an air channel 1010 which allows gas which is displaced by flow of liquid from the first chamber 4 into the downstream chamber 922 to enter the first chamber 4. In some embodiments, instead of the device 2 comprising air channel 1010, each of the first chamber 4 and the downstream chamber 922 may be in communication with the atmosphere outside of the device 2. In other embodiments, the upstream chamber 4 and the downstream chamber 922 are connected to an internal air circuit.

The liquid handling structures (the various chambers, cavities, conduits etc.) described herein are moulded or stamped in a substrate. A cover foil is then attached to the substrate to form the chambers and other structures. Each of the first chamber 4, the second chamber 14 and the downstream chamber 922 contain a number of pillars 1012, to support the cover foil sealed to the substrate (which may otherwise be referred to as a carrier disc). The pillars extend from one side of the disc to the other, parallel or substantially parallel to the axis of rotation.

In another implementation, now described with reference to FIG. 10f, in which like elements are labelled as in FIG. 10e and the pillars 1012 are omitted for the sake of clarity, some of the pillars 1012 have been replaced with extended pillars 1014, which leave chimney-like spaces between them in the region of the bend 924, thereby accentuating the difference between a first region of the first chamber 4 in which the first chamber 4 has a reduced cross-section due to the extended pillars 1014 and the spaces in between and a second region of the first chamber 4 radially between the extended pillars 1014 and the ports 12a-12f (only some of which have been labelled for the sake of clarity). This facilitates consistent control of the priming of the conduit 918 because the fill level of liquid in the first chamber 4 is more sensitive to the liquid volume in the first chamber 4 in the first region as compared to the second region. Put differently, when liquid is transferred into the first chamber 4, it initially fills the second region of chamber 4 (radially outward of the pillars 1014) and as the chamber 4 fills, a fill level of liquid in the chamber 4 rises relatively slowly because the liquid occupies the full circumferential extent of the chamber 4. Once the fill level reaches the first region of the chamber 4 (i.e. when it rises to reach the radial position of the pillars 1014, the fill level of liquid in the chamber 4 rises faster (as compared to the rate at which it was rising when liquid was present in the second region of the first chamber 4 only). In this way, the fill level of the chamber 4 is more sensitive to the liquid volume in the first chamber 4 in the first region as compared to the second region.

Figure 10F:
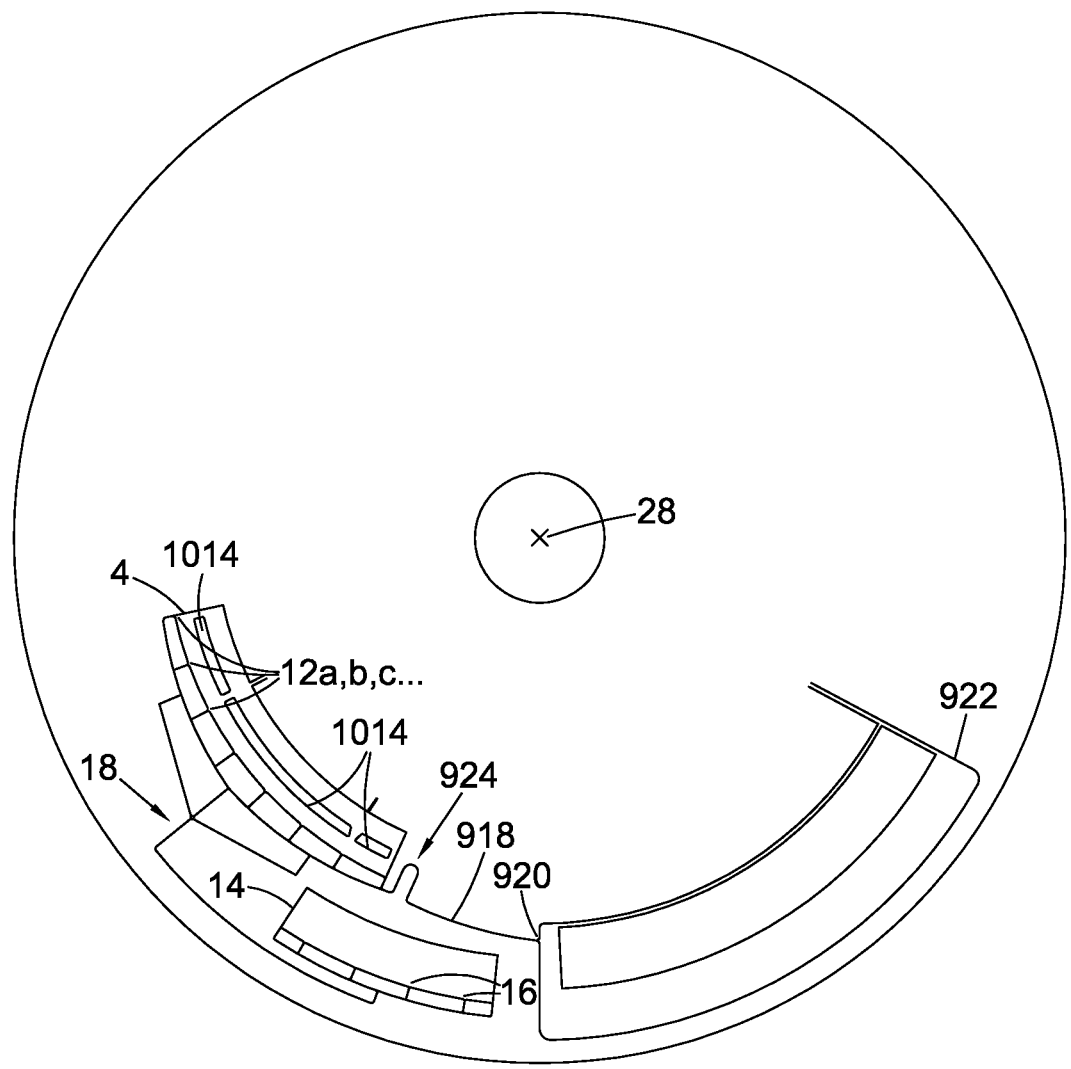

Compared to the embodiment in FIG. 10e, it can be seen that the second region in FIG. 10f occupies the majority of the volume of the first chamber 4, so that there is a region in which liquid volumes can be moved in and out of the first chamber 4 relatively safely without priming the conduit 918 (the second region) and a trigger region in which, once filled by liquid, the conduit 918 is reliably and rapidly primed with little change in volume (the first region).

A further embodiment of a device which makes use of the principle described with reference to FIGS. 10a to 10f and can be combined, in particular, within the trigger region of FIG. 10e or 10f, is now described with reference to FIG. 10g. The structure illustrated in FIG. 10g has a number of features in common with the structure shown in FIG. 10a, but differs in one way, which will now be explained. Like parts (between FIGS. 10a and 10g) are labelled with like numerals and a description of these like parts will not be repeated here.

The device illustrated in FIG. 10a comprises a first chamber 4, a second chamber 14 and a conduit structure 18 connecting the first and second chambers. In the embodiment of FIG. 10g, the device 2 comprises a first cavity 5 and a second cavity 15. The first and second cavities are connected by a port 13 and are separated by a common wall 17. In effect, the first cavity 5 serves the function of the first chamber 4 in the structure illustrated in FIG. 10*a* and the second cavity 15 serves the function of the second chamber 14, but the conduit structure 18 of the structure of FIG. 10*a* is omitted.

Figure 10G:
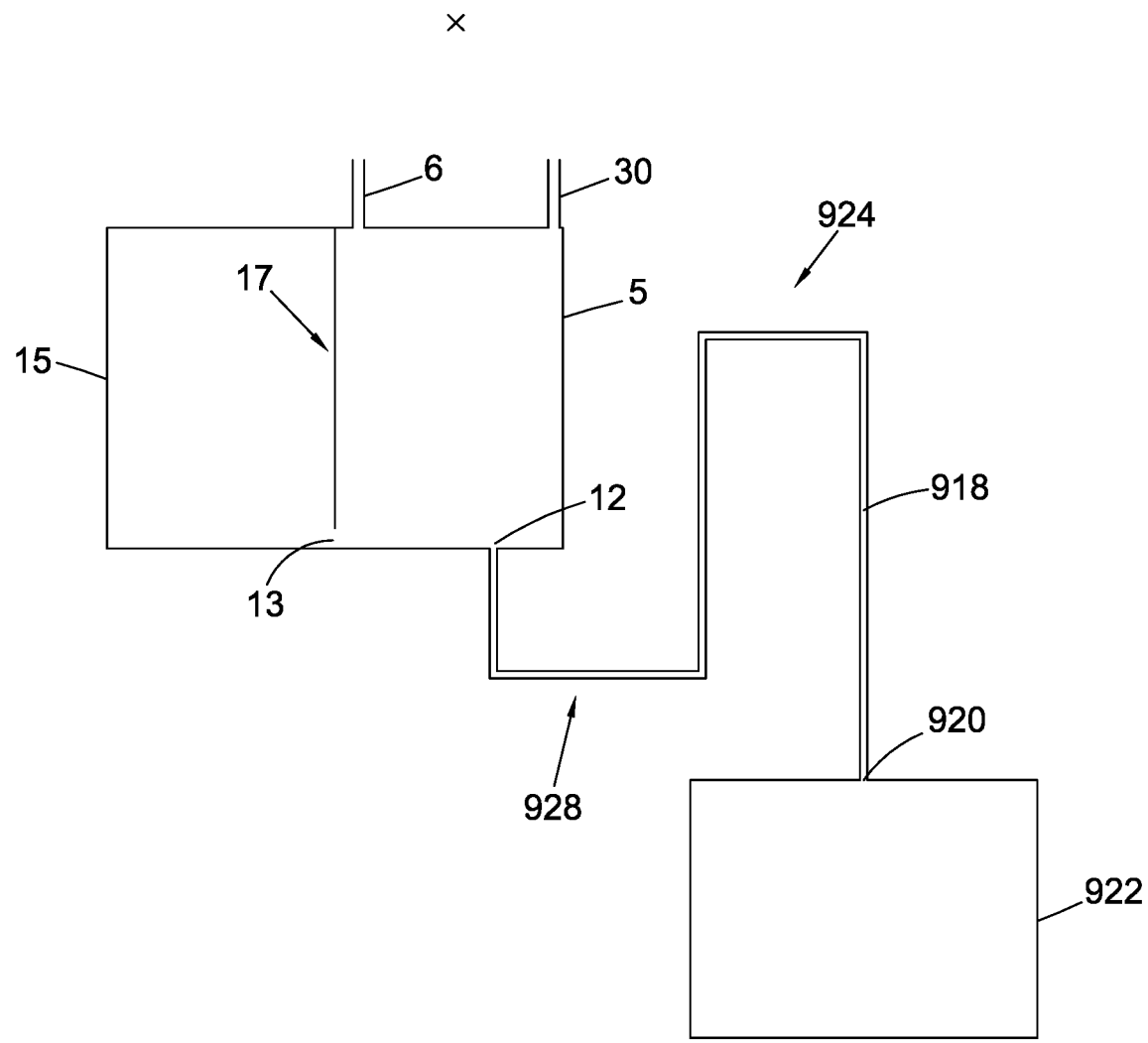

Liquid flows within the device shown in FIG. 10*g* are much the same as those in the device shown in FIG. 10*a*. In use, the device 2 is rotated to transfer liquid into the first cavity 5 via the inlet 6. Some liquid flows from the first cavity into the second cavity 15 and seals a volume of gas in the second cavity 15. Some liquid flows from the first cavity 5 into the outlet conduit 918 and fills it to a level the same as the level of liquid in the first cavity 5.

As liquid continues to be transferred into the first cavity 5 under the action of centrifugal force, more liquid is forced into the second cavity 15 from the first cavity, thus increasing a pressure of the gas trapped in the second cavity. As the first cavity 5 is filled, it is ensured that a level of liquid in the first cavity 5 (and thus a level of liquid in the outlet conduit 918) does not rise to be radially inwards of the first bend 924 of the outlet conduit 918.

The rotational frequency of the device is then decreased. As a result, the gas trapped in the second cavity 15 expands and forces liquid in the second cavity 15 back into the first cavity 5. Accordingly, a liquid level in the first cavity rises. If the device is decelerated to a rotational frequency which is sufficiently low that the liquid level in the first cavity 5 rises to be radially inwards (or at least at the same radial position as) the first bend 924 of the outlet conduit 918, liquid in the outlet conduit 918 crosses the bend and flows into the downstream chamber 922 due to the resulting siphon action.

The volume of liquid which is transferred into the downstream chamber 922 can be controlled by controlling the rotational frequency of the device 2, as described above with reference to FIGS. 10*b, c* and *d.*

The devices and methods illustrated in FIGS. 10*a* to 10*g*, relate to the metering of a volume of liquid. Additional structures and methods are now described which may be applied to any or all of the previous embodiments and are not necessarily limited to metering embodiments.

It will be appreciated that various features described herein may be implemented in combination with the above-described variable volume metering structure, some examples of which are:
- multiple ports in one or both of the first and second chambers, as described with reference to FIGS. 3*a*, 3*b*, 4 and 5
- reagents in the second chamber as described with reference to FIG. 6
- various configurations of the second chamber, as described with reference to FIGS. 7*a* and 7*b,*
- reagent chamber(s) as described with reference to FIGS. 11*a*, 11*b* and 11*c*
- a serpentine structure as described with reference to FIG. 12
- a liquid-retaining portion in the second chamber as described with reference to FIG. 13, 14 or 15
- any of the structures described with reference to FIG. 16, 17, 18, 19*a* or 19*b*.

With reference to FIG. 11*a*, the conduit structure 18 may comprise a first reagent chamber 36. The reagent chamber has a first port 38 which is disposed on a radially-outermost aspect of the first reagent chamber 36. The first reagent chamber 36 contains one or more dry reagents 40.

As described above, liquid flows out of the first cavity, specifically the first chamber 4, and along the conduit structure 18. Due to the position of the port 38 of the reagent chamber 36, the reagent chamber 36 fills from a radially-outermost aspect radially inwards. As such, gas in the conduit structure 18 and the second cavity, specifically the second chamber 14, is forced further radially inwards by the flow of liquid.

With reference to FIG. 11*b*, the conduit structure may comprise a first reagent chamber 36 and a second reagent chamber 42. The second reagent chamber 42 has a second port 44 which is disposed on a radially-outermost aspect of the second reagent chamber 42. The second reagent chamber 42 contains one or more dry reagents 46. The one or more reagents 46 in the second reagent chamber 42 may be the same as or different to the one or more reagents 40 in the first reagent chamber 36. Examples of reagents are particles, buffers, salts, sugars, biologically active elements (antibodies, enzymes etc.) and polymers.

As illustrated in FIG. 11*b*, the second reagent chamber 42 is connected by the conduit structure 18 in series with the first reagent chamber 36. As a result, liquid from the first cavity, specifically chamber 4, will flow through a first portion of the conduit structure 18 and into the first reagent chamber 36, then subsequently through a second portion of the conduit structure 18 and into the second reagent chamber 42.

With reference to FIG. 11*c*, in some embodiments, the second reagent chamber 42 is connected by a branch of the conduit structure 18 in parallel with the first reagent chamber 36. Specifically, the conduit structure 18 branches into a first branch 48 and a second branch 50. The first reagent chamber is disposed on the first branch 48 and the second reagent chamber is disposed on the second branch 50.

Liquid flowing from the first chamber 4 through the conduit structure 18 will fill the first and second branches 48 and 50 simultaneously and subsequently the first and second reagent chambers 36 and 42 simultaneously. As set out above, the first and second reagent chambers may contain one or more reagents. These may be the same or different as between chambers.

With reference to FIG. 12, the conduit structure 18 may comprise a meandering conduit 52. In other words, a portion of the conduit structure 18 may comprise a number of bends. The meandering portion may otherwise be described as having a serpentine shape.

The purpose of such a meandering conduit is to mix the liquid as it flows along the conduit. The longer path facilitated by the numerous bends in the conduit also allows a greater volume of liquid to be contained within the conduit at any one time. This is particularly advantageous when the device is configured such that liquid does not enter the second cavity, specifically the second chamber. Two examples of such embodiments are shown in FIGS. 7*a* and 7*b* and in these embodiments, the conduit structure 18 may comprise a meandering conduit, as illustrated in FIG. 12.

In some embodiments, the conduit structure 18 may contain one or more reagents, for example one or more dry reagents. These may be positioned in the meandering conduit 52 and/or elsewhere in the conduit structure 18.

As described above, the device is rotated such that liquid flows out of the first chamber into the conduit structure under the action of centrifugal force. Depending on a number of factors, liquid may or may not enter the second chamber. When it does enter the second chamber, it may be desirable to retain some liquid in the second chamber. In particular, the second chamber may be configured as a detection chamber. Retained liquid and/or its properties can be detected.

With reference to FIGS. 12-14, embodiments in which some liquid is retained in the second chamber are described.

These embodiments have a number of features in common with embodiments described above (for example the first chamber and the first port) and these features will not be described again here. It will be understood that the disclosures above, in particular with reference to FIGS. 3*a*, 3*b*, 8*a*, 8*b*, 11*a*, 11*b*, 11*c* and 12 are equally applicable to the embodiments now described and are consistent therewith in certain embodiments.

With reference to FIG. 13, the second cavity, specifically the second chamber 14, comprises a liquid-retaining portion 56 radially outwards of the port 16. Accordingly, a wall 54 of the second chamber 14 which is disposed between the liquid-retaining portion and the second port 16 extends radially inwards of a radially outer aspect of the second chamber 14 to the port 16.

As in previously-described embodiments, the second chamber 14 is configured such that the only fluidic flow path into and out of the second chamber 14 is via the second port 16 and it therefore acts as an air ballast structure, configured to contain an air ballast. In some embodiments, the second chamber 14 is configured as a detection chamber. In particular, an external surface of the second chamber 14 is configured so as to transmit a beam of light through it. For example, the external surface may be transparent or translucent. In some embodiments, the device 2 also comprises a pair of prisms 500 disposed on either side of the liquid retaining portion 56. These are configured to direct a light beam from outside the plane of the device 2 which is incident on one of the prisms within the plane of the device 2, such that it impinges on the other of the pair of prisms. The light beam is then directed out of the plane of the disc to be measured.

The first conduit structure 18 comprises a first reagent chamber 36 containing one or more dry reagents 40, as described above with reference to FIG. 11*a*. In some embodiments, the first conduit structure may comprise multiple reagent chambers, for example as described with reference to FIGS. 9*b* and 9*c*. Equally, however, in some embodiments the conduit structure 18 does not comprise any reagent chambers. The channel-like portions of the conduit 18 structure may (or may not) contain one or more dry reagents instead.

Liquid flows within the device as illustrated in FIG. 13 will now be described. As in the embodiments described above, the device 2 is rotated at a first rotational frequency and, as a result, liquid flows out of the first chamber 4, into the conduit structure 18. As liquid flows down the conduit structure 18 and into the reagent chamber 36, a pressure of gas trapped inside the second chamber 14 increases. The rotational frequency of the device 2 is controlled to prevent liquid from entering the second chamber 14.

The device is then slowed to a second rotational frequency (which may be zero) and, as a result of the built-up pressure in the second chamber 14, liquid is forced back into the first chamber 4. This process of acceleration and deceleration may be repeated in order to move the liquid back and forth between the first chamber 4 and the conduit structure 18 multiple times, in particular to resuspend the one or more reagents in reagent chamber 36 in the liquid.

After carrying out the acceleration and deceleration process one or more times, the device is rotated at a third rotational velocity which is greater than the first rotational velocity. The centrifugal forces acting on the liquid are greater at the third rotational velocity than they are at the first (lower) rotational velocity. As a result, liquid is urged further down the conduit structure 18 and into the second chamber 14. Liquid flows to the radially-outermost aspect of the second chamber (i.e. into the liquid-retaining portion) and the chamber begins to fill.

Subsequently, the device 2 is slowed (or stopped) again. The built-up pressure in the second chamber 14 forces any liquid which is in the conduit structure 18 back towards the first chamber. However, any liquid in the second chamber 14 which is radially outwards of the second port (i.e. in the liquid retaining portion 56) is now trapped by the wall portion 54 in the second chamber and does not flow back towards the first chamber 4. Instead, a volume of air which has the same volume as the liquid which is now trapped in the second chamber 14 escapes the second chamber via the second port 16.

Retaining some of the liquid in the second chamber 14 is advantageous when the second chamber 14 is to be used as a detection chamber. Characteristics of the liquid retained in the second (detection) chamber 14 can thus be measured. For example, in embodiments in which the device 2 comprises a pair of prisms 500, as described above, light can be shone through the retained liquid and the intensity of light exiting the chamber can be measured. In this way, a transmission spectrum of the liquid can be measured or single or multiple photometry measurements carried out and one or more characteristics of the liquid determined. In other embodiments, liquid in the detection chamber may be imaged. Characteristics of the liquid may equally be measured by other means. For example, the surface enclosing the chamber 14 may be transparent in the region of the liquid retaining portion 56 and a light beam passed through the liquid perpendicular to the plane of the drawing (for photometry or imaging, for example).

For some applications, it may be desirable to measure a transmission spectrum of the liquid once it has been mixed with one or more reagents. The conduit structure 18 of the embodiment illustrated in FIG. 13 may comprise one or more reagent chambers in any of the ways described above, in particular with reference to FIG. 11*a* to 11*c*, or reagents can be provided in the conduit 18 itself.

In some cases, it may be desirable to mix a first portion of the liquid with one reagent or group of reagents and direct that portion of liquid into a first detection chamber, and mix a second portion of the liquid with another reagent or group of reagents and direct this portion of liquid into another detection chamber.

With reference to FIG. 14, a structure which facilitates the mixing of different portions of a liquid with different (or the same) reagents and the direction of those portions into different detection chambers is described. In addition to a first cavity, specifically a first chamber 4, a first conduit structure 18, a second cavity, specifically a second chamber 14, and a reagent chamber 36 (the functions of which have been discussed above and will not be described again here), the device 2 may further comprise a third cavity, specifically a third chamber 58. The third chamber 58 is connected to second conduit structure 64, which is connected to a portion of the first conduit structure 18 at a junction 68, in order to guide liquid flow between the first and third chambers. The third chamber 58 has a port 60 and comprises a liquid-retaining portion 62 which is radially outwards of the port 60 and also a portion which is radially inwards of the port 60. The second conduit structure comprises a second reagent chamber 70 which contains one or more reagents.

The second conduit structure 64 has a vent 66 such that gas can escape from the second conduit structure 64 via the vent. Vent 66 may be in communication with an internal air circuit, for example. Vent 66 helps ensure that liquid reaches the second conduit structure 64.

Liquid flows within the structure as described with reference to FIG. 14 will now be described. The device 2 is rotated at a first rotational velocity and as a result, liquid in the first chamber 4 flows out of the chamber via the port 12 and into the first conduit structure 18. As liquid flows, gas in the conduit structures is displaced and escapes out of vent 66. When liquid reaches the conduit junction at location 68, it will continue to flow along the first conduit structure 18, towards the second chamber 14 and will also flow into the second conduit structure 64. Once liquid has passed location 68 and flowed into portion 72 of conduit structure 18, there is no longer a fluidic flow path between gas in the second chamber 14 and vent 66. As such, as liquid flows towards the first chamber 14, a pressure of gas in the second chamber 14 increases.

Meanwhile, liquid also flows along the second conduit structure 64 and in a similar way, once liquid enters branch 74 of the second conduit structure, gas pressure in the third chamber 58 starts to increase.

The device 2 is then slowed to a second rotational velocity (or stopped) and as a result, the gas in the second and third chambers is able to expand, thus forcing liquid back, down the respective conduit structures. This process of acceleration and deceleration can be repeated in order to move the liquid columns between the conduit portions 72 and 74 and the reagents chambers 36 and 70 respectively. In order to prevent liquid that has been mixed with the reagents in reagent chamber 36 coming into contact with liquid that has been mixed with reagents in chamber 70, the rotational frequency of the device 2 can be controlled such that these liquids are not allowed to move out of the respective conduit portions 72 and 74, back towards the first chamber 4.

Once the liquid has been sufficiently mixed with the respective reagents, the device 2 is accelerated to a third rotational frequency higher than the first. This causes liquid to be transferred into the second and third chambers respectively. Liquid flows into the respective liquid-retaining portions 56 and 62. If the device is then slowed or stopped, gas in the respective chambers is able to escape via the respective ports and liquid is trapped in the liquid-retaining portions of the respective chambers. The liquid in the second and third chambers can then be imaged, or characteristics of the liquids measured, e.g. by measuring a transmission spectrum of the liquid or carrying out photometry.

As described above, when the device 2 is accelerated and decelerated, liquid in the respective conduit portions 72 and 74 is moved back and forth simultaneously. In some situations, however, it may be desirable to first mix a portion of liquid with a first reagent, measure characteristics of the resulting liquid and subsequently mix another portion of liquid with a second reagent and measure characteristics of that resulting liquid.

With reference to FIG. 15, a structure which facilitates this is described. The structure is similar to that described with reference to FIG. 14 and so a description of the common structural elements will not be repeated here. The difference between the structures illustrated in FIGS. 12 and 14 is that in the embodiment shown in FIG. 15, the device 2 comprises a siphon valve 76 in between the first conduit structure 18 and the second conduit structure 64.

Liquid flows within the device will now be described with reference to FIG. 15. Liquid flows out of chamber 4 and into the first conduit structure 18. At the junction at 68, liquid flows into conduit portion 72, towards the second chamber 14 and also on downstream, towards the siphon valve 76. Liquid flow is halted when it reaches the siphon valve 76, however.

The device 2 is slowed to a second rotational velocity, such that liquid is forced back down conduit portion 72. As long as the rotational frequency of the device is not reduced enough to allow the siphon 76 to prime, liquid will be held upstream of siphon 76. The device can then be accelerated and decelerated to move liquid in conduit portion 72 back and forth, to mix it with reagents in the first reagent chamber 36. As before, the device 2 can then be accelerated further, to transfer liquid into the second chamber 14.

Meanwhile, as mentioned above, as long as the rotational frequency of the device is not reduced enough to allow the siphon 76 to prime, liquid will be held upstream of siphon 76. Once a detection process has been carried out on liquid in the second chamber 14, for example, the device can be slowed sufficiently such that capillary forces which act to draw liquid into the siphon 76 are no longer outweighed by the centrifugal force acting on the liquid. As a result, the siphon primes and liquid is able to flow over the crest of the siphon 76. Once liquid has traversed the crest of the siphon 76, the device is accelerated again to urge liquid into the second conduit structure 64 and towards the third chamber 58. The acceleration and deceleration process can then be repeated to mix liquid with the reagents in chamber 70 and subsequently transfer it into the third chamber 58 for detection.

With reference to FIG. 16, a number of structures A, B, C, D, E and F, which are configured to mix a liquid, or resuspend one or more dry reagents in a liquid are described. The structures A to F are provided on a device 2 which is configured to be rotated about an axis of rotation 28. Each of the structures A to F has a number of features in common, as follows. Each structure comprises a first cavity, specifically a first chamber 600, which comprises an inlet 604, via which liquid is introduced into the first chamber 600, and a vent 602. Each structure A to F further comprises a second cavity, specifically a chamber 606 with a second port 610. Each structure also has a conduit structure 608 which provides a fluid flow path between the first chamber 600 and the second chamber 606, via the second port 610. Either side of the second chamber 606 of each structure A to F is a prism 612. These prisms are configured such that, in use, a first prism of the pair directs a light beam which is incident on it from outside the plane of the device 2 through a portion of the second chamber 606 (and thus through any liquid present in that portion of the chamber), onto the second prism of the pair. The second prism then directs the light beam back out of the plane of the device 2, where it can be measured.

The first chamber 600 of each of structures A, B, C, D and E comprises a plurality of ports 614. Each of the plurality of ports 614 is connected to a respective conduit portion 616 and these conduit portions are, in turn, connected to a manifold 618. For clarity, one of the plurality of ports on each structure A-F has been labelled and one of the conduit portions of each structure A-F has been labelled.

The first chamber 600 of structure F has a single port 620. It will be appreciated that, in some embodiments, the first chamber 600 of any of structures A-F may have either a single port 620 or a plurality of ports 614.

The second port 610 of structures A and F are disposed in a radially-innermost aspect of the second chamber 606. The second port 610 of structures B, C, D and E are disposed in a wall of the second chamber 606 which is in between a radially-innermost and a radially-outermost aspect of the second chamber 606. It will be appreciated that, in some embodiments, any of the structures A to F may have a second chamber with a second port configured in either of these ways.

Each of the structures A to F also has a mixing structure. Starting with structure A, the conduit structure 608 comprises a first branched structure 622 and a second branched structure 624, connected in series with the first branched structure 622. The branched structure 622 is radially outwards of the branched structure 624. Each of the first and second branched structures comprises a first manifold 626 and a second manifold 628. The first and second manifolds are connected by a plurality of conduit portions 630. In other words, the conduit structure 608 branches into a plurality of conduit portions, which then recombine again into a single channel. One of each of features 622, 624, 626, 628 and 630 are labelled on structure A for clarity.

Structure F has largely the same features as structure A. However, as noted above, the first chamber 600 in structure A has a plurality of ports, whereas the first chamber 600 of structure F only has a single first port.

Structure B also comprises a first and second branched structure (622 and 624) connected in series. In structure B, the first and second branched structures have the same radial position and are adjacent to one another in a circumferential direction. Structure D has largely the same features as structure B. In structure D, however, the respective first and second manifolds are connected by a number of conduit portions 632, some of which connect multiple ports on the first manifold 626 to a single port on the second manifold 628. Some of the conduit portions connect multiple ports on the first manifold to multiple ports on the second manifold. In other words, the conduit structure 608 branches into a number of conduit portions, some of which in turn branch into a number of sub-branches. These branches and sub-branches then recombine into a single channel.

Structure E also comprises largely the same features as structure B, but the first and second manifolds 626 and 628 of the first and second branched structures are connected in a slightly different way. In particular, the conduits connecting the manifolds have different widths and depths.

Structure C comprises a first branched structure 622 and a second branched structure 624. Each branched structure comprises a first manifold 626 and a second manifold 628. The first and second manifolds are connected by a respective conduit arrangement comprising a first plurality of conduit portions which extend from the first manifold 626 radially inwards to a conduit portion 650 which extends in a circumferential direction. Each conduit arrangement further comprises a second plurality of conduit portions which extend from the circumferentially-extending conduit portion 650 radially inwards, to the second manifold 628.

With reference to FIG. 17 a full detailed layout of a device 2 which incorporates aspects of the above embodiments is now described. The device 2 is provided as a disc configured to be rotated about an axis of rotation 28.

The device 2 comprises the following features:
An inlet 700 via which a blood sample is introduced into the device 2
A separation chamber 702
An overflow portion 704 connected to the separation chamber 702
An air circuit 706, to which the inlet 700 and the overflow portion 704 are connected
A first chamber 710 with a plurality of ports 712 (only some of which are labelled for clarity)
A siphon 708 connecting the first chamber 710 to the separation chamber 702
A network of channels 714
A first conduit structure 716 connecting the first chamber 710 to the network of channels 714
A structure 718 for rupturing a blister pack containing a buffer, for example. The blister pack is attached to the cover foil (described below).
A chamber 720 for receiving buffer from the blister pack
A siphon 722 connecting the chamber 720 to the first chamber 710
A chamber 726, with a series of portions 726a, 726b, 726c and 726d
A detection chamber 728 connected to the chamber 726
A pair of prisms 730, either side of chamber 728
Four detection chambers 732a, 732b, 732c and 732d, each connected to a respective portion of chamber 726 by respective conduit structures 734a, 734b, 734c and 734d. Each of the conduit structures 734a-d comprises a meander and the meanders are each lined with one or more dry reagents.
Four pairs of prisms 736a, 736b, 736c and 736d, the prisms arranged either side of detection chambers 732a-d respectively These structures are moulded or stamped in a substrate. A cover foil is then attached to the substrate to form the chambers and other structures. Each of the chambers listed above comprise a number of support pillars 110 to support the cover foil sealed to the substrate (which may otherwise be referred to as a carrier disc).

Liquid flows through the device 2 will now be described. As mentioned above, the device 2 comprises a structure 718 for rupturing a blister pack containing a buffer solution. The blister pack is attached to the cover foil which in turn is attached to the device 2. In operation, pressure is applied by the user, for example, to the blister pack, causing it to rupture against structure 718. A volume of blood is also introduced, for example by a user, into the device 2 via an inlet 700. The device 2 is then rotated about the axis of rotation 28, causing the blood sample to flow into separation chamber 702 under the action of centrifugal force. A volume of the blood sample overflows into overflow chamber 704. Also under the action of centrifugal force, the buffer from the blister pack flows to the radially-distal aspect of chamber 720.

The device 2 is then rotated in order to separate the blood in the separation chamber 702 into its components: plasma and cellular material.

The device is then slowed (or stopped) in order to allow siphons 722 and 708 to prime. Once the siphons have primed, the device is spun again (or the rotational frequency of the device 2 increased) in order to transfer a volume of plasma from the separation chamber 702 to the first chamber 710 and also a volume of buffer from the chamber 720 into the first chamber 710. At this stage, there is then a solution of buffer and plasma in the first chamber 710. The rotational frequency of the device is then increased in order to transfer liquid in the first chamber 710 into the conduit structure 716 and subsequently into the network of channels 714. The network of channels is unvented and as such, as liquid flows into the conduit structure 716 and subsequently into the network of channels 714, a pressure of gas inside the network of channels increases.

The network of channels 714 comprises a plurality of channels 900 which are aligned in a circumferential direction (otherwise referred to as circumferentially-aligned channels) and a plurality of conduit portions 902 which are aligned in a radial direction and which connect adjacent circumferentially-aligned channels. The circumferential positions of a first set of radially-aligned conduit portions which connect a first circumferentially-aligned channel 900a to a second circumferentially aligned channel 900b are offset from the circumferential positions of a second set of radially-aligned conduit portions which connect the second circumferentially-aligned channel 900b to a third circumferentially aligned channel 900c. The radially outermost circumferentially aligned channel has an inlet 904 which is connected to the conduit structure 716.

In some embodiments, the channels 900 may not be strictly aligned, but may be substantially aligned or not aligned at all. In some embodiments, a subset of the channels 900 may be aligned and a further subset of the channels 900 may not be strictly aligned. Likewise, in some embodiments, the conduit portions 902 may not be offset from each other but may be fully or partially aligned. In some embodiments, a subset of the conduit portions 902 may be offset and a further subset of the conduit portions 902 may be fully or partially aligned.

The device is then slowed again (or stopped), such that the gas trapped in the network of channels 714 expands, thus forcing liquid back into the first chamber 710. This process of acceleration and deceleration can be repeated in order to move liquid back and forth, thus mixing it.

The device is then slowed further to allow the siphon 724 to prime. Once the siphon has primed, the rotational frequency of the device 2 is increased in order to transfer the mixed solution of buffer and plasma into chamber 726. The solution flows into portion 726a and subsequently overflows into portions 726b, 726c and 726d and also into portion 728.

The device is continued to be rotated and liquid thus flows into conduit structures 734a, 734b, 734c and 734d. Here, the liquid encounters the one or more reagents contained in the conduit structures. Detection chambers 732a, 732b, 732c and 732d are unvented and as such, as liquid flows, a pressure of gas in the detection chambers increases. In this way, the device can be accelerated and decelerated in line with the method set out above, in order to move liquid back and forth between the portions 726a-d and the conduit portions 734a-d in order to resuspend the respective one or more dry reagents in the liquid.

The rotational frequency of the device 2 is then increased further, in order to cause the liquid to advance further along conduit structures 734a-d and into the detection chambers 732a-d. A detection process can then be carried out on the liquid volumes in the detection chambers. A detection process can also be carried out on the liquid volume in portion 728. Liquid in the portion 728 will not have been mixed with reagents and so can be measured for use in a calibration process, for example.

With reference to FIG. 18, a further device layout is shown. A number of features of the device layout are in common with that illustrated in FIG. 17 and like parts are labelled as in FIG. 17. Common features will not be described in detail here.

A difference between the layouts as illustrated in FIGS. 16 and 18 is that the layout of FIG. 18 includes a structure as described in FIG. 9. Like parts are labelled as in FIG. 9 and will not be described again here.

The outlet conduit 836 is connected to the first chamber 710 via the plurality of ports 712. In this way, a volume of plasma can be isolated from the blood sample input into the device 2, e.g. by a user, using the method as described above with reference to the separation structure as illustrated in FIG. 9 and then directed into first conduit structure 912 to be combined with a liquid from first chamber 710. One or more dry reagents (which may be, for example, contained in the first conduit structure 716, can then be resuspended, for example, by moving liquid back and forth between the first chamber 710 and the network of channels 714. The liquid can then be directed into detection chambers 732a, 732b, 732c and 732d, as described above, where one or more characteristics of the liquid can be measured.

Another difference between the layouts of FIGS. 16 and 18 is the structure of the network of channels 714. The channels of the network of channels have different depths and widths and are connected at different points.

With reference to FIGS. 19a and 19b, a further full detailed layout of a device 2 which incorporates aspects of the above embodiments is now described. The device 2 is provided as a disc configured to be rotated about an axis of rotation 28.

Figure 5:
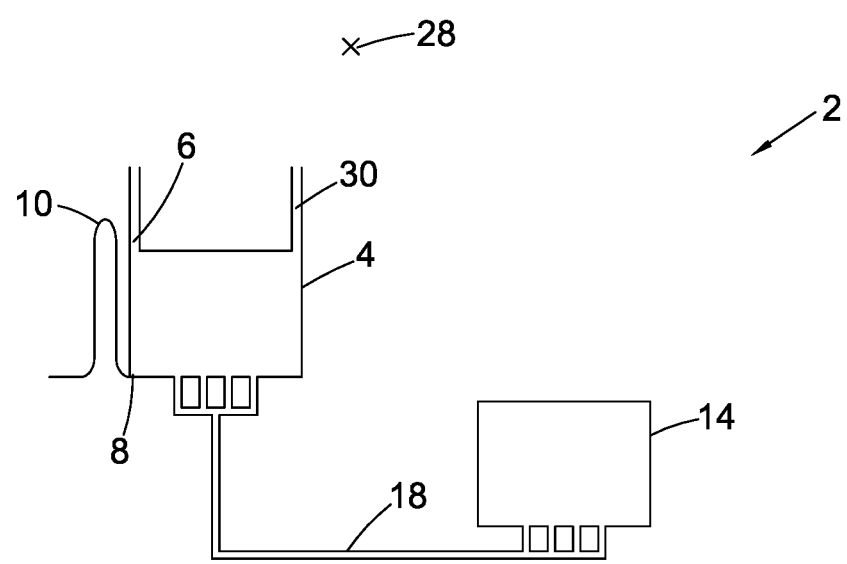

Three structures as schematically illustrates in FIG. 5 are present in the layout.

The first such structure comprises:
First chamber 4a
Second chamber 14a
First plurality of ports 20a
Second plurality of ports 34a
First conduit structure 18a
The second structure comprises:
First chamber 4b
Second chamber 14b
First plurality of ports 20b
Second plurality of ports 34b
First conduit structure 18b
The third structure comprises:
First chamber 4c
Second chamber 14c
First plurality of ports 20c
Second plurality of ports 34c
First conduit structure 18c These structures are moulded or stamped in a substrate. A cover foil is then attached to the substrate to form the chambers and other structures. Each of the chambers listed above comprise a number of support pillars 110 to support the cover foil sealed to the substrate (which may otherwise be referred to as a carrier disc).

The device 2 also comprises a number of other structures, as follows:
A structure 112 for rupturing a blister pack containing a liquid reagent or dilutant, for example. The blister pack is attached to the cover foil.
A number of detection chambers 114, with prisms 116 either side of each detection chamber. As described above, these are used to direct a beam of light through the liquid within the plane of the disc.
A lysis chamber 118 for lysing cells
A number of capillary siphons 120 for transferring liquid between other structures, e.g. chambers.

As mentioned above, the device 2 comprises a structure 112 for rupturing a blister pack containing a buffer solution. The blister pack is attached to the cover foil which in turn is attached to the device 2. In operation, pressure is applied by the user to the blister pack, causing it to rupture against structure 112. A volume of blood is also introduced, for example by a user, into the device 2 via an inlet 300 (which may contain sample processing reagents) which is filled by capillary action and further into the sample processing chamber 118 by centrifugal force. Liquid solution, which may also contain reagents, from the blister pack flows into chamber 402 but it is prevented from flowing out of chamber 402 by capillary valve 404. The capillary valve 404 is configured so as to be overcome at a threshold rotational frequency. In other words, when the device is spun at this threshold rotational frequency, liquid is caused to flow from chamber 402 into chamber 406. The device is then slowed (or stopped) to allow siphon 400 to prime and liquid is transferred from structure 118 into chamber 4c via siphon 400 on renewed rotation. The buffer also transferred into chamber 4c via siphon 408.

In chamber 4c, the buffer from the blister pack comes into contact with the processed sample from structure 118. In order to mix the plasma with the buffer, the two liquids are transferred back and forth between chambers 4c and 14c, via conduit structure 18C. As described above, as the liquids flow out of chamber 4C and into chamber 14c, a gas pressure in chamber 14c increases. The device is then slowed or stopped such that the gas in chamber 14c expands, forcing the liquid back into chamber 4c. As in some of the previously described embodiments, chamber 4c has a plurality of ports 20C and chamber 14C has a plurality of ports 34C. As described above, this facilitates the mixing of the liquids.

Once the plasma and buffer have been sufficiently mixed, forming a resultant liquid, the resultant liquid is then transferred from chamber 4c into chamber 410, via siphon 412. Subsequently, a portion of the liquid is transferred from chamber 410 into chamber 4b, via siphon 414. In chamber 4b, the resultant liquid comes into contact with another volume of the buffer which was introduced into the device from the blister pack. The liquid flows which cause this volume of reagent to arrive in chamber 4b from the blister pack will now be described.

As described above, the buffer flows from the blister pack into chamber 402 and subsequently, via the capillary valve 404, will flow into chamber 406. From here, it also overflows into chamber 416. The buffer is then transferred into chamber 418 via siphon 420 and subsequently into chamber 422 via siphon 424. Subsequently, it is transferred into chamber 4b via siphon 426. Here, it comes into contact with the resultant liquid from chamber 410.

Here, a further step of mixing is required. As such, the liquids are transferred back and forth in between chambers 4b and 14b, by varying the rotational frequency of the disc, via conduit structure 18b, in order to mix them, as described with reference to chambers 4c and 14c. Chamber 14b has a plurality of ports 34B and chamber 4b has a plurality of ports 20B. Once the liquids have been sufficiently mixed, the resulting liquid is transferred from chamber 4b into chamber 428 via siphon 914 and subsequently, via structure 430, into chamber 4a. From here a further step of mixing is carried out, by transferring liquid back and forth between chambers 4a and 14a.

Once the liquids have been mixed, the liquid is then transferred, via siphon 434 into detection chambers 114. As mentioned above, prisms 116 are disposed either side of the detection chambers to direct a beam of light which impinges on one of the prisms 116 from outside a plane of the disc through the detection chamber, and hence the liquid in the detection chamber 114, onto the other of the pair of prisms 116. The second prism then directs the light beam back out of the plane where it is measured.

As mentioned above, the buffer from the blister pack flows into chamber 402, then into chamber 406, where it overflows into chamber 416. It also flows into chamber portion 440 and subsequently into chamber portion 442. It then fills the detection chambers 444. As with the other detection chambers 114, the chambers 444 also have prisms 446 either side of them. A calibration process can then be carried out, by taking the same measurements of the (known) buffer as are taken for the plasma and buffer mixture.

The calibrated measurements can then be used to quantify one or more characteristics of the blood sample.

FIG. 19b also depicts the layout illustrated in FIG. 19a.

A structure including a number of pillars with chimney-like spaces between them was described with reference to FIGS. 10e and 10f in the context of adjustable metering (i.e. metering in which the volume of liquid and the time at which the liquid is metered may be controlled by controlling the rotational frequency of the device). It will be appreciated that such pillars with chimney-like spaces between them can be used, and are advantageous, independently of some of the features described with reference to FIGS. 10e and 10f (including the features which facilitate adjustable metering). An example of the pillars with chimney-like spaces used in conjunction with adjustable metering was described with reference to FIGS. 10e and 10f. An example of an implementation of the pillars with chimney-like spaces without adjustable metering is now described with reference to FIG. 20.

The device 2 comprises a chamber 1016 with an inlet port (not shown) connected to an upstream liquid handling chamber (also not shown) for receiving liquid from the upstream liquid handling chamber. The chamber 1016 comprises an outlet port 1018 connected to a conduit 1020. The conduit 1020 extends radially inwards of the outlet port 1018 to a crest 1022. The chamber 1016 comprises a first radial region 1024 which is radially inwards of the notional dashed line 1026 shown in FIG. 20. The chamber 1016 also comprises a second radial region 1028, which is radially outwards of the dashed line 1026. The first radial region has a cross-sectional area which is smaller than a cross sectional area of the second radial region. This reduction in cross section is achieved in part by a reduction in the circumferential extent of the chamber 1016 in the first radial region and in part by pillars 1030 disposed in the chamber 1016. It will be appreciated that, in some embodiments, this reduction in cross-sectional area may be achieved by a reduction in circumferential extent of the chamber 1016 alone (without the use of pillars 1030) or alternatively it may be achieved by use of pillars alone, with no reduction in circumferential extent of the chamber 1016 (for example as shown in FIG. 100. It will be appreciated that any number of pillars could be used. Alternatively or additionally, the reduction in cross-sectional area may be achieved by a reduction in the depth of the chamber, parallel to the axis of rotation.

Also disposed in chamber 1016 are pillars 1032 (only some of which are labelled, for the sake of clarity). These pillars provide support for chamber 1016, in that they support the two axially spaced surfaces which, along with the side walls of chamber 1016, define the chamber 1016. It will be appreciated that the pillars 1032 will have the effect that the cross-sectional area of the chamber 1016 in the vicinity of the pillars 1032 is reduced.

It will be appreciated that the features and options described here also apply to the embodiment shown in FIG. 10f.

The cross-sectional area of the first radial region is across the first radial region, for example circumferentially or tangentially across the first radial region. Similarly the cross-sectional area of the second radial region is across the second radial region, for example circumferentially or tangentially across the second radial region.

In use, liquid is transferred into the chamber 1016 from the upstream liquid handling structure via the inlet port of the chamber 1016 (neither shown). This may be done under the action of centrifugal force, by capillary or by any other means. Liquid also enters the conduit 1020 from the chamber 1016. As the chamber 1016 fills, a liquid level in the chamber 1016 rises (i.e. moves radially inwards). Initially, liquid fills the second radial region, which has a greater circumferential cross-section that the first radial region. Accordingly, the fill level of the liquid in the chamber 1016 initially rises slowly because the liquid fills a greater cross-sectional area. As the fill level of liquid in the chamber 1016 rises (i.e. moves radially inwards), there is then a reduction in the cross-sectional area of the chamber 1016, which is provided in part by the pillars 1032 and in part by the pillars 1030. Accordingly, the rate at which the fill level rises increases. As the liquid level rises further, the cross-sectional area of the chamber 1016 increases again, once the fill level is radially inwards of the pillars 1032 and the rate at which the fill level rises decreases. Once the fill level reaches the point at which the circumferential extent of the chamber 1016 is reduced (i.e. the step change in circumferential extent of the chamber 1016), the cross-sectional area of the chamber 1016 is reduced significantly and the liquid level then rises much more rapidly due to the smaller circumferential cross-section of the first radial region. As the liquid level in the chamber 1016 rises, a level of liquid in the conduit 1020 also rises.

Once the liquid level in the chamber 1016 reaches the radial position of the crest 1022 of the conduit 1020, liquid in the conduit 1020 will overcome the crest and flow downstream. By configuring the chamber 1016 as described (with two radial regions with different circumferential cross-sections), the point at which liquid overcomes the crest 1022 can be more precisely controlled. The described structure facilitates consistent control of the priming of the conduit 1020 because the fill level of the chamber 1016 is more sensitive to the liquid volume in the chamber 1016 in the first region 1024 as compared to the second region 1028. Advantageously, liquid can be transferred into the chamber 1016 (in particular the second radial region of the chamber 1016) relatively safely without priming the conduit 1020. The first radial region acts as a trigger region in which, once filled by liquid, the conduit 1020 is reliably and rapidly primed with little change in liquid volume.

With reference to FIG. 21, a system configured for use with the device 2 is described. A system 208 comprises a spindle 210 arranged to protrude through a central hole of the device 2. The spindle 210 is connected to a motor 200 arranged to spin the spindle 210 and hence the device 2. The motor 200 is connected to and controlled by a processor 202. The processor 202 is connected to a memory 204. The processor 202 is also connected to and controls a detection system 206. At a specific rotational configuration of the device 2 with respect to the detection system 206, the detection system 206 is configured so as to be aligned with a detection chamber, for example the second chamber 14 described above.

The above description of embodiments is made by way of example only and various modifications, alterations and juxtapositions of the described features will occur to the person skilled in the art. It will therefore be apparent that the above description is made for the purpose of illustration of embodiments of the invention and not limitation of the invention, which is defined in the appended claims.

The invention claimed is:

1. A method of driving liquid flow in a device, the method comprising rotating the device at a first rotational frequency to transfer liquid from a first cavity of the device into a second cavity of the device, in communication with the first cavity;
   rotating the device at a second rotational frequency lower than the first rotational frequency to transfer liquid from the second cavity back into the first cavity and to transfer liquid from the first cavity into a downstream cavity in communication with the first cavity; and
   subsequent to transferring liquid from the first cavity into the downstream cavity, rotating the device at a fifth rotational frequency different to the second rotational frequency to control the volume of liquid which is transferred from the first cavity to the downstream cavity;
   wherein the fifth rotational frequency being greater than the second rotational frequency decreases the volume of liquid transferred; and
   wherein the fifth rotational frequency being less than the second rotational frequency increases the volume of liquid transferred.

2. The method as claimed in claim 1, the method comprising, after rotating the device at the first rotational frequency and before rotating the device at the second rotational frequency:
   rotating the device at a third rotational frequency and subsequently a fourth rotational frequency in order to mix the liquid;
   wherein the third rotational frequency is greater than the second rotational frequency; and
   wherein the fourth rotational frequency is greater than the third rotational frequency.

3. The method of implementing the method as claimed in claim 1 using a device for handling liquid, wherein the device is configured for rotation about an axis of rotation.

* * * * *